United States Patent
Chaturvedi et al.

(10) Patent No.: US 8,050,272 B2
(45) Date of Patent: Nov. 1, 2011

(54) SYSTEM AND METHOD FOR CONCURRENT SESSIONS IN A PEER-TO-PEER HYBRID COMMUNICATIONS NETWORK

(75) Inventors: Sivakumar Chaturvedi, Allen, TX (US); Satish Gundabathula, Irving, TX (US)

(73) Assignee: Damaka, Inc., Richardson, TX (US)

( * ) Notice: Subject to any disclaimer, the term of this patent is extended or adjusted under 35 U.S.C. 154(b) by 228 days.

(21) Appl. No.: 11/434,030

(22) Filed: May 15, 2006

(65) Prior Publication Data
US 2006/0218624 A1    Sep. 28, 2006

Related U.S. Application Data

(63) Continuation-in-part of application No. 11/214,648, filed on Aug. 30, 2005, which is a continuation-in-part of application No. 11/081,068, filed on Mar. 15, 2005.

(60) Provisional application No. 60/583,536, filed on Jun. 29, 2004, provisional application No. 60/628,183, filed on Nov. 15, 2004, provisional application No. 60/628,291, filed on Nov. 17, 2004.

(51) Int. Cl.
*H04L 12/28* (2006.01)

(52) U.S. Cl. ............ 370/395.2; 370/252; 370/395.3; 709/203; 709/205

(58) Field of Classification Search ............ 370/252, 370/401, 420, 350, 351, 352, 392, 389, 395.2, 370/395.3, 400, 474; 709/205, 229, 203; 713/171, 164, 189; 379/88.04, 100.1, 111.21; 726/3, 6; 398/88.04, 100.1, 111.2
See application file for complete search history.

(56) References Cited

U.S. PATENT DOCUMENTS

| | | | |
|---|---|---|---|
| 5,442,637 A | 8/1995 | Nguyen | |
| 5,761,309 A * | 6/1998 | Ohashi et al. | 713/156 |
| 5,790,637 A * | 8/1998 | Johnson et al. | 379/88.04 |
| 6,031,818 A | 2/2000 | Lo et al. | |
| 6,141,687 A * | 10/2000 | Blair | 709/225 |
| 6,202,084 B1 | 3/2001 | Kumar et al. | |
| 6,219,638 B1 | 4/2001 | Padmanabhan et al. | |
| 6,311,150 B1 | 10/2001 | Ramaswamy et al. | |
| 6,343,067 B1 | 1/2002 | Drottar et al. | |
| 6,360,196 B1 | 3/2002 | Poznaski et al. | |
| 6,473,425 B1 | 10/2002 | Bellaton et al. | |
| 6,574,668 B1 | 6/2003 | Gubbi et al. | |
| 6,766,373 B1 | 7/2004 | Beadle | |
| 6,826,613 B1 * | 11/2004 | Wang et al. | 709/227 |
| 6,836,765 B1 * | 12/2004 | Sussman | 705/75 |

(Continued)

FOREIGN PATENT DOCUMENTS

EP    1404082    3/2004

(Continued)

OTHER PUBLICATIONS

Rory Bland, et al,"P2P Routing" Mar. 2002.

(Continued)

*Primary Examiner* — Aung S Moe
*Assistant Examiner* — Abdullah Riyami
(74) *Attorney, Agent, or Firm* — Howison & Arnott, L.L.P.

(57) ABSTRACT

An improved system and method are disclosed for peer-to-peer communications. In one example, the method provides for concurrent sessions to be maintained by multiple endpoints.

19 Claims, 42 Drawing Sheets

U.S. PATENT DOCUMENTS

| | | | |
|---|---|---|---|
| 6,850,769 B2 | 2/2005 | Grob et al. | |
| 6,940,826 B1 | 9/2005 | Simard et al. | |
| 6,999,932 B1 | 2/2006 | Zhou | |
| 7,013,155 B1 | 3/2006 | Ruf et al. | |
| 7,080,158 B1 | 7/2006 | Squire | |
| 7,117,526 B1* | 10/2006 | Short | 726/5 |
| 7,272,377 B2 | 9/2007 | Cox et al. | |
| 7,304,985 B2 | 12/2007 | Sojka et al. | |
| 7,353,252 B1 | 4/2008 | Yang et al. | |
| 7,353,255 B2 | 4/2008 | Acharya et al. | |
| 7,412,374 B1 | 8/2008 | Seiler et al. | |
| 7,477,282 B2 | 1/2009 | Firestone et al. | |
| 2002/0038282 A1 | 3/2002 | Montgomery | |
| 2002/0042769 A1 | 4/2002 | Gujral et al. | |
| 2002/0062285 A1 | 5/2002 | Amann et al. | |
| 2002/0087887 A1* | 7/2002 | Busam et al. | 713/201 |
| 2002/0097150 A1* | 7/2002 | Sandelman et al. | 340/506 |
| 2002/0120757 A1* | 8/2002 | Sutherland et al. | 709/229 |
| 2002/0143548 A1 | 10/2002 | Korall et al. | |
| 2002/0150110 A1* | 10/2002 | Inbar et al. | 370/401 |
| 2002/0166053 A1* | 11/2002 | Wilson | 713/189 |
| 2002/0176404 A1 | 11/2002 | Girard | |
| 2002/0178087 A1 | 11/2002 | Henderson et al. | |
| 2002/0184310 A1 | 12/2002 | Traversat et al. | |
| 2003/0009565 A1 | 1/2003 | Arao | |
| 2003/0044020 A1* | 3/2003 | Aboba et al. | 380/278 |
| 2003/0046056 A1 | 3/2003 | Godoy et al. | |
| 2003/0061025 A1 | 3/2003 | Abir | |
| 2003/0061481 A1 | 3/2003 | Levine et al. | |
| 2003/0072485 A1 | 4/2003 | Guerin et al. | |
| 2003/0076815 A1 | 4/2003 | Miller et al. | |
| 2003/0078858 A1 | 4/2003 | Angelopoulos et al. | |
| 2003/0105812 A1* | 6/2003 | Flowers et al. | 709/203 |
| 2003/0110047 A1 | 6/2003 | Santosuosso | |
| 2003/0115251 A1 | 6/2003 | Frederickson et al. | |
| 2003/0135569 A1 | 7/2003 | Khakoo et al. | |
| 2003/0137939 A1 | 7/2003 | Dunning et al. | |
| 2003/0158722 A1 | 8/2003 | Lord | |
| 2003/0163697 A1* | 8/2003 | Pabla et al. | 713/171 |
| 2003/0177186 A1* | 9/2003 | Goodman et al. | 709/205 |
| 2003/0177422 A1* | 9/2003 | Tararoukhine et al. | 714/48 |
| 2003/0187650 A1 | 10/2003 | Moore et al. | |
| 2003/0220121 A1 | 11/2003 | Konishi et al. | |
| 2004/0034776 A1 | 2/2004 | Fernando et al. | |
| 2004/0034793 A1 | 2/2004 | Yuan | |
| 2004/0039781 A1* | 2/2004 | LaVallee et al. | 709/205 |
| 2004/0044517 A1 | 3/2004 | Palmquist | |
| 2004/0100973 A1 | 5/2004 | Prasad | |
| 2004/0128554 A1 | 7/2004 | Maher, III et al. | |
| 2004/0133689 A1 | 7/2004 | Vasisht | |
| 2004/0139225 A1 | 7/2004 | Takahashi | |
| 2004/0139228 A1 | 7/2004 | Takeda et al. | |
| 2004/0143678 A1* | 7/2004 | Chari et al. | 709/240 |
| 2004/0153858 A1* | 8/2004 | Hwang | 714/43 |
| 2004/0158471 A1 | 8/2004 | Davis et al. | |
| 2004/0162871 A1 | 8/2004 | Pabla et al. | |
| 2004/0260952 A1* | 12/2004 | Newman et al. | 713/201 |
| 2004/0267527 A1 | 12/2004 | Creamer et al. | |
| 2004/0268257 A1 | 12/2004 | Mudusuru | |
| 2005/0004982 A1 | 1/2005 | Vernon et al. | |
| 2005/0008024 A1 | 1/2005 | Newpol et al. | |
| 2005/0033985 A1 | 2/2005 | Chen et al. | |
| 2005/0071481 A1* | 3/2005 | Danieli | 709/229 |
| 2005/0086309 A1 | 4/2005 | Galli et al. | |
| 2005/0091407 A1 | 4/2005 | Vaziri et al. | |
| 2005/0143105 A1* | 6/2005 | Okamoto | 455/466 |
| 2005/0187957 A1* | 8/2005 | Kramer et al. | 707/101 |
| 2005/0195802 A1 | 9/2005 | Klein et al. | |
| 2005/0246193 A1 | 11/2005 | Roever et al. | |
| 2005/0249196 A1* | 11/2005 | Ansari et al. | 370/352 |
| 2005/0254440 A1 | 11/2005 | Sorrell | |
| 2005/0286519 A1 | 12/2005 | Ravikumar et al. | |
| 2006/0121986 A1* | 6/2006 | Pelkey et al. | 463/40 |
| 2006/0148516 A1* | 7/2006 | Reddy et al. | 455/552.1 |
| 2006/0168643 A1* | 7/2006 | Howard et al. | 726/2 |
| 2006/0183476 A1 | 8/2006 | Morita et al. | |
| 2006/0218624 A1 | 9/2006 | Ravikumar et al. | |
| 2006/0230166 A1* | 10/2006 | Philyaw | 709/230 |
| 2007/0016921 A1 | 1/2007 | Levi et al. | |
| 2007/0078785 A1* | 4/2007 | Bush et al. | 705/72 |
| 2007/0110043 A1* | 5/2007 | Girard | 370/352 |
| 2007/0111794 A1* | 5/2007 | Hogan et al. | 463/42 |
| 2007/0190987 A1 | 8/2007 | Vaananen | |
| 2007/0239892 A1* | 10/2007 | Ott et al. | 709/242 |
| 2008/0005328 A1* | 1/2008 | Shively et al. | 709/225 |
| 2008/0069105 A1* | 3/2008 | Costa et al. | 370/392 |
| 2008/0192756 A1 | 8/2008 | Damola et al. | |
| 2008/0320096 A1* | 12/2008 | Szeto | 709/207 |
| 2009/0192976 A1* | 7/2009 | Spivack et al. | 706/55 |

FOREIGN PATENT DOCUMENTS

| | | |
|---|---|---|
| JP | 2005-94600 | 4/2005 |
| JP | 2007-043598 | 2/2007 |
| KR | 10-2005-0030548 | 3/2005 |
| WO | WO 03/079635 | 9/2003 |
| WO | WO 2004063843 | 7/2004 |
| WO | WO 2005/009019 | 1/2005 |
| WO | 2006/075677 | 7/2006 |

OTHER PUBLICATIONS

Jeff Tyson, "How Instant Messaging Works", www.verizon.com/learningcenter, Mar. 9, 2005.

Salman A. Baset, et al, "An Analysis Of The Skype Peer-To-Peer Internet Telephony Protocol", Department of Computer Science, Columbia University, New York, NY, USA, Sep. 15, 2004.

Chathapuram, "Security in Peer-To-Peer Networks", Aug. 8, 2001, XP002251813.

International Search Report and Written Opinion of the International Searching Authority from PCT/IB2005/000821, dated Aug. 5, 2005.

Rosenberg, "STUN—Simple Traversal of UDP Through NAT", Sep. 2002, XP015005058.

Singh et al., "Peer-to Peer Internet Telephony Using SIP", Department of Computer Science, Columbia University, Oct. 31, 2004, XP-002336408.

Sinha, S. and Oglieski, A., A TCP Tutorial, Nov. 1998 (Date posted on Internet: Apr. 19, 2001) [Retrieved from the Internet <URL:http//www.ssfnet.org/Exchange/tcp/tcpTutorialNotes.html>].

International Search Report and Written Opinion of the International Searching Authority from PCT/US2006/047841, dated Sep. 12, 2008.

International Search Report and Written Opinion of the International Searching Authority from PCT/US2007/068820, dated Jun. 11, 2008.

International Search Report and Written Opinion of the International Searching Authority from PCT/US2007/002424, dated Aug. 14, 2007.

International Search Report and Written Opinion of the International Searching Authority from PCT/US2007/068821, dated Jun. 14, 2008.

International Search Report and Written Opinion of the International Searching Authority from PCT/US2007068823, dated Jun. 1, 2008.

International Search Report and Written Opinion of the International Searching Authority from PCT/US2006/040312, dated Mar. 2, 2007.

International Search Report and Written Opinion of the International Searching Authority from PCT/US2006/032791, dated Dec. 18, 2006.

Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.

International Search Report and Written Opinion of the International Searching Authority from PCT/US2008/078142, dated Mar. 27, 2009.

International Search Report and Written Opinion of the International Searching Authority from PCT/US2008/084950, dated Apr. 27, 2009.

Hao Wang, Skype VoIP service-architecture and comparison, In: INFOTECH Seminar Advanced Communication Services (ASC), 2005, pp. 4, 7, 8.

Seta, N.; Miyajima, H.; Zhang, L;; Fujii, T., "All-SIP Mobility: Session Continuity on Handover in Heterogeneous Access Environment," Vehicular Technology Conference, 2007. VTC 2007—Spring. IEEE 65th, Apr. 22-25, 2007, pp. 1121-1126.

International Search Report and Written Opinion of the International Searching Authority from PCT/US2008/075141, dated Mar. 5, 2009.

Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.

* cited by examiner

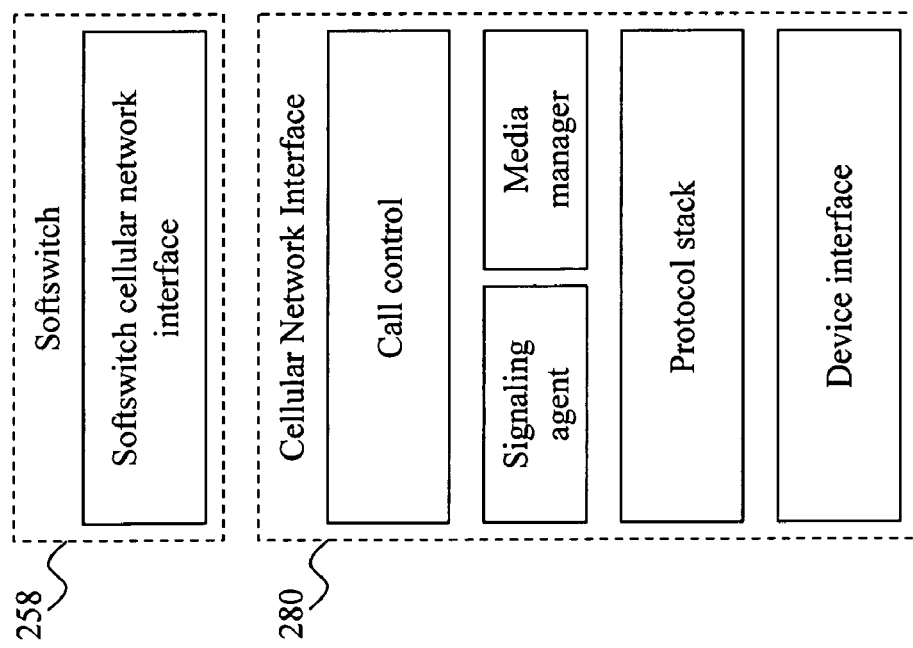

| Terminating NAT type / Originating NAT type | No NAT | Full Cone | Restricted Cone | Port Restricted Cone | Symmetric |
|---|---|---|---|---|---|
| No NAT | Direct | Direct | Reflect | Reflect | Reflect / Port Capture |
| Full Cone | Direct | Direct | Reflect | Reflect | Reflect / Port Capture |
| Restricted Cone | Direct | Direct | Fake Packet / Reflect | Fake Packet / Reflect | Fake Packet / Reflect / Port Capture |
| Port Restricted Cone | Direct | Direct | Fake Packet / Reflect | Fake Packet / Reflect | All signaling reflected / All media direct |
| Symmetric | Port Capture | Port Capture | Reflect / Fake Packet / Port Capture | All signaling reflected / All media direct | All signaling / media reflected |

Fig. 23

SYSTEM AND METHOD FOR CONCURRENT SESSIONS IN A PEER-TO-PEER HYBRID COMMUNICATIONS NETWORK

CROSS REFERENCE

The present application is a continuation-in-part of U.S. patent application Ser. No. 11/214,648, filed on Aug. 30, 2005, which is a continuation-in-part of U.S. patent application Ser. No. 11/081,068, filed on Mar. 15, 2005, which claims the benefit of U.S. Provisional Patent Ser. Nos. 60/583,536, filed Jun. 29, 2004, 60/628,183, filed Nov. 15, 2004, and 60/628,291, filed Nov. 17, 2004, all of which are hereby incorporated by reference.

BACKGROUND

Current packet-based communication networks may be generally divided into peer-to-peer networks and client/server networks. Traditional peer-to-peer networks support direct communication between various endpoints without the use of an intermediary device (e.g., a host or server). Each endpoint may initiate requests directly to other endpoints and respond to requests from other endpoints using credential and address information stored on each endpoint. However, because traditional peer-to-peer networks include the distribution and storage of endpoint information (e.g., addresses and credentials) throughout the network on the various insecure endpoints, such networks inherently have an increased security risk. While a client/server model addresses the security problem inherent in the peer-to-peer model by localizing the storage of credentials and address information on a server, a disadvantage of client/server networks is that the server may be unable to adequately support the number of clients that are attempting to communicate with it. As all communications (even between two clients) must pass through the server, the server can rapidly become a bottleneck in the system.

Accordingly, what is needed are a system and method that addresses these issues.

BRIEF DESCRIPTION OF THE DRAWINGS

FIG. 2c illustrates one embodiment of components within the endpoint architecture of FIG. 2b that may be used for cellular network connectivity.

FIG. 23 is a table illustrating various NAT types and illustrative embodiments of processes that may be used to traverse each NAT type within the system of FIG. 22.

DETAILED DESCRIPTION

Figure 1:
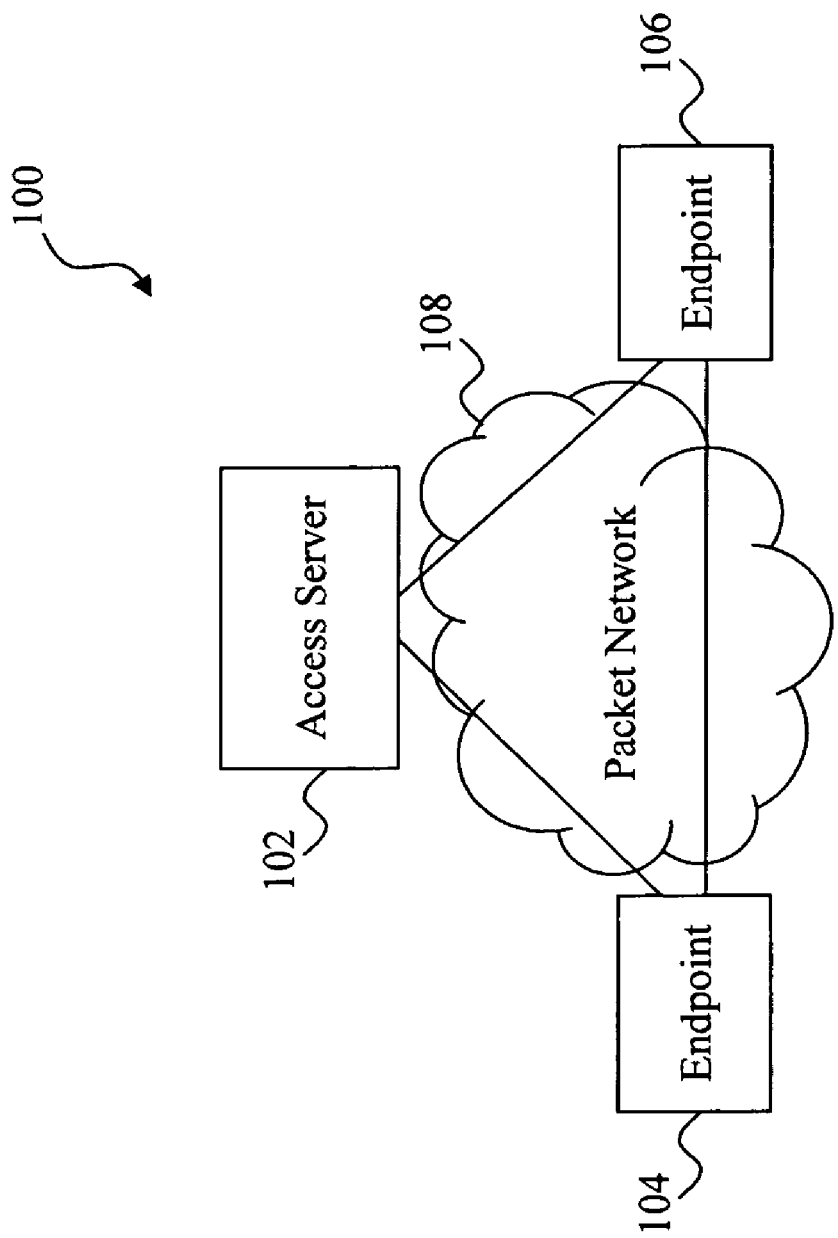
FIG. 1 is a simplified network diagram of one embodiment of a hybrid peer-to-peer system.

The present disclosure is directed to a system and method for peer-to-peer hybrid communications. It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, one embodiment of a peer-to-peer hybrid system 100 is illustrated. The system 100 includes an access server 102 that is coupled to endpoints 104 and 106 via a packet network 108. Communication between the access server 102, endpoint 104, and endpoint 106 is accomplished using predefined and publicly available (i.e., non-proprietary) communication standards or protocols (e.g., those defined by the Internet Engineering Task Force (IETF) or the International Telecommunications Union-Telecommunications Standard Sector (ITU-T)). For example, signaling communications (e.g., session setup, management, and teardown) may use a protocol such as the Session Initiation Protocol (SIP), while actual data traffic may be communicated using a protocol such as the Real-time Transport Protocol (RTP). As will be seen in the following examples, the use of standard protocols for communication enables the endpoints 104 and 106 to communicate with any device that uses the same standards. The communications may include, but are not limited to, voice calls, instant messages, audio and video, emails, and any other type of resource transfer, where a resource represents any digital data. In the following description, media traffic is generally based on the user datagram protocol (UDP), while authentication is based on the transmission control protocol/internet protocol (TCP/IP). However, it is understood that these are used for purposes of example and that other protocols may be used in addition to or instead of UDP and TCP/IP.

Connections between the access server 102, endpoint 104, and endpoint 106 may include wireline and/or wireless communication channels. In the following description, it is understood that the term "direct" means that there is no endpoint or access server in the communication channel(s) between the endpoints 104 and 106, or between either endpoint and the access server. Accordingly, the access server 102, endpoint 104, and endpoint 106 are directly connected even if other devices (e.g., routers, firewalls, and other network elements) are positioned between them. In addition, connections to endpoints, locations, or services may be subscription based, with an endpoint only having access if the endpoint has a current subscription. Furthermore, the following description may use the terms "user" and "endpoint" interchangeably, although it is understood that a user may be using any of a plurality of endpoints. Accordingly, if an endpoint logs in to the network, it is understood that the user is logging in via the endpoint and that the endpoint represents the user on the network using the user's identity.

The access server 102 stores profile information for a user, a session table to track what users are currently online, and a routing table that matches the address of an endpoint to each online user. The profile information includes a "buddy list" for each user that identifies other users ("buddies") that have previously agreed to communicate with the user. Online users on the buddy list will show up when a user logs in, and buddies who log in later will directly notify the user that they are online (as described with respect to FIG. 4). The access server 102 provides the relevant profile information and routing table to each of the endpoints 104 and 106 so that the endpoints can communicate directly with one another. Accordingly, in the present embodiment, one function of the access server 102 is to serve as a storage location for information needed by an endpoint in order to communicate with other endpoints and as a temporary storage location for requests, voicemails, etc., as will be described later in greater detail.

Figure 2A:
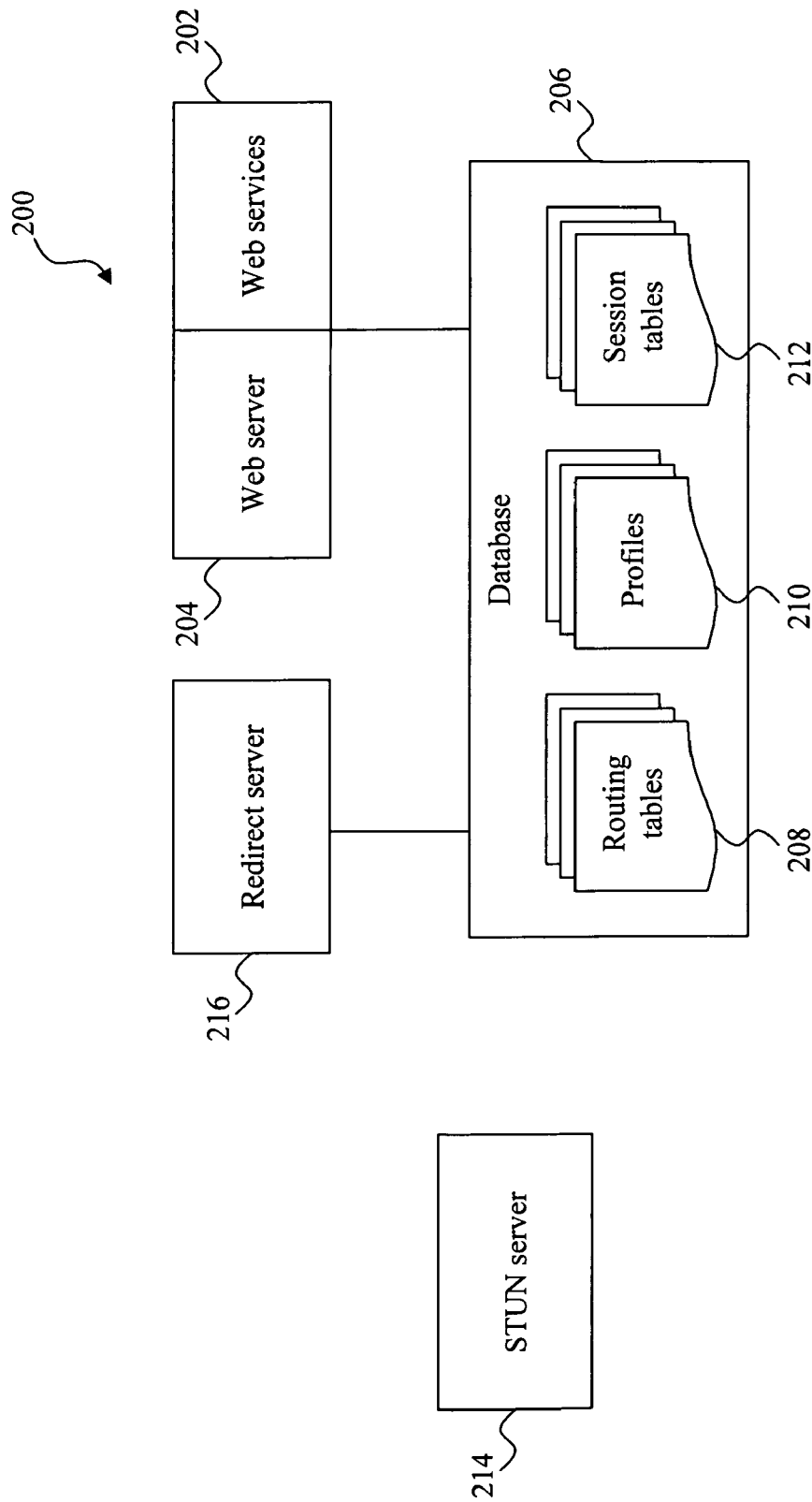
FIG. 2a illustrates one embodiment of an access server architecture that may be used within the system of FIG. 1.

With additional reference to FIG. 2*a*, one embodiment of an architecture 200 for the access server 102 of FIG. 1 is illustrated. The architecture 200 includes functionality that may be provided by hardware and/or software, and that may be combined into a single hardware platform or distributed among multiple hardware platforms. For purposes of illustration, the access server in the following examples is described as a single device, but it is understood that the term applies equally to any type of environment (including a distributed environment) in which at least a portion of the functionality attributed to the access server is present.

In the present example, the architecture includes web services 202 (e.g., based on functionality provided by XML, SOAP, .NET, MONO), web server 204 (using, for example, Apache or IIS), and database 206 (using, for example, mySQL or SQLServer) for storing and retrieving routing tables 208, profiles 210, and one or more session tables 212. Functionality for a STUN (Simple Traversal of UDP through NATs (Network Address Translation)) server 214 is also present in the architecture 200. As is known, STUN is a protocol for assisting devices that are behind a NAT firewall or router with their packet routing. The architecture 200 may also include a redirect server 216 for handling requests originating outside of the system 100. One or both of the STUN server 214 and redirect server 216 may be incorporated into the access server 102 or may be a standalone device. In the present embodiment, both the server 204 and the redirect server 216 are coupled to the database 206.

Figure 2B:
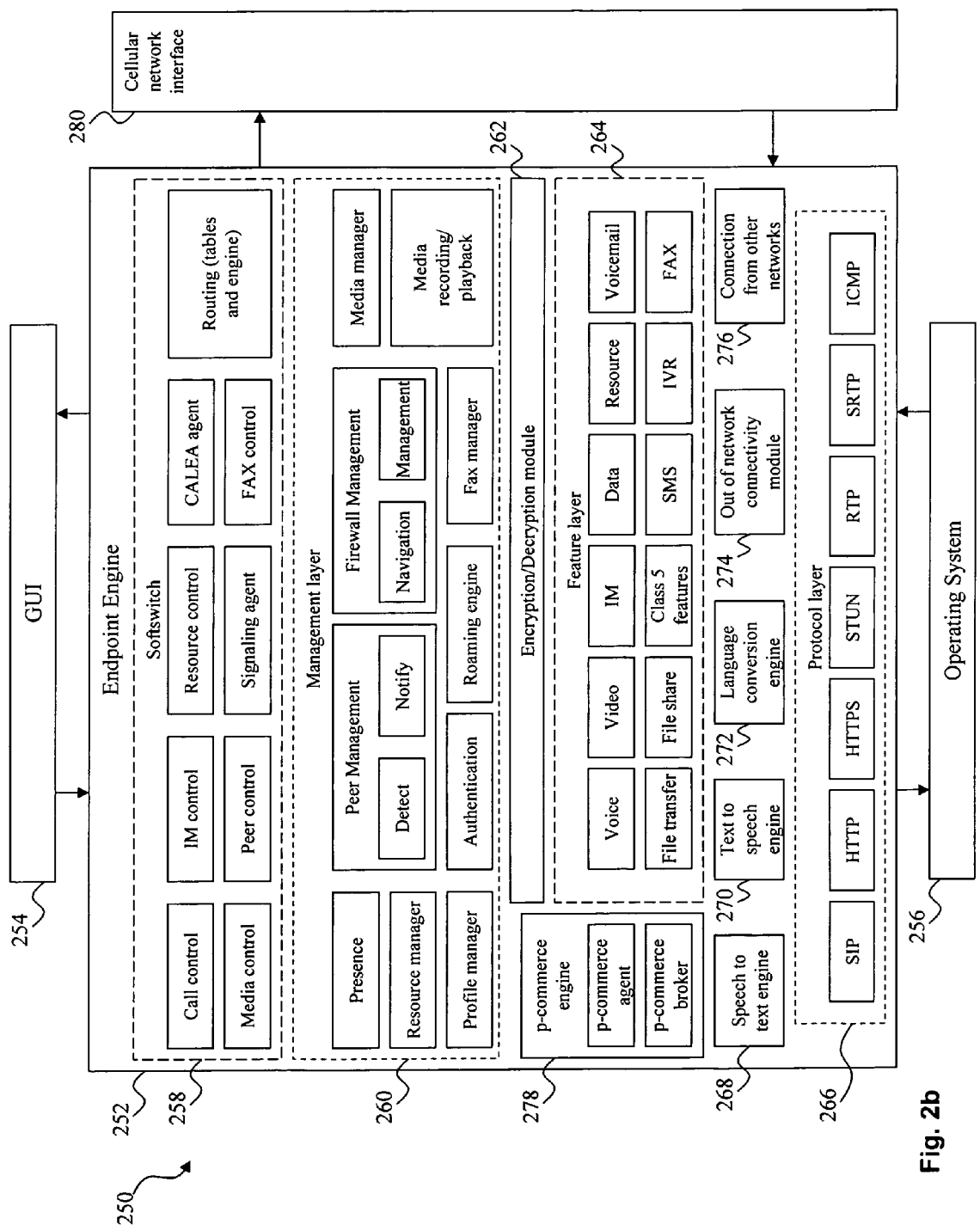
FIG. 2b illustrates one embodiment of an endpoint architecture that may be used within the system of FIG. 1.

Referring to FIG. 2*b*, one embodiment of an architecture 250 for the endpoint 104 (which may be similar or identical to the endpoint 106) of FIG. 1 is illustrated. It is understood that that term "endpoint" may refer to many different devices having some or all of the described functionality, including a computer, a VoIP telephone, a personal digital assistant, a cellular phone, or any other device having an IP stack upon which the needed protocols may be run. The architecture 250 includes an endpoint engine 252 positioned between a graphical user interface (GUI) 254 and an operating system 256. The GUI 254 provides user access to the endpoint engine 252, while the operating system 256 provides underlying functionality, as is known to those of skill in the art.

The endpoint engine 252 may include multiple components and layers that support the functionality required to perform the operations of the endpoint 104. For example, the endpoint engine 252 includes a softswitch 258, a management layer 260, an encryption/decryption module 262, a feature layer 264, a protocol layer 266, a speech-to-text engine 268, a text-to-speech engine 270, a language conversion engine 272, an out-of-network connectivity module 274, a connection from other networks module 276, a p-commerce (e.g., peer commerce) engine 278 that includes a p-commerce agent and a p-commerce broker, and a cellular network interface module 280.

Each of these components/layers may be further divided into multiple modules. For example, the softswitch 258 includes a call control module, an instant messaging (IM) control module, a resource control module, a CALEA (Communications Assistance to Law Enforcement Act) agent, a media control module, a peer control module, a signaling agent, a fax control module, and a routing module.

The management layer 260 includes modules for presence (i.e., network presence), peer management (detecting peers and notifying peers of being online), firewall management (navigation and management), media management, resource management, profile management, authentication, roaming, fax management, and media playback/recording management.

The encryption/decryption module 262 provides encryption for outgoing packets and decryption for incoming packets. In the present example, the encryption/decryption module 262 provides application level encryption at the source, rather than at the network. However, it is understood that the encryption/decryption module 262 may provide encryption at the network in some embodiments.

The feature layer 264 provides support for various features such as voice, video, IM, data, voicemail, file transfer, file sharing, class 5 features, short message service (SMS), interactive voice response (IVR), faxes, and other resources. The protocol layer 266 includes protocols supported by the endpoint, including SIP, HTTP, HTTPS, STUN, RTP, SRTP, and ICMP. It is understood that these are examples only, and that fewer or more protocols may be supported.

The speech-to-text engine 268 converts speech received by the endpoint (e.g., via a microphone or network) into text, the text-to-speech engine 270 converts text received by the endpoint into speech (e.g., for output via a speaker), and the language conversion engine 272 may be configured to convert inbound or outbound information (text or speech) from one language to another language. The out-of-network connectivity module 274 may be used to handle connections between the endpoint and external devices (as described with respect to FIG. 12), and the connection from other networks module 276 handles incoming connection attempts from external devices. The cellular network interface module 280 may be used to interact with a wireless network.

With additional reference to FIG. 2c, the cellular network interface module 280 is illustrated in greater detail. Although not shown in FIG. 2b, the softswitch 258 of the endpoint architecture 250 includes a cellular network interface for communication with the cellular network interface module 280. In addition, the cellular network interface module 280 includes various components such as a call control module, a signaling agent, a media manager, a protocol stack, and a device interface. It is noted that these components may correspond to layers within the endpoint architecture 250 and may be incorporated directly into the endpoint architecture in some embodiments.

Figure 2E:
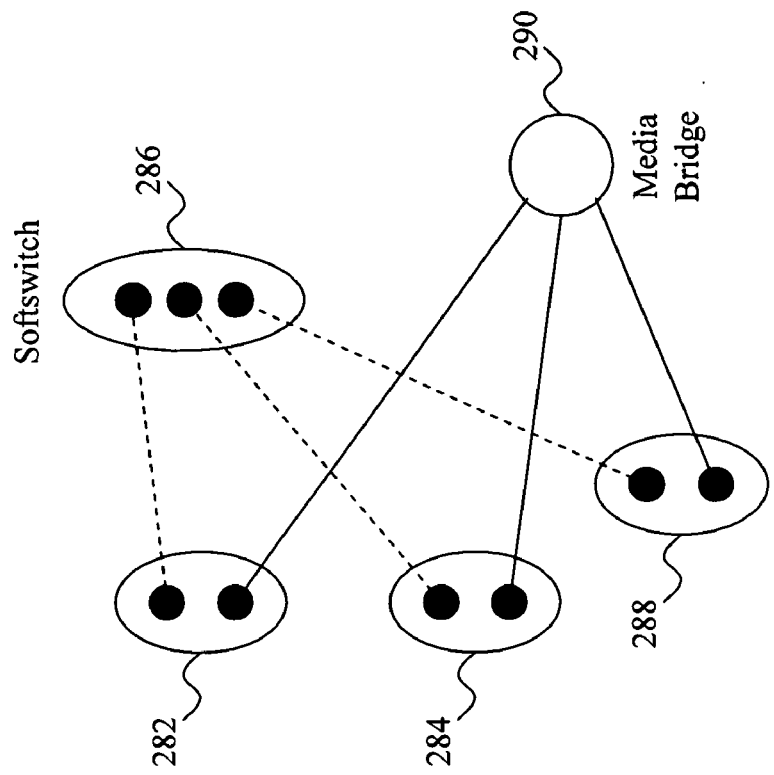
FIG. 2e illustrates a traditional softswitch configuration with three endpoints and a media bridge.
Figure 2D:
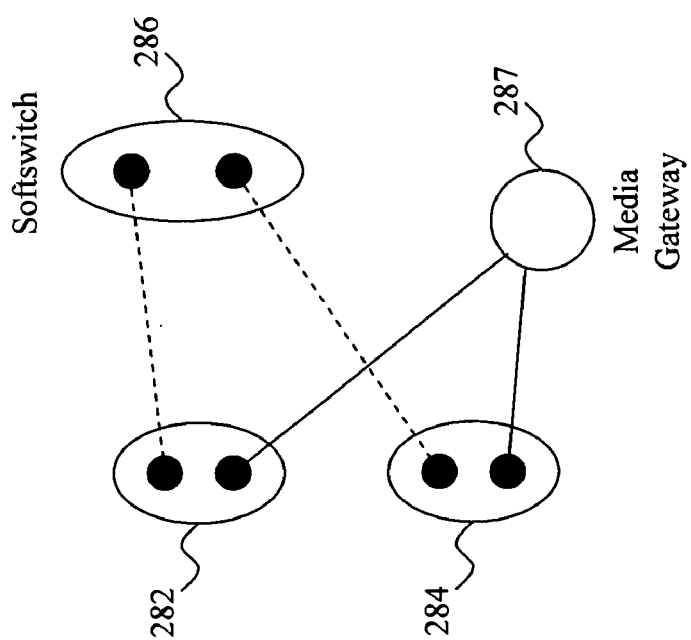
FIG. 2d illustrates a traditional softswitch configuration with two endpoints.

Referring to FIG. 2d, a traditional softswitch architecture is illustrated with two endpoints 282 and 284, neither of which includes a softswitch. In the present example, an external softswitch 286 maintains a first signaling leg (dotted line) with the endpoint 282 and a second signaling leg (dotted line) with the endpoint 284. The softswitch 286 links the two legs to pass signaling information between the endpoints 282 and 284. Media traffic (solid lines) may be transferred between the endpoints 282 and 284 via a media gateway 287.

With additional reference to FIG. 2e, the traditional softswitch architecture of FIG. 2d is illustrated with a third endpoint 288 that also does not include a softswitch. The external softswitch 286 now maintains a third signaling leg (dotted line) with the endpoint 288. In the present example, a conference call is underway. However, as none of the endpoints includes a softswitch, a media bridge 290 connected to each endpoint is needed for media traffic. Accordingly, each endpoint has at most two concurrent connections—one with the softswitch for signaling and another with the media bridge for media traffic.

Figure 2G:
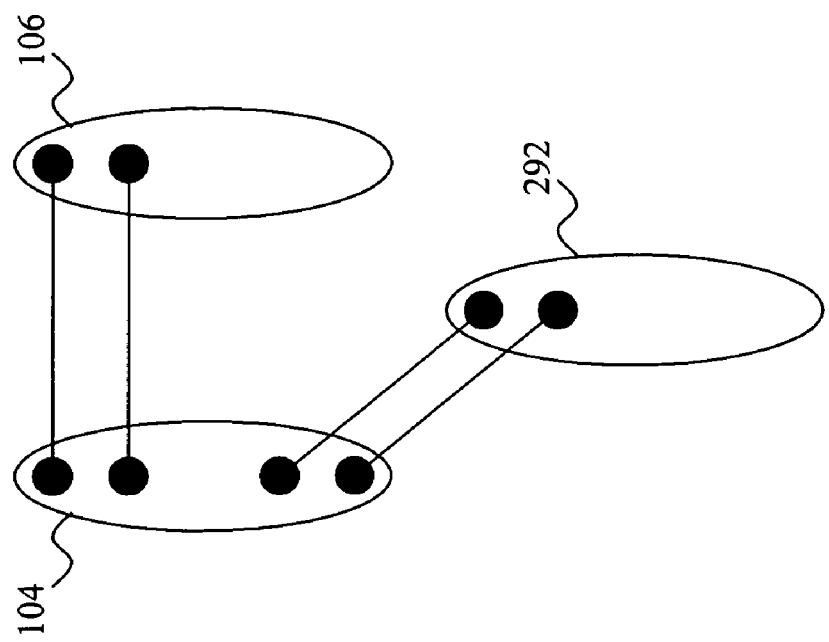
FIG. 2g illustrates one embodiment of the present disclosure with three endpoints, each of which includes a softswitch.
Figure 2F:
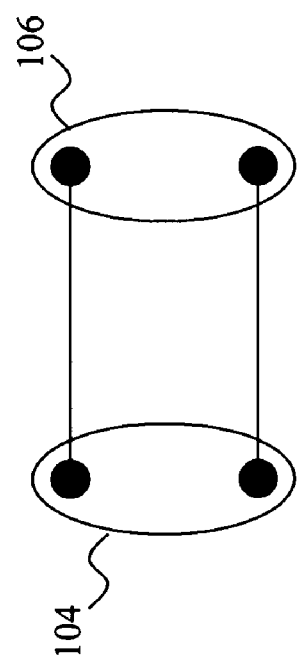
FIG. 2f illustrates one embodiment of the present disclosure with two endpoints, each of which includes a softswitch.

Referring to FIG. 2f, in one embodiment, unlike the traditional architecture of FIGS. 2d and 2e, two endpoints (e.g., the endpoints 104 and 106 of FIG. 1) each include a softswitch (e.g., the softswitch 258 of FIG. 2b). Each endpoint is able to establish and maintain both signaling and media traffic connections (both virtual and physical legs) with the other endpoint. Accordingly, no external softswitch is needed, as this model uses a distributed softswitch method to handle communications directly between the endpoints.

With additional reference to FIG. 2g, the endpoints 104 and 106 are illustrated with another endpoint 292 that also contains a softswitch. In this example, a conference call is underway with the endpoint 104 acting as the host. To accomplish this, the softswitch contained in the endpoint 104 enables the endpoint 104 to support direct signaling and media traffic connections with the endpoint 292. The endpoint 104 can then forward media traffic from the endpoint 106 to the endpoint 292 and vice versa. Accordingly, the endpoint 104 may support multiple connections to multiple endpoints and, as in FIG. 2f, no external softswitch is needed.

Referring again to FIG. 2b, in operation, the softswitch 258 uses functionality provided by underlying layers to handle connections with other endpoints and the access server 102, and to handle services needed by the endpoint 104. For example, as is described below in greater detail with respect to FIGS. 3a and 3b, incoming and outgoing calls may utilize multiple components within the endpoint architecture 250.

Figure 3A:
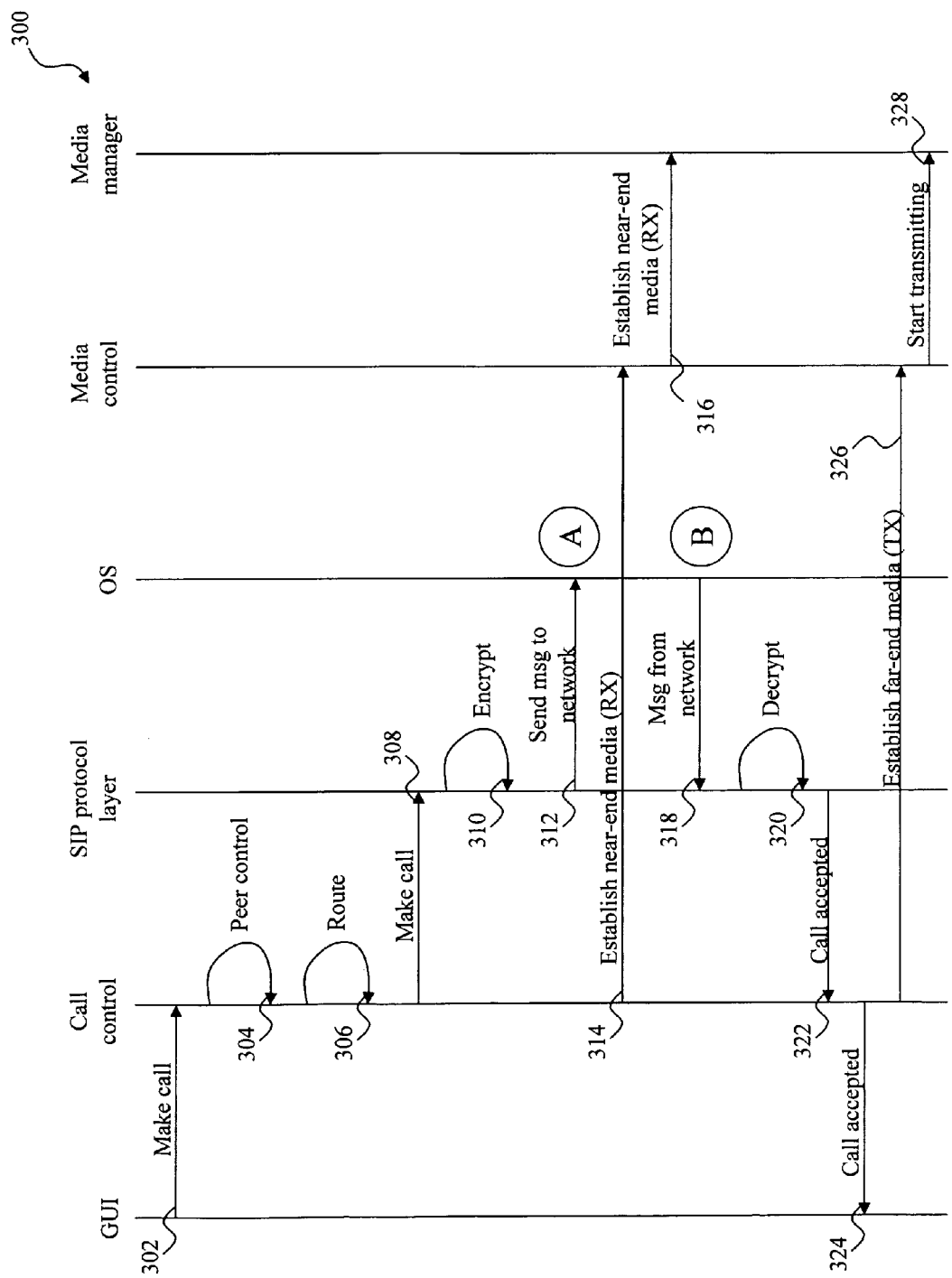
FIG. 3a is a sequence diagram illustrating the interaction of various components of FIG. 2b when placing a call.

Referring to FIG. 3a, a sequence diagram 300 illustrates an exemplary process by which the endpoint 104 may initiate a call to the endpoint 106 using various components of the architecture 250. Prior to step 302, a user (not shown) initiates a call via the GUI 254. In step 302, the GUI 254 passes a message to the call control module (of the softswitch 258) to make the call. The call control module contacts the peer control module (softswitch 258) in step 304, which detects the peer (if not already done), goes to the routing table (softswitch 258) for the routing information, and performs similar operations. It is understood that not all interactions are illustrated. For example, the peer control module may utilize the peer management module (of the management layer 260) for the peer detection. The call control module then identifies a route for the call in step 306, and sends message to the SIP protocol layer (of the protocol layer 266) to make the call in step 308. In step 310, the outbound message is encrypted (using the encryption/decryption module 262) and the message is sent to the network via the OS 256 in step 312.

After the message is sent and prior to receiving a response, the call control module instructs the media control module (softswitch 258) to establish the needed near-end media in step 314. The media control module passes the instruction to the media manager (of the management layer 260) in step 316, which handles the establishment of the near-end media.

Figure 3B:
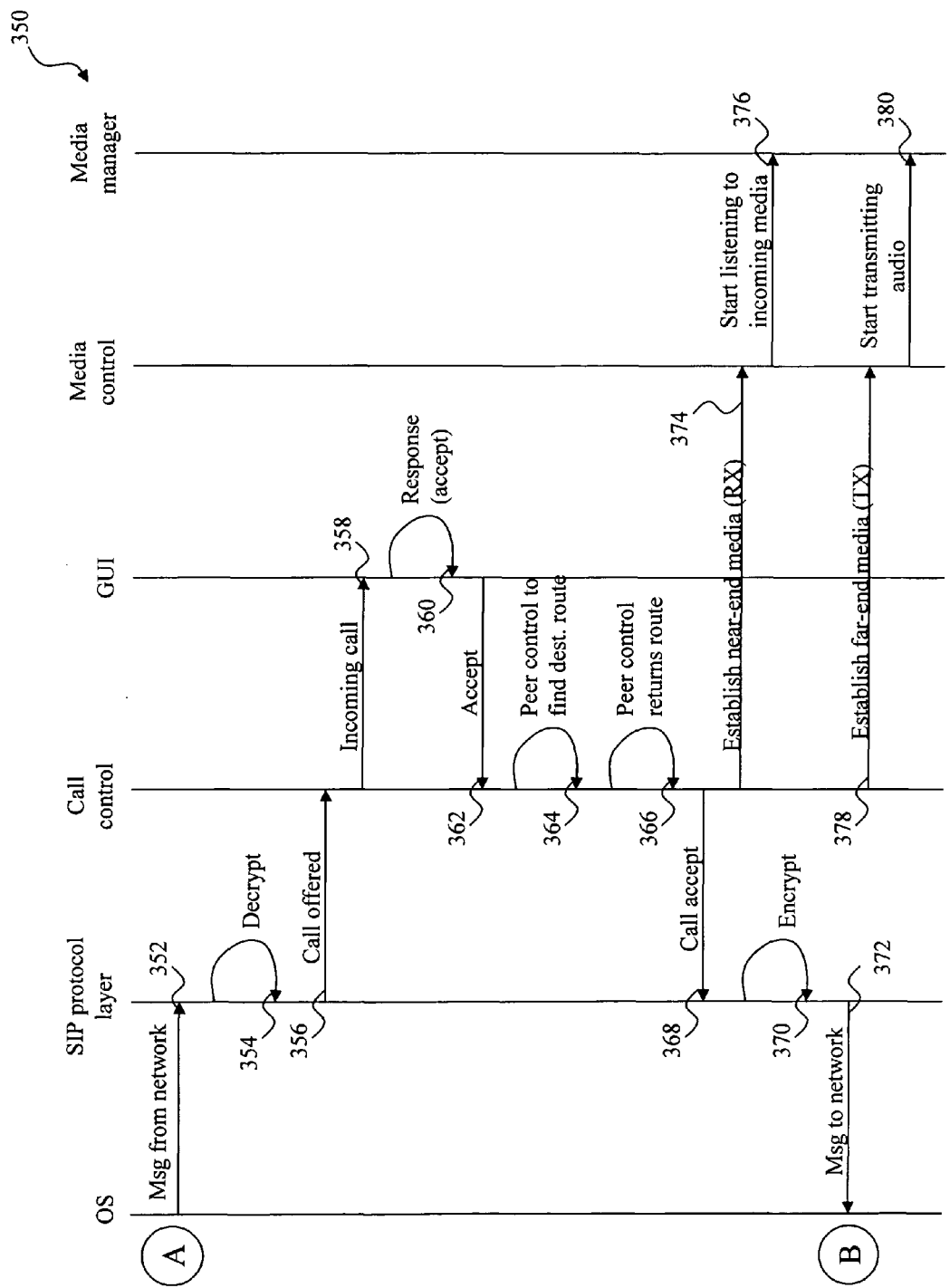
FIG. 3b is a sequence diagram illustrating the interaction of various components of FIG. 2b when receiving a call.

With additional reference to FIG. 3b, the message sent by the endpoint 104 in step 312 (FIG. 3a) is received by the endpoint 106 and passed from the OS to the SIP protocol layer in step 352. The message is decrypted in step 354 and the call is offered to the call control module in step 356. The call control module notifies the GUI of an incoming call in step 358 and the GUI receives input identifying whether the call is accepted or rejected (e.g., by a user) in step 360. In the present example, the call is accepted and the GUI passes the acceptance to the call control module in step 362. The call control module contacts the peer control module in step 364, which identifies a route to the calling endpoint and returns the route to the call control module in step 366. In steps 368 and 370, the call control module informs the SIP protocol layer that the call has been accepted and the message is encrypted using the encryption/decryption module. The acceptance message is then sent to the network via the OS in step 372.

In the present example, after the call control module passes the acceptance message to the SIP protocol layer, other steps may occur to prepare the endpoint 106 for the call. For example, the call control module instructs the media control module to establish near-end media in step 374, and the media control module instructs the media manager to start listening to incoming media in step 376. The call control module also instructs the media control module to establish far-end media (step 378), and the media control module instructs the media manager to start transmitting audio in step 380.

Returning to FIG. 3a, the message sent by the endpoint 106 (step 372) is received by the OS and passed on to the SIP protocol layer in step 318 and decrypted in step 320. The message (indicating that the call has been accepted) is passed to the call control module in step 322 and from there to the GUI in step 324. The call control module then instructs the media control module to establish far-end media in step 326, and the media control module instructs the media manager to start transmitting audio in step 328.

The following figures are sequence diagrams that illustrate various exemplary functions and operations by which the access server 102 and the endpoints 104 and 106 may communicate. It is understood that these diagrams are not exhaustive and that various steps may be excluded from the diagrams to clarify the aspect being described.

Figure 4:
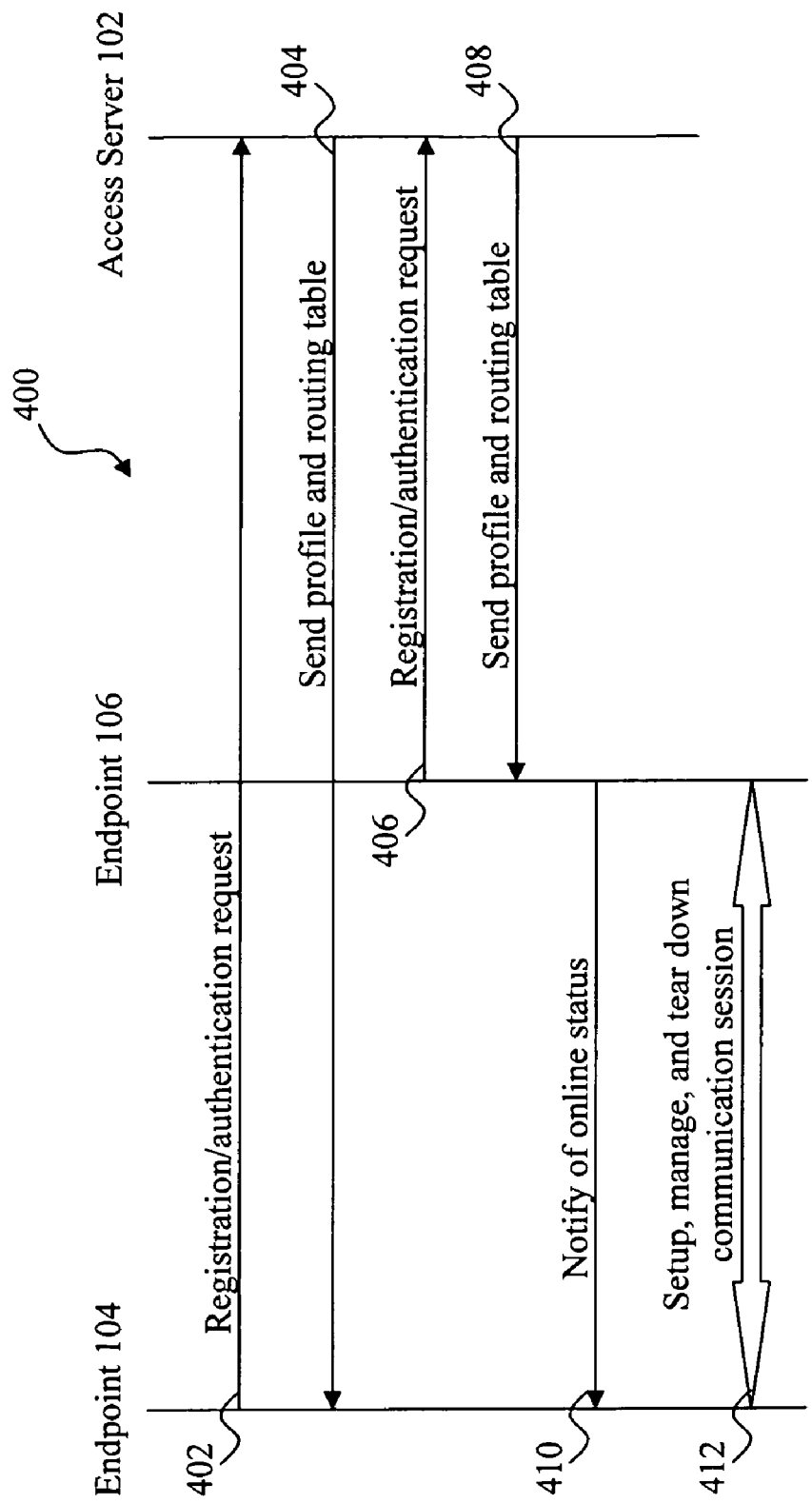
FIG. 4 is a sequence diagram illustrating an exemplary process by which an endpoint of FIG. 1 may be authenticated and communicate with another endpoint.

Referring to FIG. 4 (and using the endpoint 104 as an example), a sequence diagram 400 illustrates an exemplary process by which the endpoint 104 may authenticate with the access server 102 and then communicate with the endpoint 106. As will be described, after authentication, all communication (both signaling and media traffic) between the endpoints 104 and 106 occurs directly without any intervention by the access server 102. In the present example, it is understood that neither endpoint is online at the beginning of the sequence, and that the endpoints 104 and 106 are "buddies." As described above, buddies are endpoints that have both previously agreed to communicate with one another.

In step 402, the endpoint 104 sends a registration and/or authentication request message to the access server 102. If the endpoint 104 is not registered with the access server 102, the access server will receive the registration request (e.g., user ID, password, and email address) and will create a profile for the endpoint (not shown). The user ID and password will then be used to authenticate the endpoint 104 during later logins. It is understood that the user ID and password may enable the user to authenticate from any endpoint, rather than only the endpoint 104.

Upon authentication, the access server 102 updates a session table residing on the server to indicate that the user ID currently associated with the endpoint 104 is online. The access server 102 also retrieves a buddy list associated with the user ID currently used by the endpoint 104 and identifies which of the buddies (if any) are online using the session table. As the endpoint 106 is currently offline, the buddy list will reflect this status. The access server 102 then sends the profile information (e.g., the buddy list) and a routing table to the endpoint 104 in step 404. The routing table contains address information for online members of the buddy list. It is understood that steps 402 and 404 represent a make and break connection that is broken after the endpoint 104 receives the profile information and routing table.

In steps 406 and 408, the endpoint 106 and access server 102 repeat steps 402 and 404 as described for the endpoint 104. However, because the endpoint 104 is online when the endpoint 106 is authenticated, the profile information sent to the endpoint 106 will reflect the online status of the endpoint 104 and the routing table will identify how to directly contact it. Accordingly, in step 410, the endpoint 106 sends a message directly to the endpoint 104 to notify the endpoint 104 that the endpoint 106 is now online. This also provides the endpoint 104 with the address information needed to communicate directly with the endpoint 106. In step 412, one or more communication sessions may be established directly between the endpoints 104 and 106.

Figure 5:
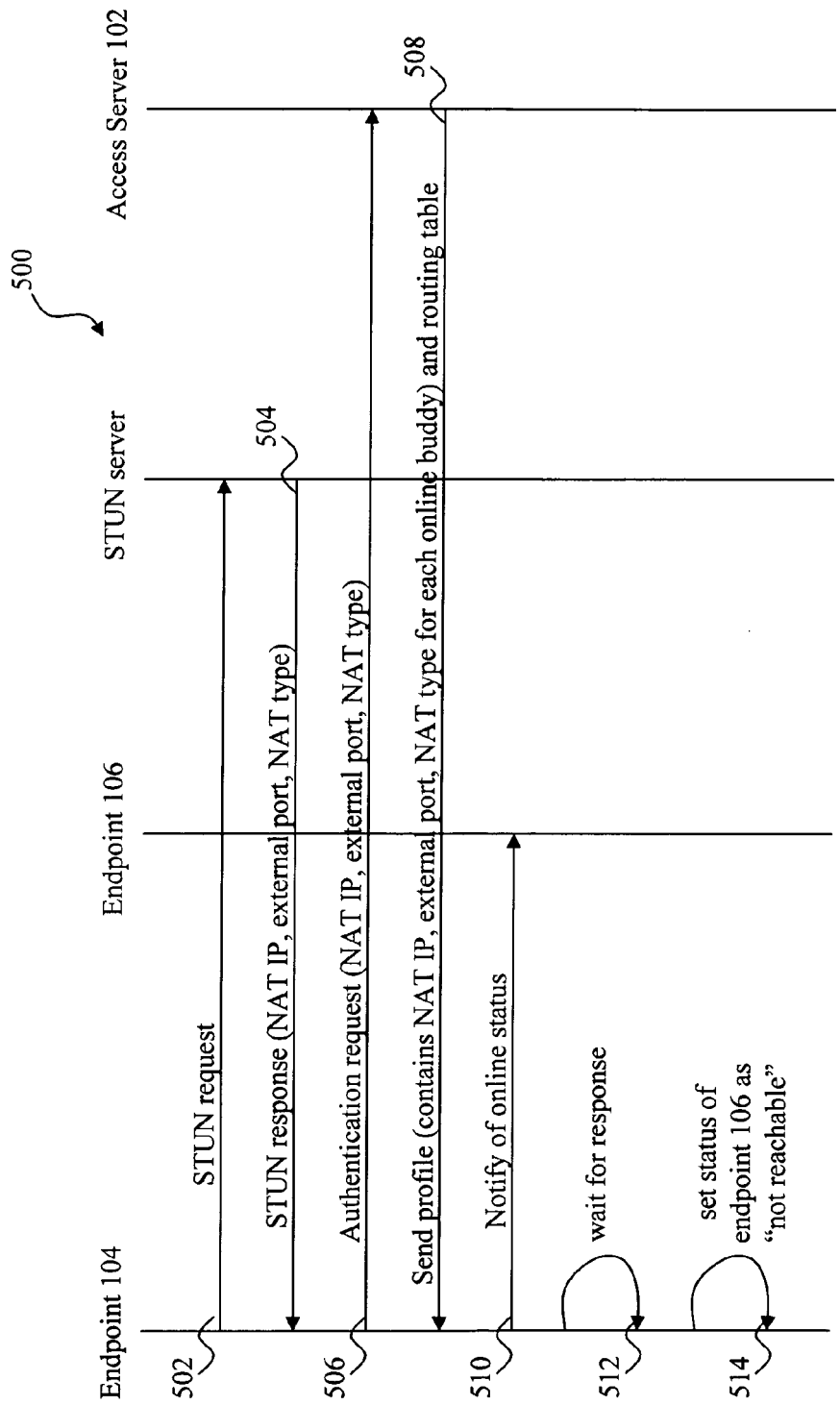
FIG. 5 is a sequence diagram illustrating an exemplary process by which an endpoint of FIG. 1 may determine the status of another endpoint.

Referring to FIG. 5, a sequence diagram 500 illustrates an exemplary process by which authentication of an endpoint (e.g., the endpoint 104) may occur. In addition, after authentication, the endpoint 104 may determine whether it can communicate with the endpoint 106. In the present example, the endpoint 106 is online when the sequence begins.

In step 502, the endpoint 104 sends a request to the STUN server 214 of FIG. 2. As is known, the STUN server determines an outbound IP address (e.g., the external address of a device (i.e., a firewall, router, etc.) behind which the endpoint 104 is located), an external port, and a type of NAT used by the device. The type of NAT may be, for example, full cone, restricted cone, port restricted cone, or symmetric, each of which is discussed later in greater detail with respect to FIG. 22. The STUN server 214 sends a STUN response back to the endpoint 104 in step 504 with the collected information about the endpoint 104.

In step 506, the endpoint 104 sends an authentication request to the access server 102. The request contains the information about endpoint 104 received from the STUN server 214. In step 508, the access server 102 responds to the request by sending the relevant profile and routing table to the endpoint 104. The profile contains the external IP address, port, and NAT type for each of the buddies that are online.

In step 510, the endpoint 104 sends a message to notify the endpoint 106 of its online status (as the endpoint 106 is already online) and, in step 512, the endpoint 104 waits for a response. After the expiration of a timeout period within which no response is received from the endpoint 106, the endpoint 104 will change the status of the endpoint 106 from "online" (as indicated by the downloaded profile information) to "unreachable." The status of a buddy may be indicated on a visual buddy list by the color of an icon associated with each buddy. For example, when logging in, online buddies may be denoted by a blue icon and offline buddies may be denoted by a red icon. If a response to a notify message is received for a buddy, the icon representing that buddy may be changed from blue to green to denote the buddy's online status. If no response is received, the icon remains blue to indicate that the buddy is unreachable. Although not shown, a message sent from the endpoint 106 and received by the endpoint 104 after step 514 would indicate that the endpoint 106 is now reachable and would cause the endpoint 104 to change the status of the endpoint 106 to online. Similarly, if the endpoint 104 later sends a message to the endpoint 106 and receives a response, then the endpoint 104 would change the status of the endpoint 106 to online.

It is understood that other embodiments may implement alternate NAT traversal techniques. For example, a single payload technique may be used in which TCP/IP packets are used to traverse a UDP restricted firewall or router. Another example includes the use of a double payload in which a UDP packet is inserted into a TCP/IP packet. Furthermore, it is understood that protocols other than STUN may be used. For example, protocols such as Internet Connectivity Establishment (ICE) or Traversal Using Relay NAT (TURN) may be used.

Figure 6:
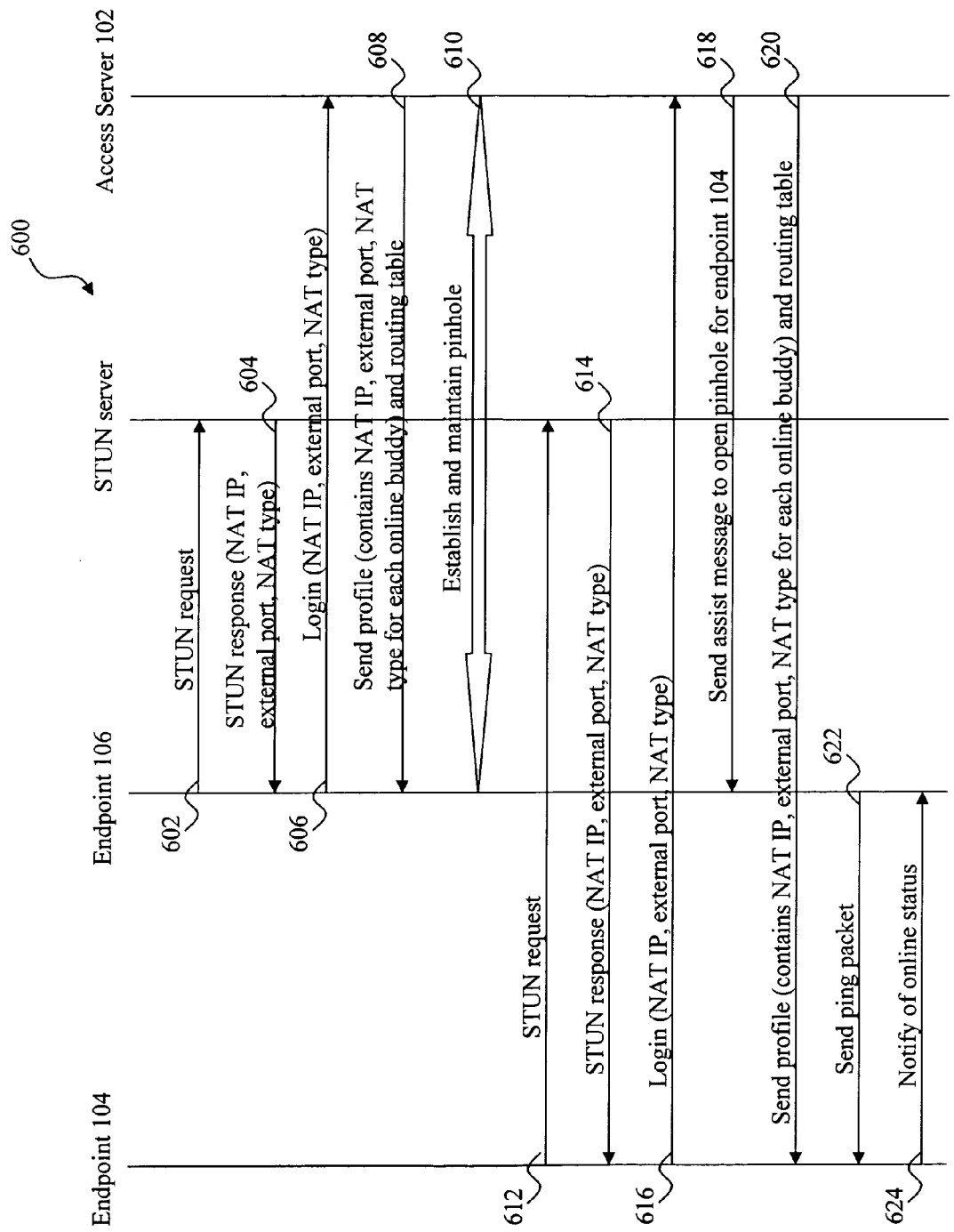
FIG. 6 is a sequence diagram illustrating an exemplary process by which an access server of FIG. 1 may aid an endpoint in establishing communications with another endpoint.

Referring to FIG. 6, a sequence diagram 600 illustrates an exemplary process by which the access server 102 may aid the endpoint 104 in establishing communications with the endpoint 106 (which is a buddy). After rendering aid, the access server 102 is no longer involved and the endpoints may communicate directly. In the present example, the endpoint 106 is behind a NAT device that will only let a message in (towards the endpoint 106) if the endpoint 106 has sent a message out. Unless this process is bypassed, the endpoint 104 will be unable to connect to the endpoint 106. For example, the endpoint 104 will be unable to notify the endpoint 106 that it is now online.

In step 602, the endpoint 106 sends a request to the STUN server 214 of FIG. 2. As described previously, the STUN server determines an outbound IP address, an external port, and a type of NAT for the endpoint 106. The STUN server 214 sends a STUN response back to the endpoint 106 in step 604 with the collected information about the endpoint 106. In step 606, the endpoint 106 sends an authentication request to the access server 102. The request contains the information about endpoint 106 received from the STUN server 214. In step 608, the access server 102 responds to the request by sending the relevant profile and routing table to the endpoint 106. In the present example, the access server 102 identifies the NAT type associated with the endpoint 106 as being a type that requires an outbound packet to be sent before an inbound packet is allowed to enter. Accordingly, the access server 102 instructs the endpoint 106 to send periodic messages to the access server 102 to establish and maintain a pinhole through the NAT device. For example, the endpoint 106 may send a message prior to the timeout period of the NAT device in order to reset the timeout period. In this manner, the pinhole may be kept open indefinitely.

In steps 612 and 614, the endpoint 104 sends a STUN request to the STUN server 214 and the STUN server responds as previously described. In step 616, the endpoint 104 sends an authentication request to the access server 102. The access server 102 retrieves the buddy list for the endpoint 104 and identifies the endpoint 106 as being associated with a NAT type that will block communications from the endpoint 104. Accordingly, in step 618, the access server 102 sends an assist message to the endpoint 106. The assist message instructs the endpoint 106 to send a message to the endpoint 104, which opens a pinhole in the NAT device for the endpoint 104. For security purposes, as the access server 102 has the STUN information for the endpoint 104, the pinhole opened by the endpoint 106 may be specifically limited to the endpoint associated with the STUN information. Furthermore, the access server 102 may not request such a pinhole for an endpoint that is not on the buddy list of the endpoint 106.

The access server 104 sends the profile and routing table to the endpoint 104 in step 620. In step 622, the endpoint 106 sends a message (e.g., a ping packet) to the endpoint 104. The endpoint 104 may then respond to the message and notify the endpoint 106 that it is now online. If the endpoint 106 does not receive a reply from the endpoint 104 within a predefined period of time, it may close the pinhole (which may occur simply by not sending another message and letting the pinhole time out). Accordingly, the difficulty presented by the NAT device may be overcome using the assist message, and communications between the two endpoints may then occur without intervention by the access server 102.

Figure 7:
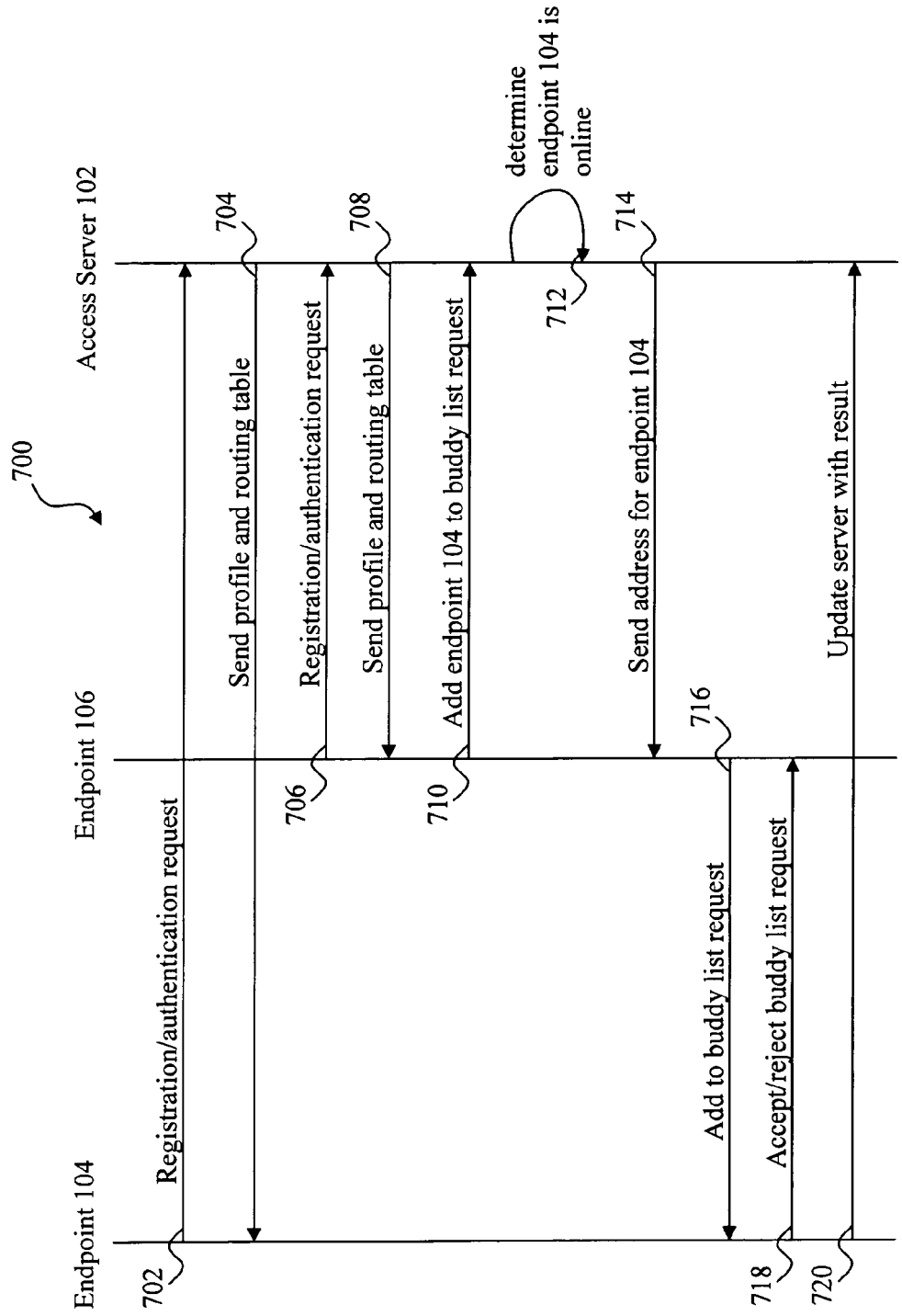
FIG. 7 is a sequence diagram illustrating an exemplary process by which an endpoint of FIG. 1 may request that it be added to the buddy list of another endpoint that is currently online.

Referring to FIG. 7, a sequence diagram 700 illustrates an exemplary process by which the endpoint 106 may request that it be added to the endpoint 104's buddy list. In the present example, the endpoints 104 and 106 both remain online during the entire process.

In step 702, the endpoint 104 sends a registration and/or authentication request message to the access server 102 as described previously. Upon authentication, the access server 102 updates a session table residing on the server to indicate that the user ID currently associated with the endpoint 104 is online. The access server 102 also retrieves a buddy list associated with the user ID currently used by the endpoint 104 and identifies which of the buddies (if any) are online using the session table. As the endpoint 106 is not currently on the buddy list, it will not be present. The access server 102 then sends the profile information and a routing table to the endpoint 104 in step 704.

In steps 706 and 708, the endpoint 106 and access server 102 repeat steps 702 and 704 as described for the endpoint 104. The profile information sent by the access server 102 to the endpoint 106 will not include the endpoint 104 because the two endpoints are not buddies.

In step 710, the endpoint 106 sends a message to the access server 102 requesting that the endpoint 104 be added to its buddy list. The access server 102 determines that the endpoint 104 is online (e.g., using the session table) in step 712 and sends the address for the endpoint 104 to the endpoint 106 in step 714. In step 716, the endpoint 106 sends a message directly to the endpoint 104 requesting that the endpoint 106 be added to its buddy list. The endpoint 104 responds to the endpoint 106 in step 718 with either permission or a denial, and the endpoint 104 also updates the access server 102 with the response in step 720. For example, if the response grants permission, then the endpoint 104 informs the access server 102 so that the access server can modify the profile of both endpoints to reflect the new relationship. It is understood that various other actions may be taken. For example, if the endpoint 104 denies the request, then the access server 102 may not respond to another request by the endpoint 106 (with respect to the endpoint 104) until a period of time has elapsed.

It is understood that many different operations may be performed with respect to a buddy list. For example, buddies may be deleted, blocked/unblocked, buddy status may be updated, and a buddy profile may be updated. For block/unblock, as well as status and profile updates, a message is first sent to the access server 102 by the endpoint requesting the action (e.g., the endpoint 104). Following the access server 102 update, the endpoint 104 sends a message to the peer being affected by the action (e.g., the endpoint 106).

Buddy deletion may be handled as follows. If the user of the endpoint 104 wants to delete a contact on a buddy list currently associated with the online endpoint 106, the endpoint 104 will first notify the access server 102 that the buddy is being deleted. The access server 102 then updates the profile of both users so that neither buddy list shows the other user as a buddy. Note that, in this instance, a unilateral action by one user will alter the profile of the other user. The endpoint 104 then sends a message directly to the endpoint 106 to remove the buddy (the user of the endpoint 104) from the buddy list of the user of endpoint 106 in real time. Accordingly, even though the user is online at endpoint 106, the user of the endpoint 104 will be removed from the buddy list of the endpoint 106

Figure 8:
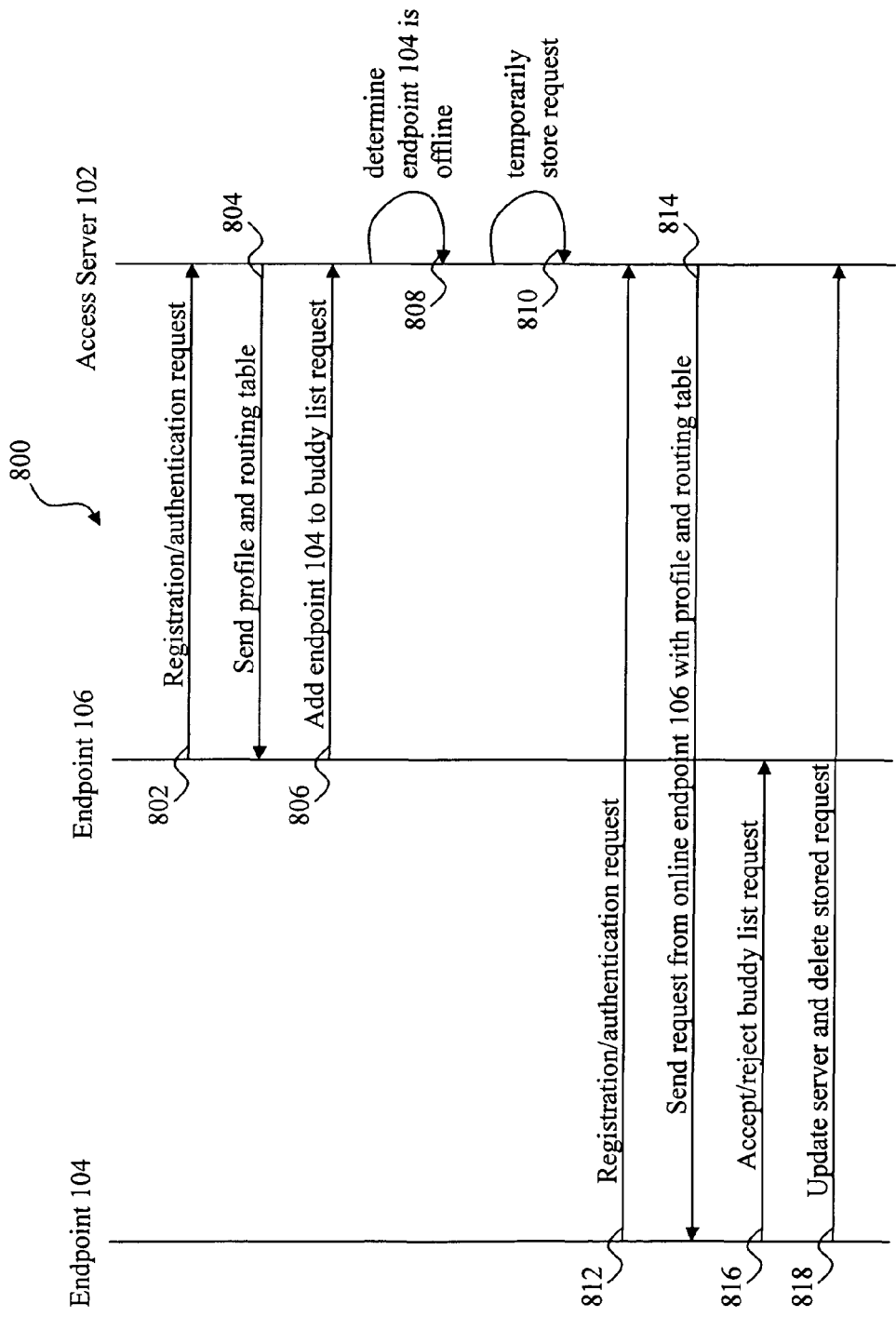
FIG. 8 is a sequence diagram illustrating an exemplary process by which an endpoint of FIG. 1 may request that it be added to the buddy list of another endpoint that is currently offline.

Referring to FIG. 8, a sequence diagram 800 illustrates an exemplary process by which the endpoint 106 may request that it be added to the endpoint 104's buddy list. In the present example, the endpoint 104 is not online until after the endpoint 106 has made its request.

In step 802, the endpoint 106 sends a registration and/or authentication request message to the access server 102 as described previously. Upon authentication, the access server 102 updates a session table residing on the server to indicate that the user ID currently associated with the endpoint 106 is online. The access server 102 also retrieves a buddy list associated with the user ID currently used by the endpoint 106 and identifies which of the buddies (if any) are online using the session table. The access server 102 then sends the profile information and a routing table to the endpoint 106 in step 804.

In step 806, the endpoint 106 sends a message to the access server 102 requesting that the endpoint 104 be added to its buddy list. The access server 102 determines that the endpoint 104 is offline in step 808 and temporarily stores the request message in step 810. In steps 812 and 814, the endpoint 104 and access server 102 repeat steps 802 and 804 as described for the endpoint 106. However, when the access server 102 sends the profile information and routing table to the endpoint 104, it also sends the request by the endpoint 106 (including address information for the endpoint 106).

In step 816, the endpoint 104 responds directly to the endpoint 106 with either permission or a denial. The endpoint 104 then updates the access server 102 with the result of the response in step 818 and also instructs the access server to delete the temporarily stored request.

Figure 9:
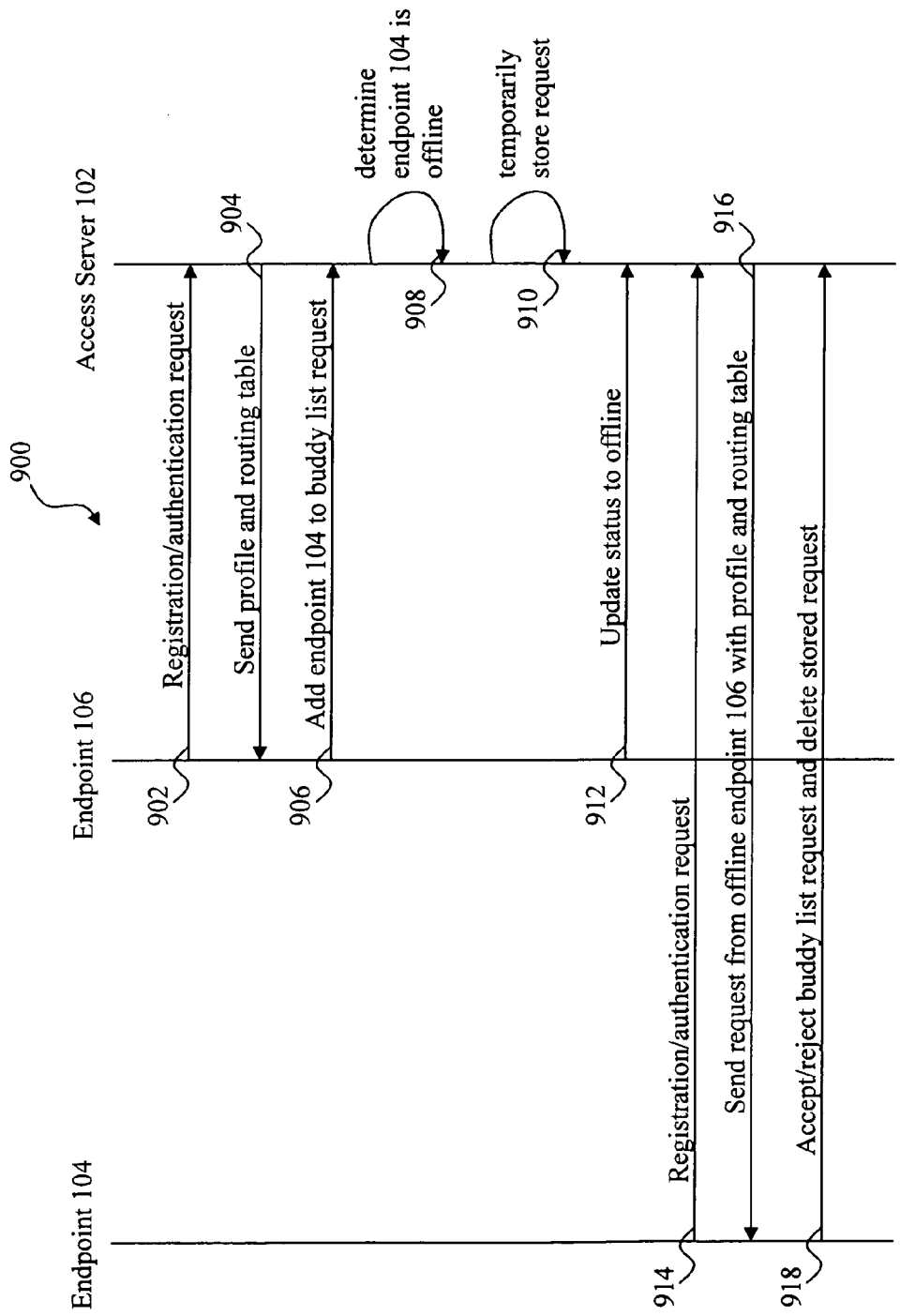
FIG. 9 is a sequence diagram illustrating an exemplary process by which an endpoint of FIG. 1 may request that it be added to the buddy list of another endpoint that is currently offline before it too goes offline.

Referring to FIG. 9, a sequence diagram 900 illustrates an exemplary process by which the endpoint 106 may request that it be added to the endpoint 104's buddy list. In the present example, the endpoint 104 is not online until after the endpoint 106 has made its request, and the endpoint 106 is not online to receive the response by endpoint 104.

In step 902, the endpoint 106 sends a registration and/or authentication request message to the access server 102 as described previously. Upon authentication, the access server 102 updates a session table residing on the server to indicate that the user ID currently associated with the endpoint 106 is online. The access server 102 also retrieves a buddy list associated with the user ID currently used by the endpoint 106 and identifies which of the buddies (if any) are online using the session table. The access server 102 then sends the profile information and a routing table to the endpoint 106 in step 904.

In step 906, the endpoint 106 sends a message to the access server 102 requesting that the endpoint 104 be added to its buddy list. The access server 102 determines that the endpoint 104 is offline in step 908 and temporarily stores the request message in step 910. In step 912, the endpoint 106 notifies the access server 102 that it is going offline.

In steps 914 and 916, the endpoint 104 and access server 102 repeat steps 902 and 904 as described for the endpoint 106. However, when the access server 102 sends the profile information and routing table to the endpoint 104, it also sends the request by the endpoint 106. Endpoint 104 sends its response to the access server 102 in step 918 and also instructs the access server to delete the temporarily stored request. After the endpoint 106's next authentication process, its profile information will include endpoint 104 as a buddy (assuming the endpoint 104 granted permission).

Figure 10:
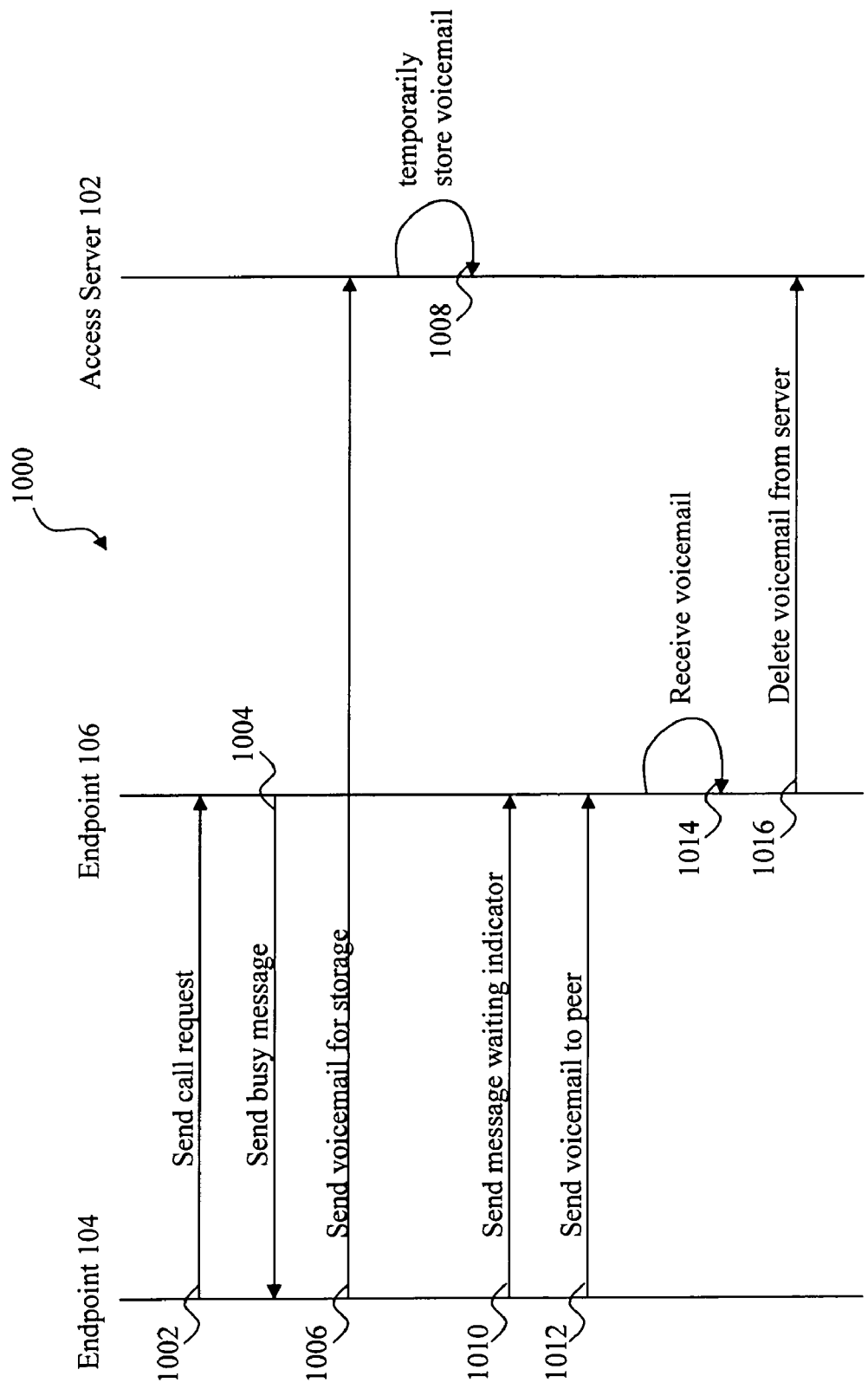
FIG. 10 is a sequence diagram illustrating an exemplary process by which an endpoint of FIG. 1 may send a voicemail to another endpoint that is online.

Referring to FIG. 10, a sequence diagram 1000 illustrates an exemplary process by which the endpoint 106 may store a voicemail for the endpoint 104. In the present example, the endpoint 106 is online, but is not available to take the call.

In step 1002, the endpoint 104 sends a call request message to the endpoint 106 requesting that a call be established between the two endpoints. In step 1004, the endpoint 106 responds with a message indicating that it is busy and cannot take the call. In step 1006, after recording a voicemail (not shown), the endpoint 104 sends the voicemail to the access server 102, which temporarily stores the voicemail in step 1008. The endpoint 104 then sends a message (e.g., a message waiting indicator (MWI)) to the endpoint 106 in step 1010 before sending the voicemail to the endpoint 106 in step 1012. The endpoint 106 receives the voicemail in step 1014 (e.g., after ending the previous call) and instructs the access server 102 to delete the temporarily stored voicemail in step 1016. It is understood that the endpoint 106 may perform many different actions with respect to the voicemail, including saving, forwarding, responding, etc.

Figure 11:
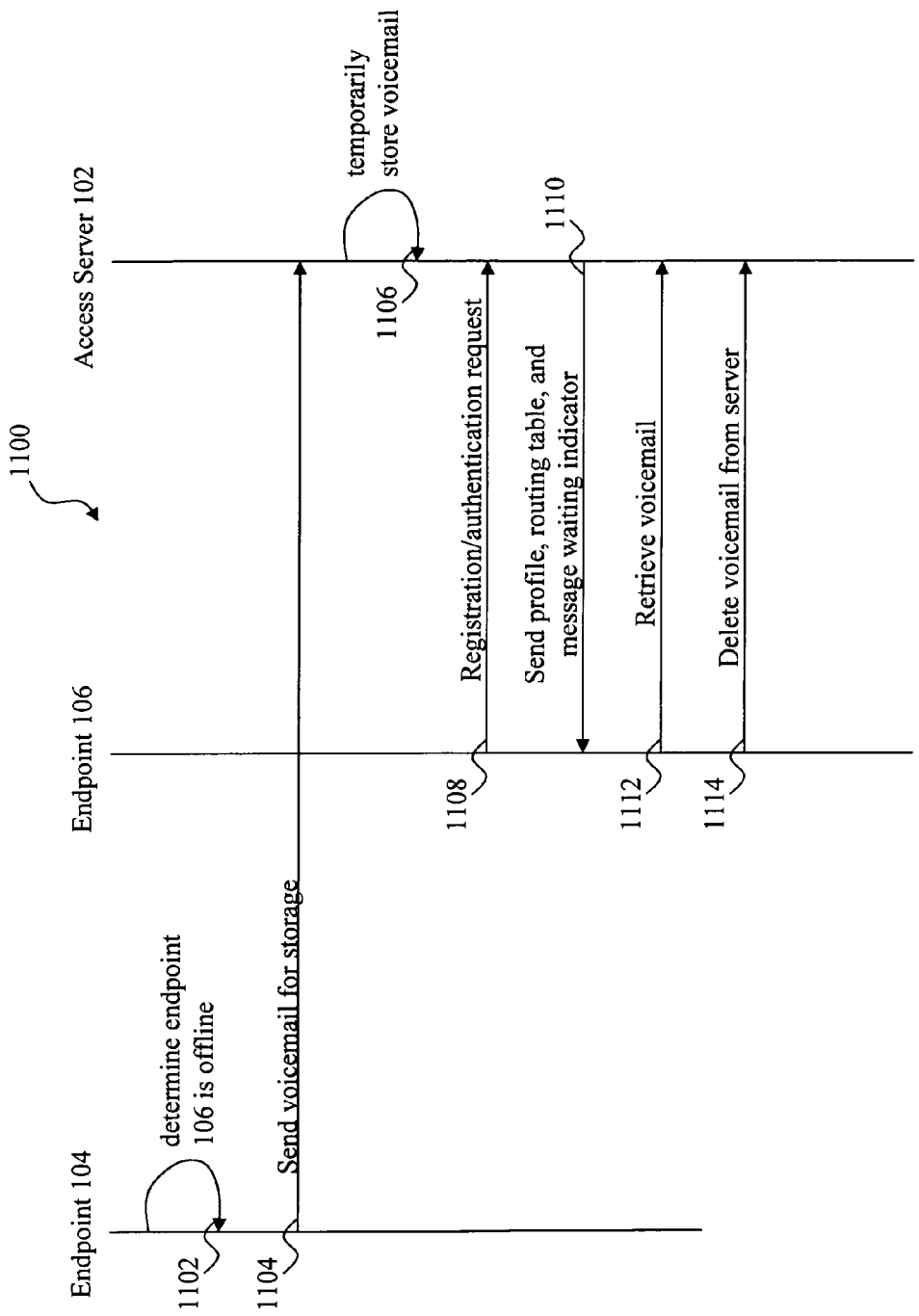
FIG. 11 is a sequence diagram illustrating an exemplary process by which an endpoint of FIG. 1 may send a voicemail to another endpoint that is offline.

Referring to FIG. 11, a sequence diagram 1100 illustrates an exemplary process by which the endpoint 106 may receive a voicemail from the endpoint 104. In the present example, the endpoint 106 is offline when the voicemail is recorded and sent. In step 1102, the endpoint 104 determines that the endpoint 106 is offline. As described previously, such a determination may be made based on the fact that the endpoint 106 was not online when the endpoint 104 was authenticated (as indicated by the profile information from the access server 102) and has not since logged in (as it would have notified the endpoint 104 as described with respect to FIG. 4). As the endpoint 106 is offline, the endpoint 104 sends a recorded voicemail to the access server 102 in step 1104, which temporarily stores the voicemail in step 1106. The endpoint 106 authenticates with the access server 102 in step 1108 as previously described, and the access server sends the endpoint 106 the relevant profile information and routing table in step 1110. In addition to the information normally sent to the endpoint 106 after authentication, the access server 102 sends a message such as a message waiting indicator to inform the endpoint 106 of the stored voicemail. In steps 1112 and 1114, the endpoint 106 retrieves the recorded voicemail and instructs the access point 102 to delete the voicemail from the server.

Figure 12:
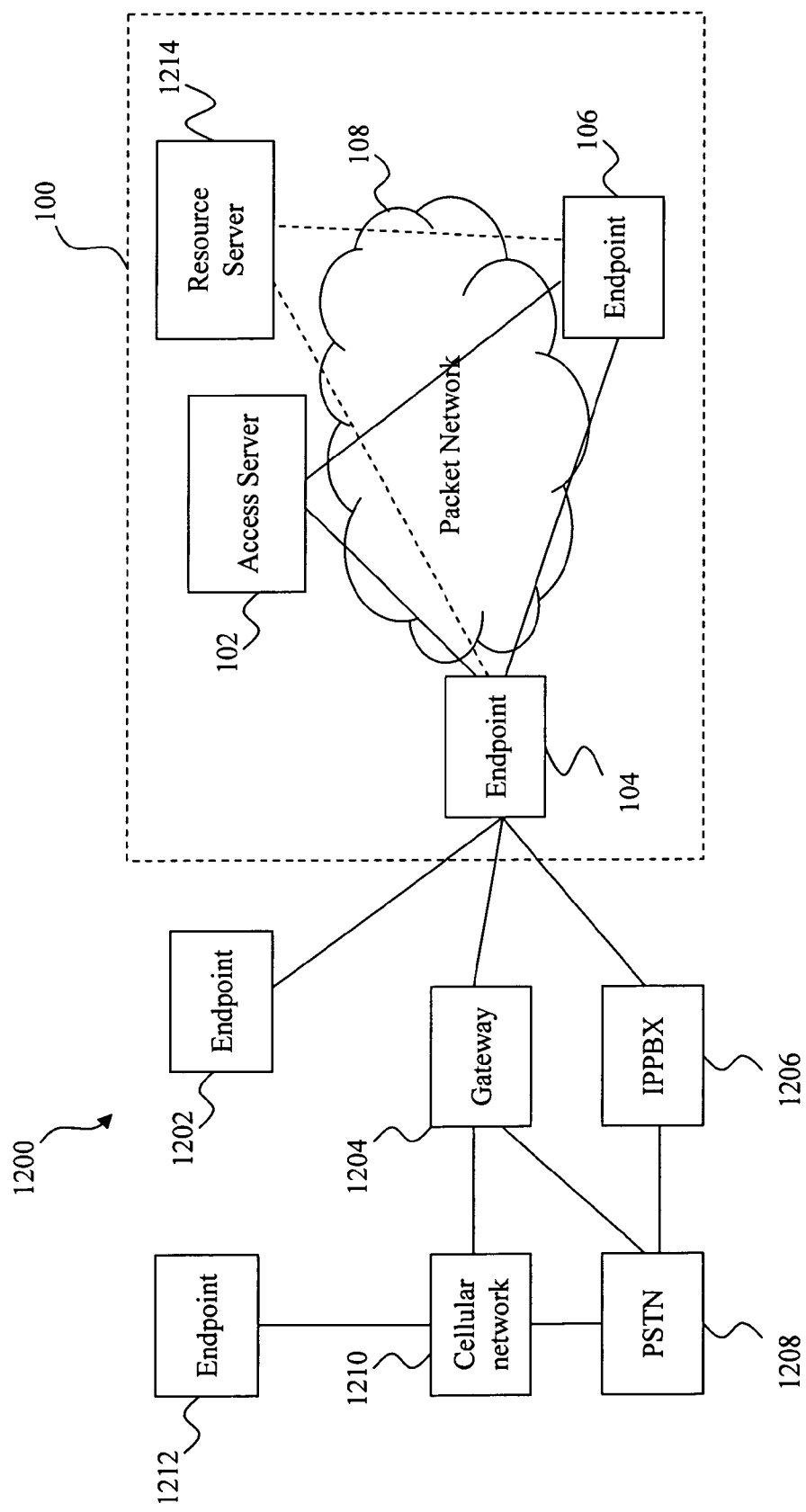
FIG. 12 is a simplified diagram of another embodiment of a peer-to-peer system that is coupled to destinations outside of the peer-to-peer system.

Referring to FIG. 12, in another embodiment, the system 100 of FIG. 1 is illustrated as a "home system" that forms part of a larger system 1200. The home system includes all endpoints that have registered with the access server 102. In addition to the home system 100, a number of external (relative to the home system 100) devices are illustrated, including an external endpoint 1202 (e.g., a SIP capable such as a SIP telephone, a computer, a personal digital assistant, a household appliance, or an automated control system for a business or residence). Additional external devices include a gateway 1204 and an IPPBX 1206, both of which are coupled to a PSTN 1208. The gateway 1204 is also coupled to a cellular network 1210, which includes an radio access network, core network, and other cellular network components (not shown). In the present example, both the gateway 1204 and the IPPBX 1206 include a non-proprietary interface (e.g., a SIP interface) that enables them to communicate directly with the SIP-based endpoints 104 and 106. It is understood that various portions of the system 1200 may include wired and/or wireless interfaces and components.

The endpoints 104 and 106 that are within the home system 100 are authenticated by the access server 102 using user-supplied credentials (as previously described). Communication may occur directly between the endpoints 104, 106 and devices outside of the home system 100 as follows. The access server 102 serves as a routing table repository. As described previously, a routing table contains information needed by the endpoints 104, 106 in order to connect to buddies within the home network 100. In the present example, the routing table (or another routing table) also contains information needed by the endpoints 104, 106 in order to connect to the external devices. Connections to external devices, locations, or services may be subscription based, with the routing table for a particular endpoint only having address information for external devices for which the endpoint has a current subscription. For example, the profile associated with the endpoint 104 may have a flag representing whether the endpoint is subscribed to a service such as a PSTN calling plan.

Figure 13:
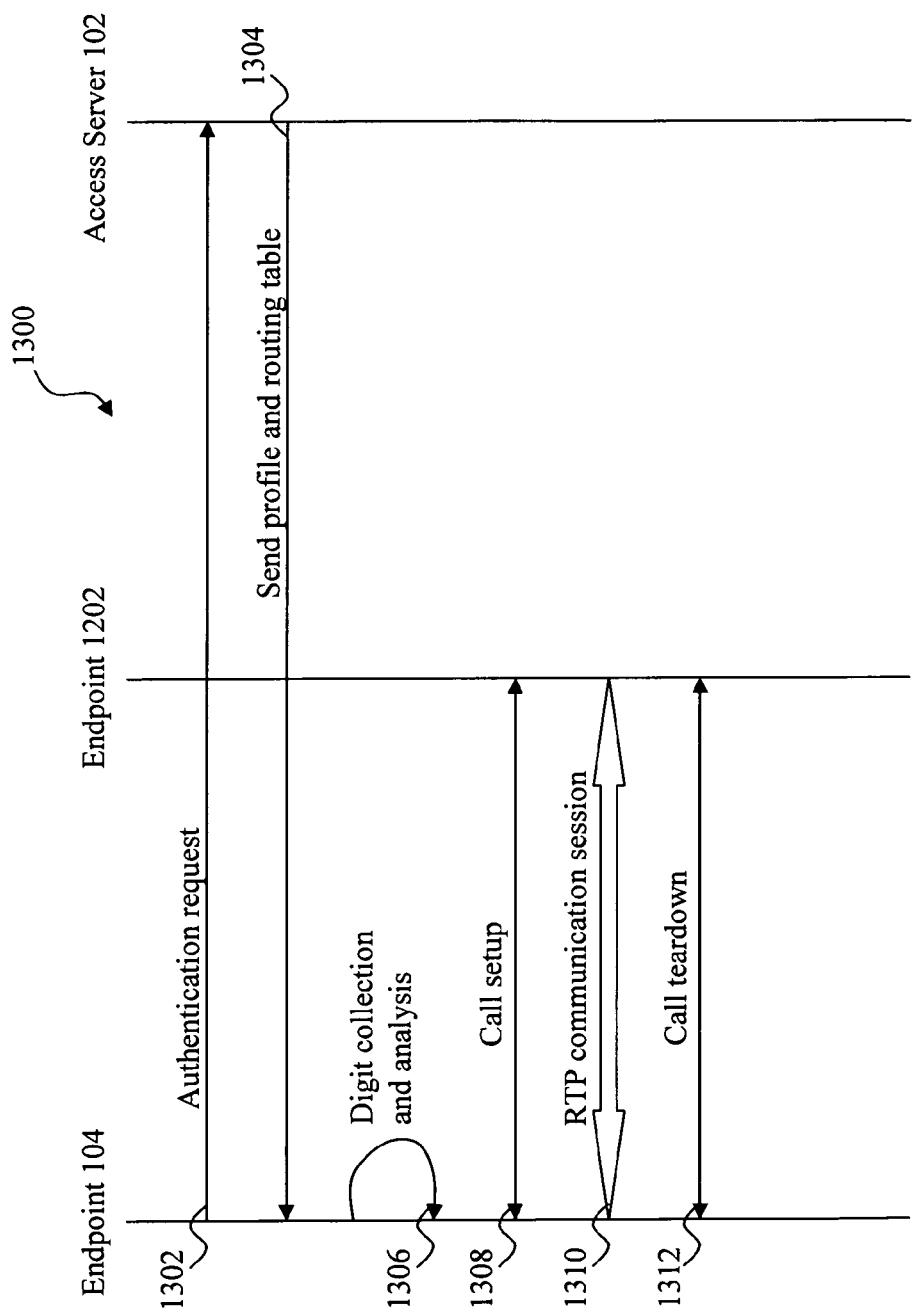
FIG. 13 is a sequence diagram illustrating an exemplary process by which an endpoint of FIG. 12 may directly contact a destination outside of the peer-to-peer system.

Referring to FIG. 13, a sequence diagram 1300 illustrates an exemplary process by which the endpoint 104 may directly contact the external endpoint 1202 within the system 1200 of FIG. 12. The endpoint 1202 is online and the endpoint 104 has the authority (e.g., a subscription) to contact the endpoint 1202. Although the present example uses SIP for signaling and RTP for media traffic, it is understood that other protocols may be used.

In step 1302, the endpoint 104 sends an authentication request message to the access server 102 as described previously. After authentication, the access server 102 sends the profile information and a routing table to the endpoint 104 in step 1304. After the endpoint 104 has been authenticated, the user of the endpoint places a call (e.g., a VoIP call) to the endpoint 1202. In step 1306, the endpoint 104 performs digit collection and analysis on the number entered by the user. As endpoint 104 contains both the routing table and a softswitch, the endpoint is able to identify and place the call directly to the endpoint 1202.

In step 1308, the endpoints 104 and 106 setup the call. For example, the endpoint 104 may sent a SIP INVITE message directly to the endpoint 1202. The endpoint 104 must provide any credentials required by the endpoint 1202. The endpoint 1202 responds with a 200 OK message and the endpoint 104 responds with an ACK message. The endpoints 104 and 1202 may then use an RTP session (step 1310) for the VoIP call. After the RTP session is complete, call teardown occurs in step 1312. Accordingly, as described in the previous examples between endpoints in the home system 100, the endpoint 104 directly contacts the endpoint 1202 (or gateway 1204 or IPPBX 1206) without intervention by the access server 102 after downloading the profile and routing table during authentication.

Another external endpoint 1212 may be contacted in the same manner as the endpoint 1202, although the communications will need to be routed through the gateway 1204 and cellular network 1210. As with the endpoint 1202, the endpoint 104 may contact the endpoint 1212 directly without intervention from the access server 102.

Figure 14:
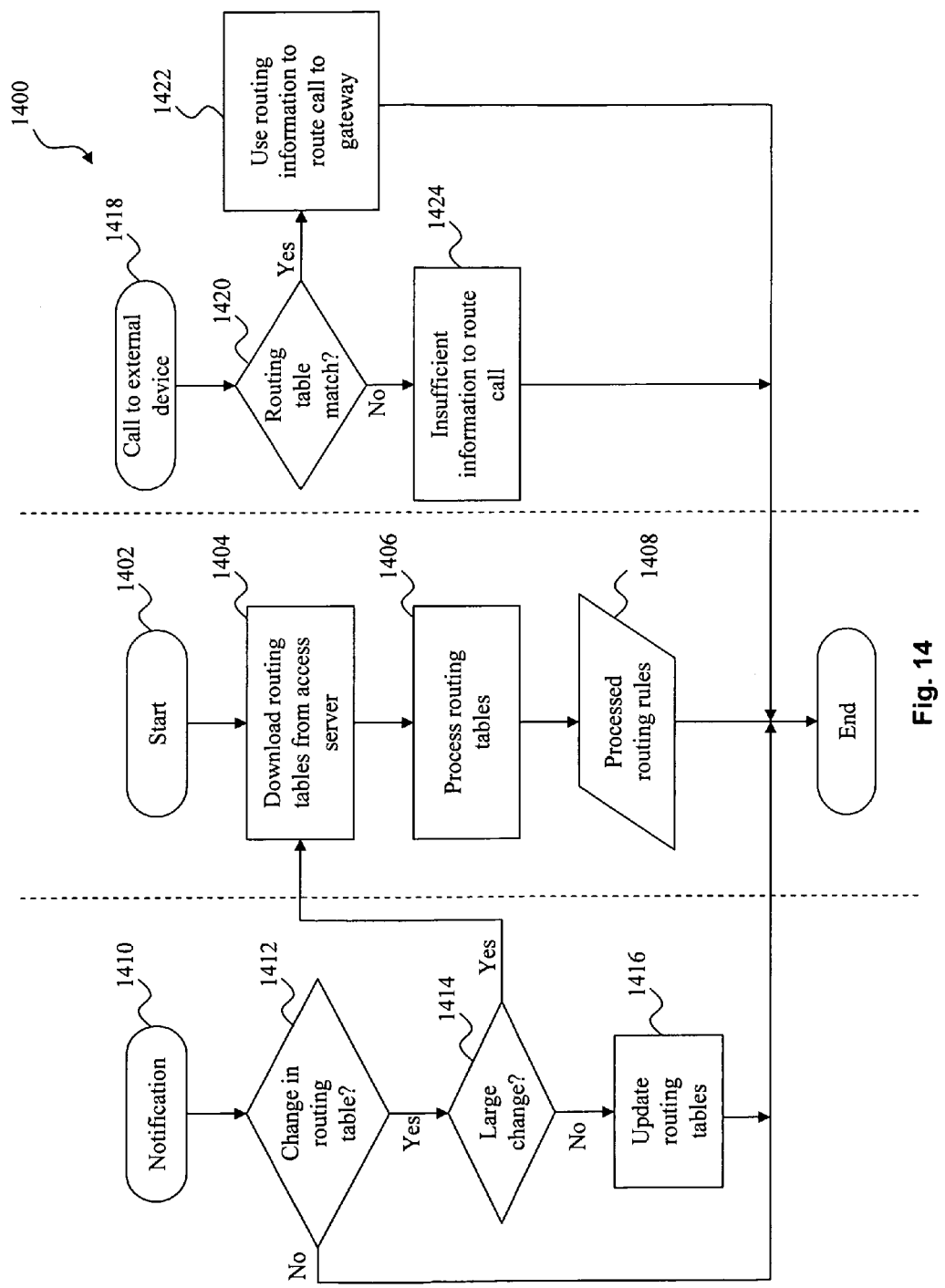
FIG. 14 is a flowchart of one embodiment of a method by which a routing table may be downloaded and utilized by an endpoint.

Referring to FIG. 14, a method 1400 illustrates one possible sequence of events for utilizing the routing tables of the access server 102 for external communications. The method begins in step 1402 when an endpoint (e.g., the endpoint 104) authenticates with the access server 102. The endpoint 104 downloads one or more routing tables in step 1404, depending on such factors as whether the endpoint 104 has a subscription to a relevant service (e.g., whether the endpoint 104 allowed to call outside of the home network). The routing tables are downloaded in a raw data format, and the endpoint 104 processes the raw data in step 1406 to produce optimal routing rules in step 1408. At this point, the endpoint 104 may use the routing rules to communicate with other endpoints.

The routing tables may change on the access server 102. For example, a new service area or new subscription options may become accessible. However, unless the endpoint 104 logs off and back on, the endpoint will not be aware of these changes. Accordingly, the access server 102 sends a notification in step 1410 that changes have occurred to the routing tables. In step 1412, the endpoint 104 determines whether a change has occurred with respect to the routing tables on the endpoint. For example, if the endpoint 104 just logged on, it may have the updated routing tables. Alternatively or additionally, the notification may not indicate which routing tables have changed, and the endpoint 104 will need to determine if any of the routing tables that it uses have changed.

If the routing tables have changed, the endpoint 104 makes a determination in step 1414 as to whether the change is relatively large or is minor. If the change is large, the method returns to step 1404, where the routing tables are downloaded. If the changes are minor, the method continues to step 1416, where the endpoint 104 updates its routing tables (e.g., the endpoint 104 downloads only the changed information). It is understood that some processing may be needed to prepare the new information for insertion into the existing routing rules.

If a call to an external device is to be placed (step 1418), the endpoint 104 determines whether it has a match in its routing rules in step 1420. If a match exists, the endpoint 104 uses the routing rules to route the call to an appropriate gateway or endpoint in step 1422. If no match exists, the endpoint 104 has insufficient information to route the call (step 1424) and ends the call process.

Figure 15:
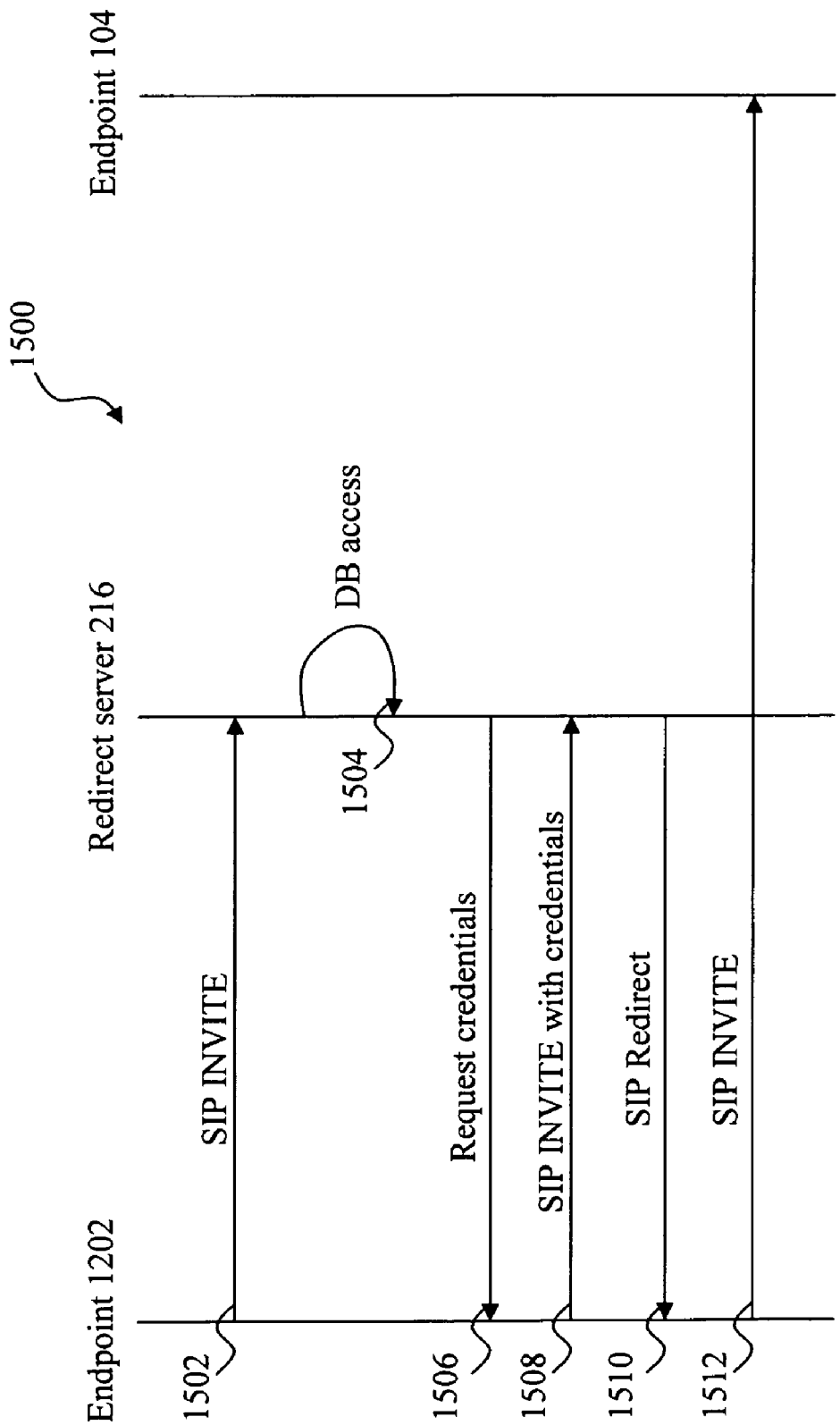
FIG. 15 is a sequence diagram illustrating an exemplary process by which an external device may establish contact with an endpoint within the peer-to-peer system of FIG. 12.

Referring to FIG. 15, a sequence diagram 1500 illustrates an exemplary process by which the external endpoint 1202 may attempt to establish contact with the endpoint 104 within the system 1200 of FIG. 12 using SIP messaging. In step 1502, the endpoint 1202 sends a SIP INVITE message to a redirect server (e.g., the redirect server 216 of FIG. 2*a*). The redirect server 216 accesses a database (e.g., the database 206 of FIG. 2*a*) in step 1504 and obtains contact information for the endpoint 104. The information may also include credentials (e.g., a username and password) required by the endpoint 104. If credentials are required, the redirect server 216 sends a message to the endpoint 1202 in step 1506 requesting the credentials. The endpoint 1202 responds to the credentials request in step 1508 by sending a SIP INVITE containing the credentials to the redirect server 216. The redirect server 216 then sends a redirect message to the endpoint 1202 with the address information for the endpoint 104 in step 1510. In step 1512, the endpoint 1202 may then directly contact the endpoint 104 with a SIP INVITE message. If the endpoint 104 is not available (e.g., offline), the redirect server 216 may send a message to the endpoint 1202 that the endpoint 104 is not available.

Referring again to FIG. 12, in the present example, the home system 100 includes a resource server 1214. Although the resource server 1214 may be part of the access server 102, it is separated into a separate server for purposes of illustration. The access server 102 and resource server 1214 may be in communication with one another (not shown) for purposes of identifying access rights and similar issues. The resource server 1214 stores and distributes various resources to the endpoints 104 and 106. As described previously, a resource represents any type of digital data. In operation, an endpoint (e.g., the endpoint 104) may store a resource on the resource server 1214 for later retrieval by the endpoint 106 or may transfer the resource directly to the endpoint 106. Furthermore, the resource server 1214 may distribute the resource to the endpoint 106, as well as to other endpoints. In this manner, the resource server 1214 may serve as temporary or permanent storage. In some embodiments, the resource server 1214 may restrict access based on credentials provided by the endpoints 104 and 106. For example, if the endpoint 104 only has the credentials for certain resources, then the resource server may limit the endpoint's access to those resources. Communication between an endpoint and the resource server occurs directly as described above with respect to two endpoints.

It is understood that many different methods may be implemented using the endpoints and/or access server described above. Various methods are described below as examples, but it is understood that many other methods or variations of methods are possible.

In one embodiment, a port rotation method may be implemented that allows for changing/rotating the port used to listen for communications to provide added security. The rotation may occur during idle time of the operation of the endpoint. For example, when idle time is detected, a random unused port is selected. The endpoint then informs the access server of the new route information and sends out a peer-to-peer notification to all online buddies to notify them of the change in the port/route information.

In another embodiment, wireless calls may be made through an endpoint. For example, a method may be implemented that allows for a direct interface (e.g., using the cellular network interface 280 of FIG. 2b) to 3G or any similar wireless network directly from the endpoint in a peer-to-peer hybrid system. When the endpoint is activated, the wireless module informs the wireless network of its presence. At this point, calls can be sent to and received from the wireless network. The endpoint can also bridge calls from the wireless side to the IP side of the network. For example, if a call is received from a wireless phone at the endpoint via the wireless interface, the endpoint's user can choose to route calls to any buddy endpoints on the HP side of the network. This bridging functionality is another capability of the endpoint. Similarly, calls received on the IP side can be bridged to the wireless side.

Figure 16:
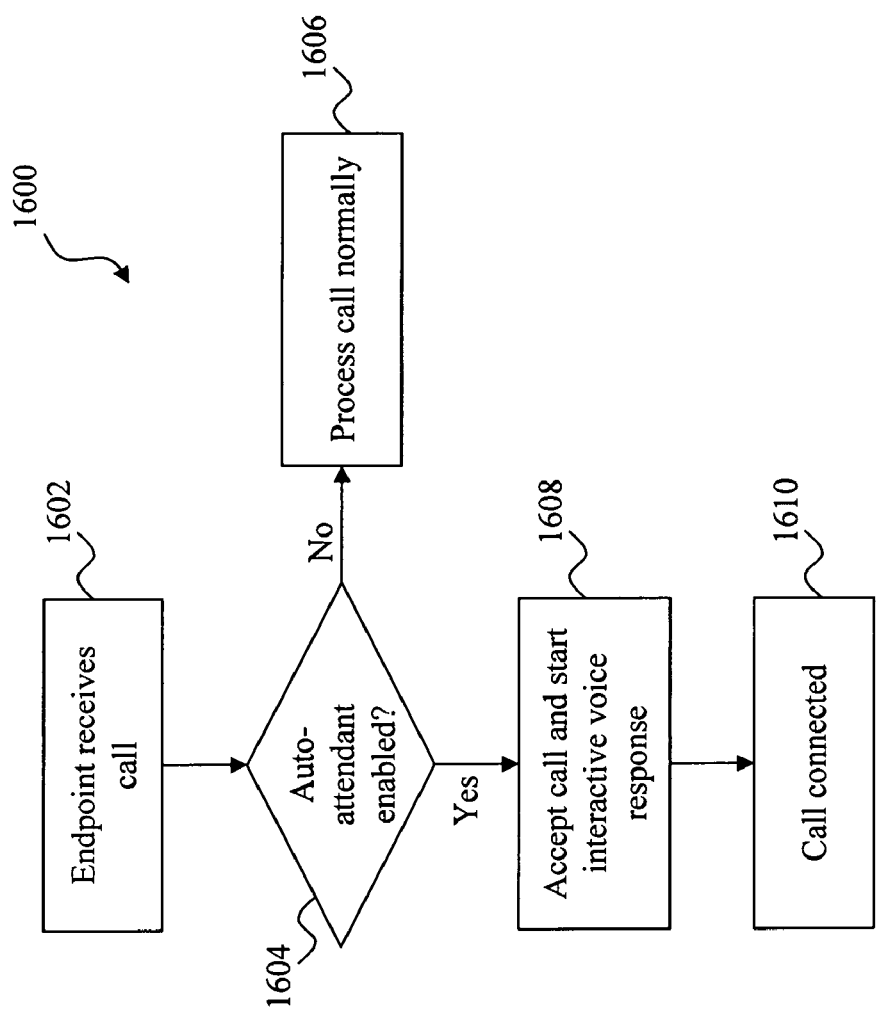
FIG. 16 is a flowchart of one embodiment of a method by which an endpoint may provide interactive voice response functionality.

Referring to FIG. 16, in another embodiment, a method 1600 may be used with interactive voice response (IVR) (e.g., the IVR support provided by the feature layer 264 of FIG. 2b) to automatically handle calls when an auto-attendant is turned on. The auto-attendant provides functionality that allows users to perform other tasks when they are busy or not present to attend to calls or other forms of communication. The method 1600 may automatically terminate calls on behalf of the user and perform other tasks as defined by the user (e.g., leave a message or be routed to another destination).

In the present example, the method 1600 begins in step 1602 when the endpoint (e.g., the endpoint 104) receives a call. In step 1604, a determination is made as to whether the auto-attendant is enabled (e.g., whether IVR functionality is on). If it is not enabled, the method continues to step 1606, where the call is processed normally. If it is enabled, the call is accepted and the IVR functionality is started in step 1608. In step 1610, the call is connected.

Figure 17:
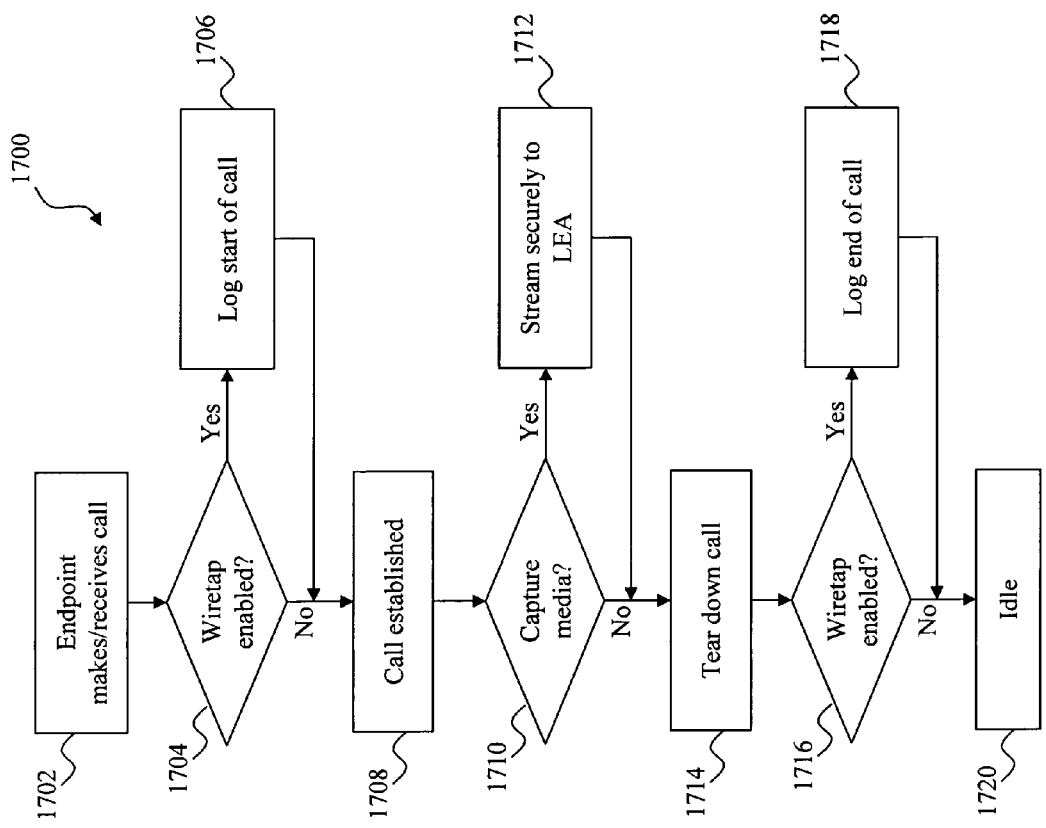
FIG. 17 is a flowchart of one embodiment of a method by which wiretap functionality may be provided on an endpoint.

Referring to FIG. 17, in still another embodiment, a method 1700 may be used to provide wiretap functionality on an endpoint (e.g., the endpoint 104). Such functionality may be provided, for example, by the CALEA agent of the softswitch 258 of FIG. 2b. The method begins in step 1702 when the endpoint 104 makes or received a call. If the endpoint is being tapped, as determined in step 1704, the method will continue to step 1706, where the start of the call will be logged. The method 1700 then continues to step 1708, where the call is established. If the endpoint is not being tapped, the method skips step 1706 and proceeds directly to step 1708. In step 1710, a determination is made as to whether media associated with the call is to be captured. If so, the media is captured and securely streamed to a designated law enforcement agency in step 1712. The method then continues to step 1714, where call tear down occurs after the call is ended. If no media is to be captured, the method proceeds directly from step 1710 to step 1714. In step 1718, the end of the call is logged (if a wiretap is enabled as determined in step 1716) and the endpoint 104 returns to an idle state in step 1720. In the present example, the log information is also securely streamed to the law enforcement agency as it is captured.

In another embodiment, a Find Me Follow Me (roaming) method may be used to provide simultaneous multiple sessions for the endpoint in the peer-to-peer hybrid environment. The endpoints can be signed in at multiple locations to access services offered and communicate directly in a peer-to-peer manner with other endpoints that are buddies. In this method, when one endpoint tries to contact his/her buddy, if the buddy is signed on at multiple locations, the originating buddy sends out messages to all signed in locations of the buddy. When the endpoint responds from any one of the multiple signed in locations, requests to other endpoints are dropped and communication is continued with the endpoint that has accepted the request for communication.

Figure 18:
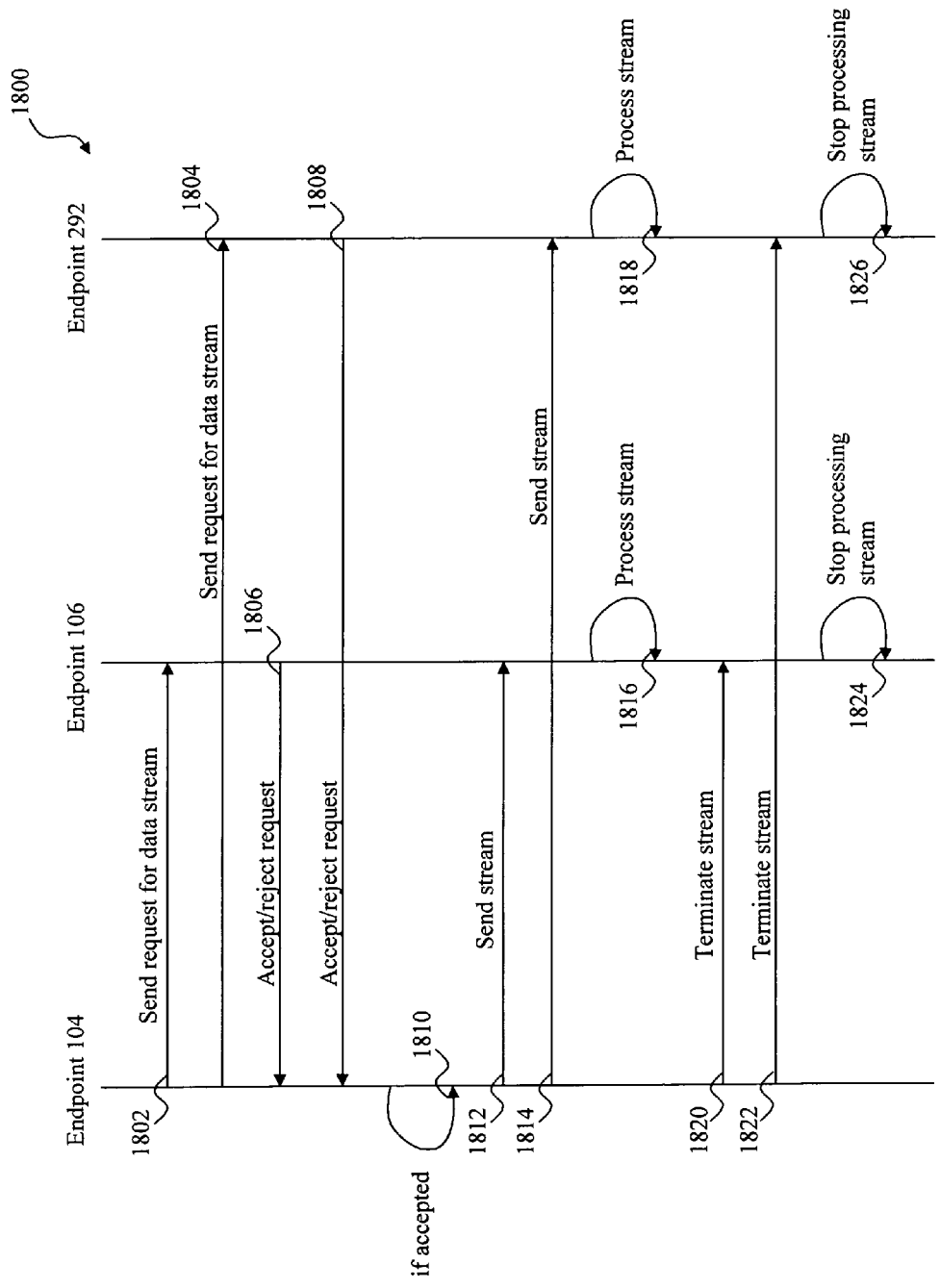
FIG. 18 is a sequence diagram illustrating an exemplary process by which an endpoint may stream data to one or more other endpoints.

Referring to FIG. 18, in still another embodiment, a sequence diagram 1800 illustrates an exemplary process by which the endpoint 104 may stream data in real time to one or more other buddy endpoints 106 and 292 (FIG. 2g), either one at a time or simultaneously. In steps 1802 and 1804, respectively, the originating endpoint (e.g., the endpoint 104) sends out a request to stream data to the endpoints 106 and 292. The endpoints receiving the request may respond with messages either accepting or rejecting the request (steps 1806 and 1808). Once the request is accepted (as indicated in step 1810), the data stream is sent out to all buddies that have accepted the request for the data stream (steps 1812 and 1814). On the terminating endpoints 106 and 292, the user chooses an application that can handle the processing of the data stream to utilize the data. It is understood that some applications may be automatically selected by the endpoint for recognized or predefined data types. The streams are then processed by the relevant endpoint (steps 1816 and 1818). In steps 1820 and 1822, respectively, the endpoint 104 sends out a request to the endpoints 106 and 292 to terminate the stream. The endpoints 106 and 292 stop their processing in steps 1824 and 1826, respectively.

In yet another embodiment, a method for Smart IM™ (as developed by Damaka, Inc., of Richardson, Tex.) or Enhanced IM may be used to convert textual data sent to and received by the endpoint into speech by employing a text-to-speech recognition system in real-time. Textual data can be received from the network or locally for conversion to speech/voice signals for playback. Such functionality may be provided, for example, by the text-to-speech engine 270 of FIG. 2b.

In another embodiment, a method to convert speech/voice data that is sent to and received by the endpoint into text form by employing a speech-to-text system in real-time. Speech/voice data can be received from the network or locally for conversion to text data for processing by the user. Such functionality may be provided, for example, by the speech-to-text engine 268 of FIG. 2b.

In one embodiment, a method may be used to provide correction services (e.g., spell check) on textual data being sent/received by the endpoint. In another embodiment, a method may provide functionality to allow a user to search the world wide web or internet via search engines for additional information related to textual data being sent/received by the endpoint. In yet another embodiment, a method may provide functionality for performing language conversion on textual data being sent/received by the endpoint using one or more language conversion engines (e.g., the language conversion engine 272 of FIG. 2b.).

In still another embodiment, a method may provide functionality enabling textual data received by the endpoint to be archived on the endpoint for later retrieval. For example, a database (e.g., SQL) engine may be used to store and index data received by the endpoint from a buddy for faster retrieval. A standard query interface may then be used to store/retrieve data for presentation to the user.

In another embodiment, a method may be used to provide SMS functionality. Such functionality may be provided, for example, by the SMS feature of the feature layer 264 of FIG. 2b. For example, an SMS table may be downloaded with the routing table when an endpoint logs onto the network. If the endpoint has a mobile setting, the endpoint may be able to communicate directly via the SMS functionality.

Figure 19:
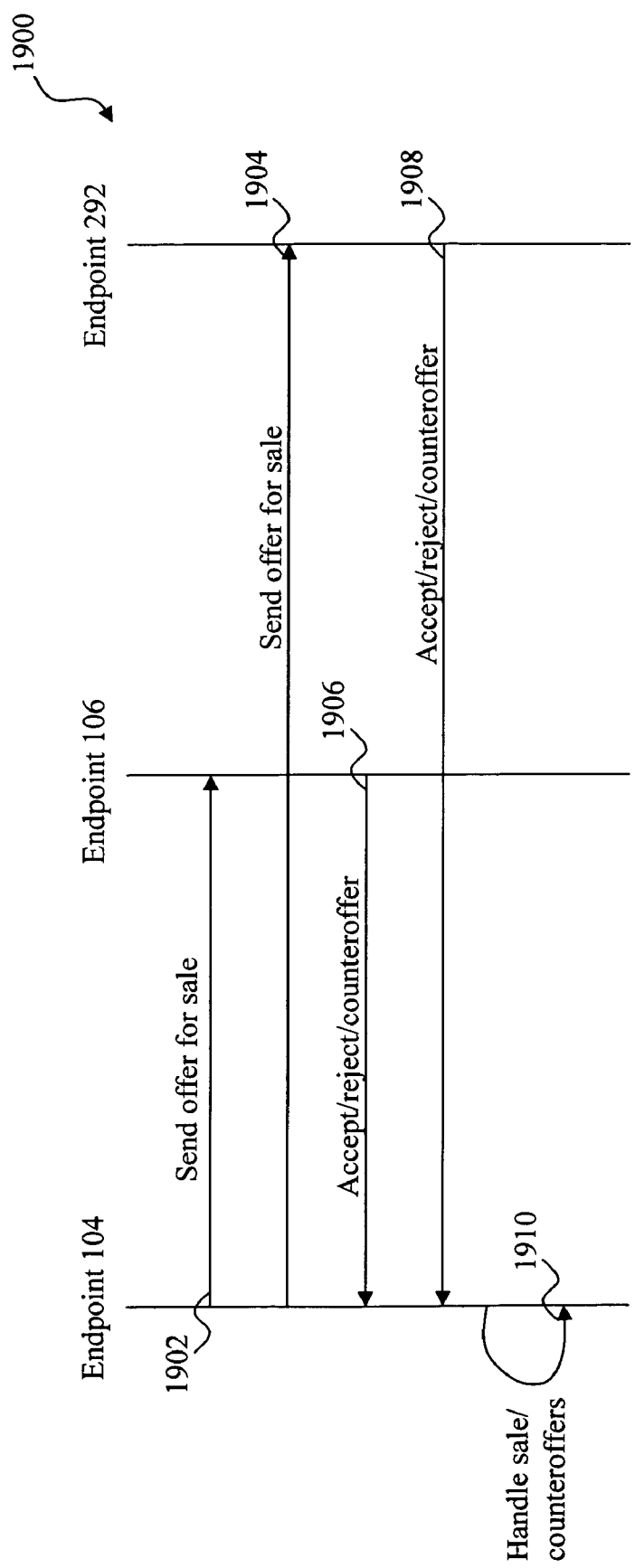
FIG. 19 is a sequence diagram illustrating an exemplary process by which an endpoint may conduct a private transaction with one or more buddy endpoints.

Referring to FIG. 19, in another embodiment, a sequence diagram 1900 illustrates an exemplary process by which the endpoint 104 may initiate a private transaction (e.g., make an offer for sale or start an auction process) to buddies represented by endpoints 106 and 292 (FIG. 2g). In steps 1902 and 1904, respectively, the endpoint 104 sends a message containing an offer to sale one or more items to the endpoints 106 and 292. In steps 1906 and 1908, respectively, the endpoints 106 and 292 may return messages accepting or rejecting the offer, or making a counteroffer. The user of the endpoint 104 may review the received messages and accept one, reject both, reply to one or both with an additional counteroffer, etc., in step 1910. This process (offer, response, review) may continue until the offer is either finally accepted or rejected. In the present example, because the interaction occurs between buddies, the actual financial transaction may not occur electronically.

Figure 20:
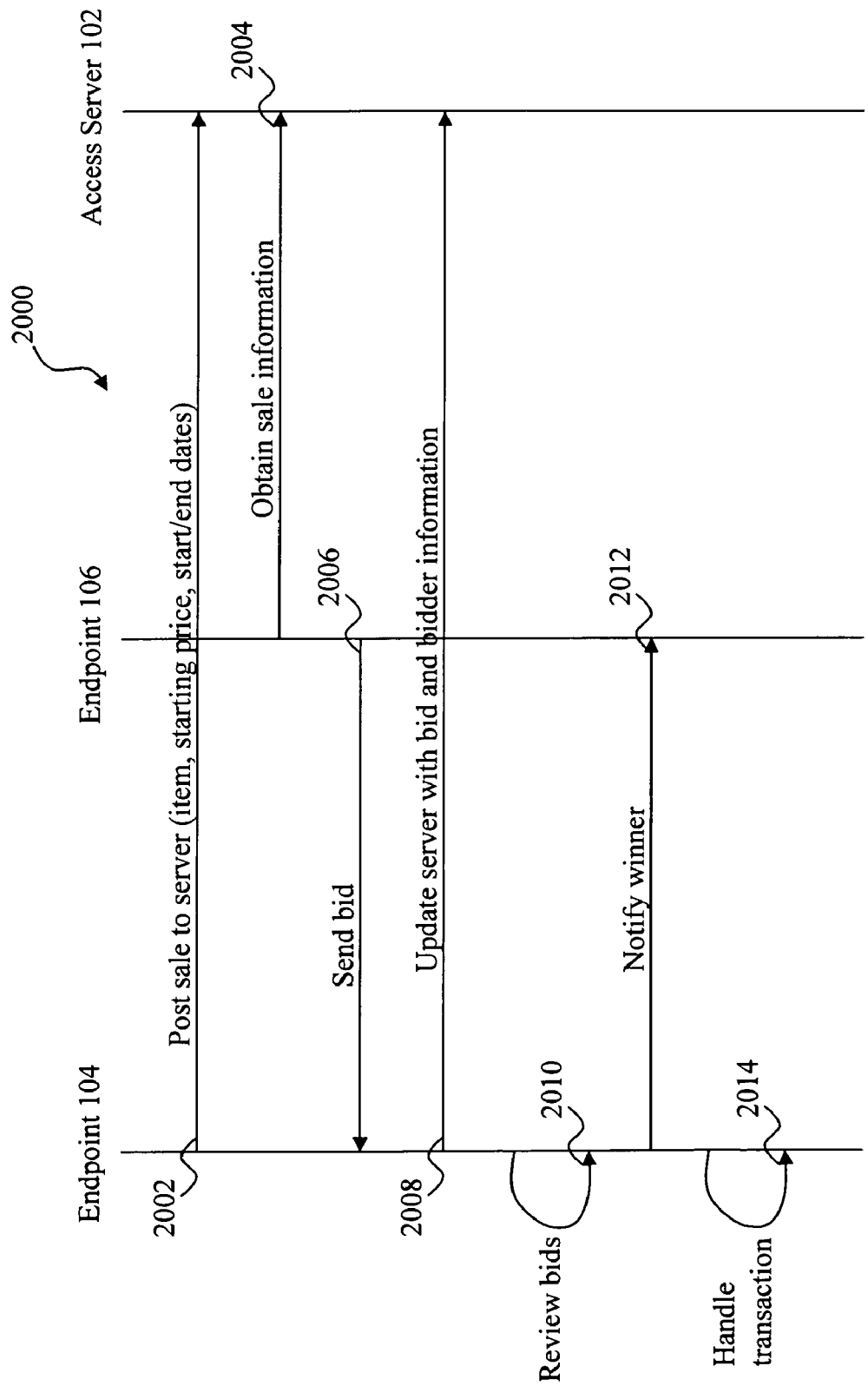
FIG. 20 is a sequence diagram illustrating an exemplary process by which an endpoint may conduct a public transaction with one or more other endpoints.

Referring to FIG. 20, in yet another embodiment, a sequence diagram 2000 illustrates an exemplary process by which the endpoint 104 may initiate a public transaction (e.g., make an offer or start an auction process). In step 2002, the endpoint 104 sends a message to the access server 102 to post a sale. The message contains information such as a description of the item for sale, a starting price, and the start/end dates of the auction. In step 2004, the endpoint 106 (which is not a buddy in the present example) obtains the sale information from the server. The obtained information includes a "substitute ID" of the endpoint 104 and associated address information. The substitute ID, which may be assigned to the endpoint 104 exclusively for the sale, enables the endpoint 106 to contact the endpoint 104 directly without obtaining the actual ID of the user of the endpoint 104. Accordingly, when the sale ends, the endpoint 106 will no longer be able to contact the endpoint 104.

In step 2006, the endpoint 106 sends a message directly to the endpoint 104 with a bid. In step 2008, the endpoint 104 updates the information on the access server with the bid and bidder information. Although not shown, buddy endpoints may also bid on the posted item. In step 2010, the user of the endpoint 104 reviews the bids, selects a winner (if a winner exists), and notifies the winner directly (step 2012). In step 2014, the sale transaction is handled. In the present example, because the transaction may occur between parties that are not buddies, the transaction may be accomplished via a third party clearinghouse. However, if a buddy won the sale, the parties may revert to a private transaction. Additionally, it is understood that any parties (whether or not they are buddies) may arrange the transaction as desired. In some embodiments, the process may include directly or indirectly notifying involved parties of a pending bid, notifying involved parties of accepted/rejected bids, etc. The seller may also accept any bid desired (e.g., not only the highest bid) and may end the bidding at any time. If an endpoint is offline when bidding occurs (e.g., if the endpoint 104 is offline when the message of step 2006 is sent or if the endpoint 106 is offline when the message of step 2012 is sent), the message may be downloaded during authentication when the endpoint logs in as previously described.

Figure 21:
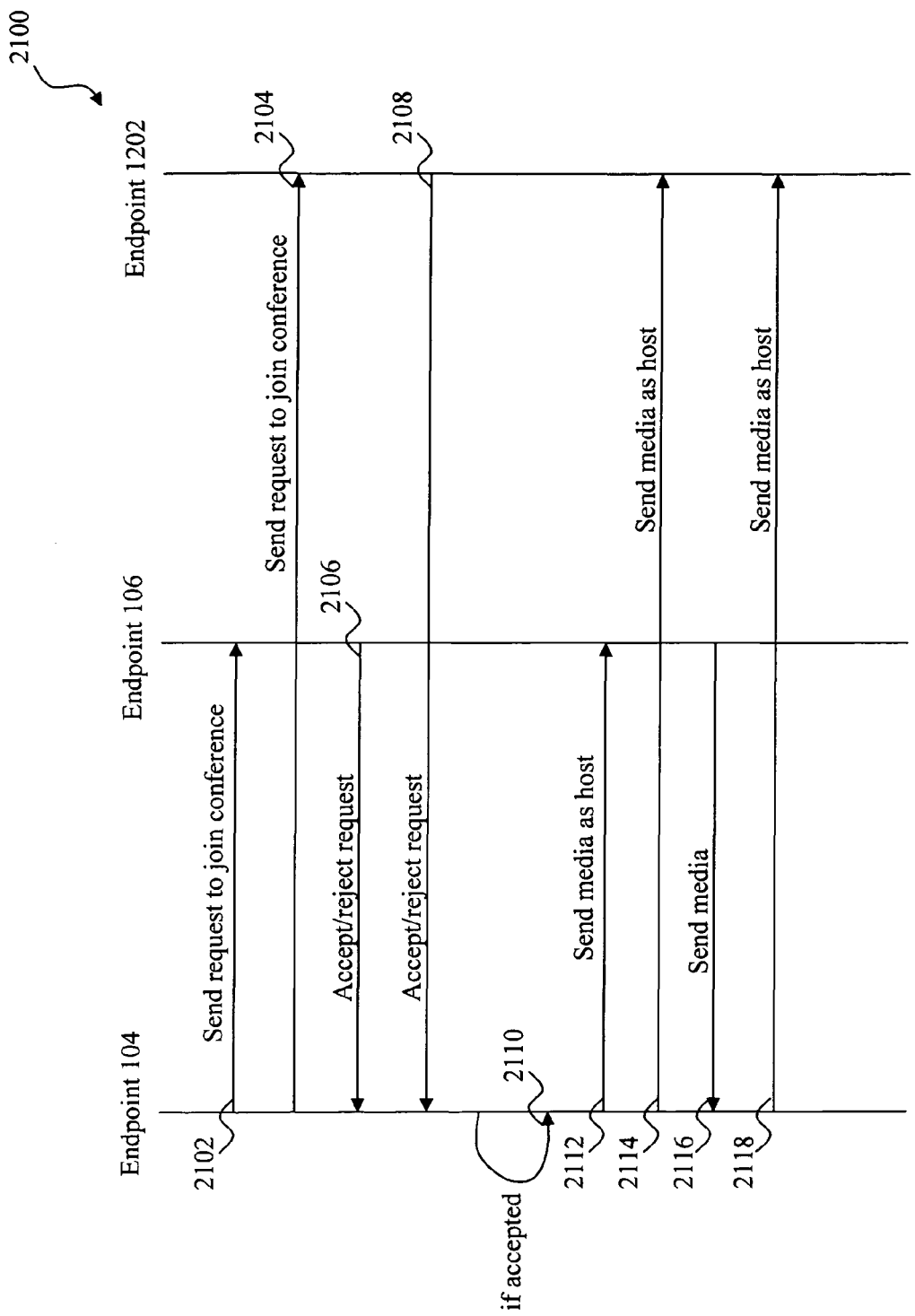
FIG. 21 is a sequence diagram illustrating an exemplary process by which an endpoint may establish a conference call with other endpoints.

Referring to FIG. 21, in still another embodiment, a sequence diagram 2100 illustrates an exemplary process by which the endpoint 104 may initiate a conference call with other endpoints (e.g., the endpoints 106 and 1202, both of which are buddies with the endpoint 104 in the present example). It is noted that the endpoints 106 and 1202 may or may not be buddies with each other. In steps 2102 and 2104, respectively, the endpoint 104 sends a request to join a conference call to the endpoints 106 and 1202. The endpoints 106 and 1202 respond in steps 2106 and 2108, respectively, by either accepting or rejecting the request. In the present example, both endpoints 106 and 1202 accept the request (as indicated by step 2110).

The endpoint 104 may then send media (e.g., text or voice information) to the endpoints 106 and 1202 in steps 2112 and 2114, respectively. Incoming media (e.g., from the endpoint 106) is received by the endpoint 104 in step 2116 and sent to the endpoint 1202 by the endpoint 104 in step 2118. In the present example, rather than multicasting the information, the endpoint 104 hosts the conference call by using a separate peer-to-peer connection with each endpoint. As the endpoints 106 and 1202 are connected in the conference call via the endpoint 104 and are not communicating with each other directly, the endpoints 106 and 1202 do not need to be buddies. Accordingly, the endpoint 104 in the present example may have two routing entries associated with the conference call: one routing entry for endpoint 106 and another routing entry for endpoint 1202. In other embodiments, multicasting may be used to transmit the data from the endpoint 104 to the endpoints 106 and 1202.

It is understood that the process described with respect to FIG. 21 may be applied to other scenarios. For example, the endpoint 104 may serve as the host for a multiplayer game. Incoming data may then be distributed by the endpoint to other endpoints that are associated with the hosted game.

Figure 22:
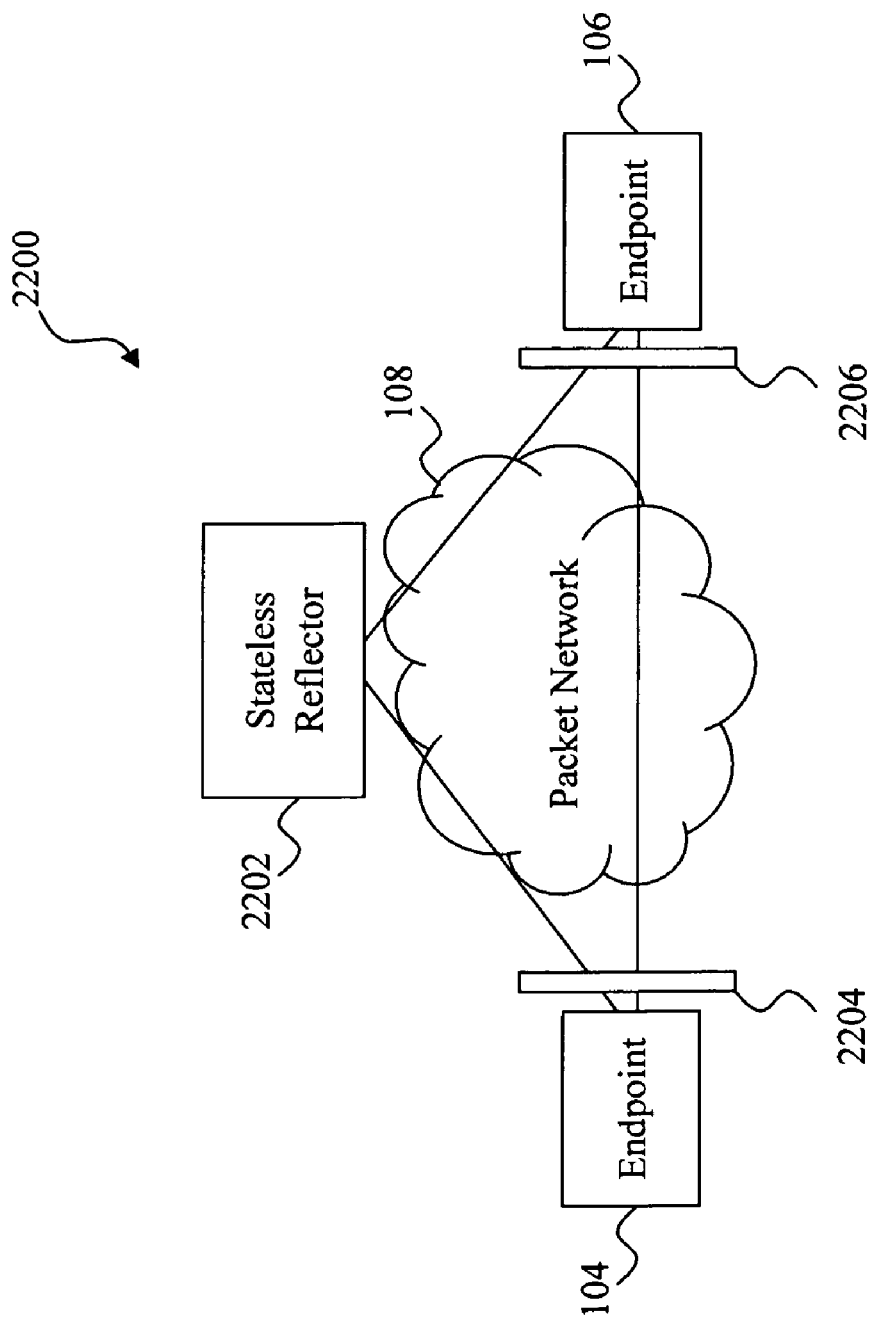
FIG. 22 is a simplified diagram of another embodiment of a peer-to-peer system that includes a stateless reflector that may aid an endpoint in traversing a NAT device to communicate with another endpoint.

Referring to FIG. 22, in one embodiment, a system 2200 includes a stateless reflector 2202 and two endpoints 104 and

106, such as the endpoints 104 and 106 described with respect to the preceding figures. In the present example, each of the endpoints 104 and 106 are behind a device 2204, 2206, respectively, that monitors and regulates communication with its respective endpoint. Each device 2204, 2206 in the present example is a firewall having NAT technology. As described previously, a NAT device may present an obstacle in establishing a peer-to-peer connection because it may not allow unsolicited messages (e.g., it may require a packet to be sent out through the NAT device before allowing a packet in). For example, the NAT device 2206 positioned between the endpoint 106 and network 108 may only let a message in (towards the endpoint 106) if the endpoint 106 has sent a message out. Unless the NAT device's status is shifted from not soliciting messages from the endpoint 104 to soliciting messages from the endpoint 104, the endpoint 104 will be unable to connect to the endpoint 106. For example, the endpoint 104 will be unable to notify the endpoint 106 that it is now online.

As will be described below in greater detail, the stateless reflector 2202 is configured to receive one or more packets from an endpoint and reflect the packet to another endpoint after modifying information within the packet. This reflection process enables the endpoints 104 and 106 to communicate regardless of the presence and type of the NAT devices 2204 and 2206. The stateless reflector 2202 is stateless because state information (e.g., information relating to how an endpoint is to connect with other endpoints) is stored by the endpoints, as described previously. Accordingly, the stateless reflector 2202 processes header information contained within a packet without access to other information about the network or endpoints, such as the database 206 of FIG. 2a. Although only one stateless reflector 2202 is illustrated in FIG. 22, it is understood that multiple stateless reflectors may be provided, and that the endpoints 104 and 106 may each use a different stateless reflector. For example, an endpoint may be configured to use a particular stateless reflector or may select a stateless reflector based on location, NAT type, etc.

Although each endpoint 104, 106 is shown with a separate NAT device 2204, 2206, it is understood that multiple endpoints may be connected to the network 108 via a single NAT device. For example, a LAN may access the network 108 via a single NAT device, and all communications between the endpoints connected to the LAN and the network 108 must pass through the NAT device. However, communications between the endpoints within the LAN itself may occur directly, as previously described, because the endpoints are not communicating through the NAT device. Furthermore, if one of the endpoints 104 or 106 does not have a NAT device, then communications with that endpoint may occur directly as described above even if the endpoints are not in the same network.

Each NAT device 2204 and 2206 includes an internal IP address (on the side coupled to the endpoint 104 for the NAT device 2204 and the side coupled to the endpoint 106 for the NAT device 2206) and an external IP address (on the side coupled to the network 108 for both NAT devices). Each connection is also associated with an internal port and an external port. Therefore, each connection includes both internal IP address/port information and external IP address/port information.

Generally, a NAT device may be defined as full cone, restricted cone, port restricted cone, or symmetric. A full cone NAT is one where all requests from the same internal IP address and port are mapped to the same external IP address and port. Therefore, any external host can send a packet to the internal host by sending a packet to the mapped external address.

A restricted cone NAT is one where all requests from the same internal IP address and port are mapped to the same external IP address and port. Unlike a full cone NAT, an external host can send a packet to the internal host only if the internal host has previously sent a packet to the external host's IP address.

A port restricted cone NAT is like a restricted cone NAT, but the restriction includes port numbers. More specifically, an external host can send a packet with source IP address X and source port P to the internal host only if the internal host has previously sent a packet to the external host at IP address X and port P.

A symmetric NAT is one where all requests from the same internal IP address and port to a specific destination IP address and port are mapped to the same external IP address and port. If the same host sends a packet with the same source address and port, but to a different destination, a different mapping is used. Only the external host that receives a packet can send a UDP packet back to the internal host.

Referring to FIG. 23, a table 2300 illustrates one embodiment of a communication structure that may be used to traverse one or both of the NAT devices 2204 and 2206 of FIG. 22. The table 2300 provides five possible types for the NAT devices 2204 and 2206: no NAT, full cone, restricted cone, port restricted cone, and symmetric. It is understood that "no NAT" may indicate that no device is there, that a device is there but does not include NAT functionality, or that a device is there and any NAT functionality within the device has been disabled. Either of the NAT devices 2204 and 2206 may be on the originating side of the communication or on the terminating side. For purposes of convenience, the endpoint 104 is the originating endpoint and the endpoint 106 is the terminating endpoint, and the NAT device 2204 is the originating NAT device and the NAT device 2206 is the terminating NAT device. It is understood that the terms "endpoint" and "NAT device" may be used interchangeably in some situations. For example, sending a packet to the endpoint 106 generally involves sending a packet to the NAT device 2206, which then forwards the packet to the endpoint 106 after performing the network address translation. However, the following discussion may simply refer to sending a packet to the endpoint 106 and it will be understood that the packet must traverse the NAT device 2206.

As illustrated by the table 2300, there are twenty-five possible pairings of NAT types and establishing communication between different NAT types may require different steps. For purposes of convenience, these twenty-five pairings may be grouped based on the required steps. For example, if the originating NAT type is no NAT, full cone, restricted cone, or port restricted cone, then the originating NAT can establish communication directly with a terminating NAT type of either no NAT or full cone.

If the originating NAT type is no NAT or full cone, then the originating NAT can establish communications with a terminating NAT type of either restricted cone or port restricted cone only after using the stateless reflector 2202 to reflect a packet. This process is described below with respect to FIG. 24.

Figure 24:
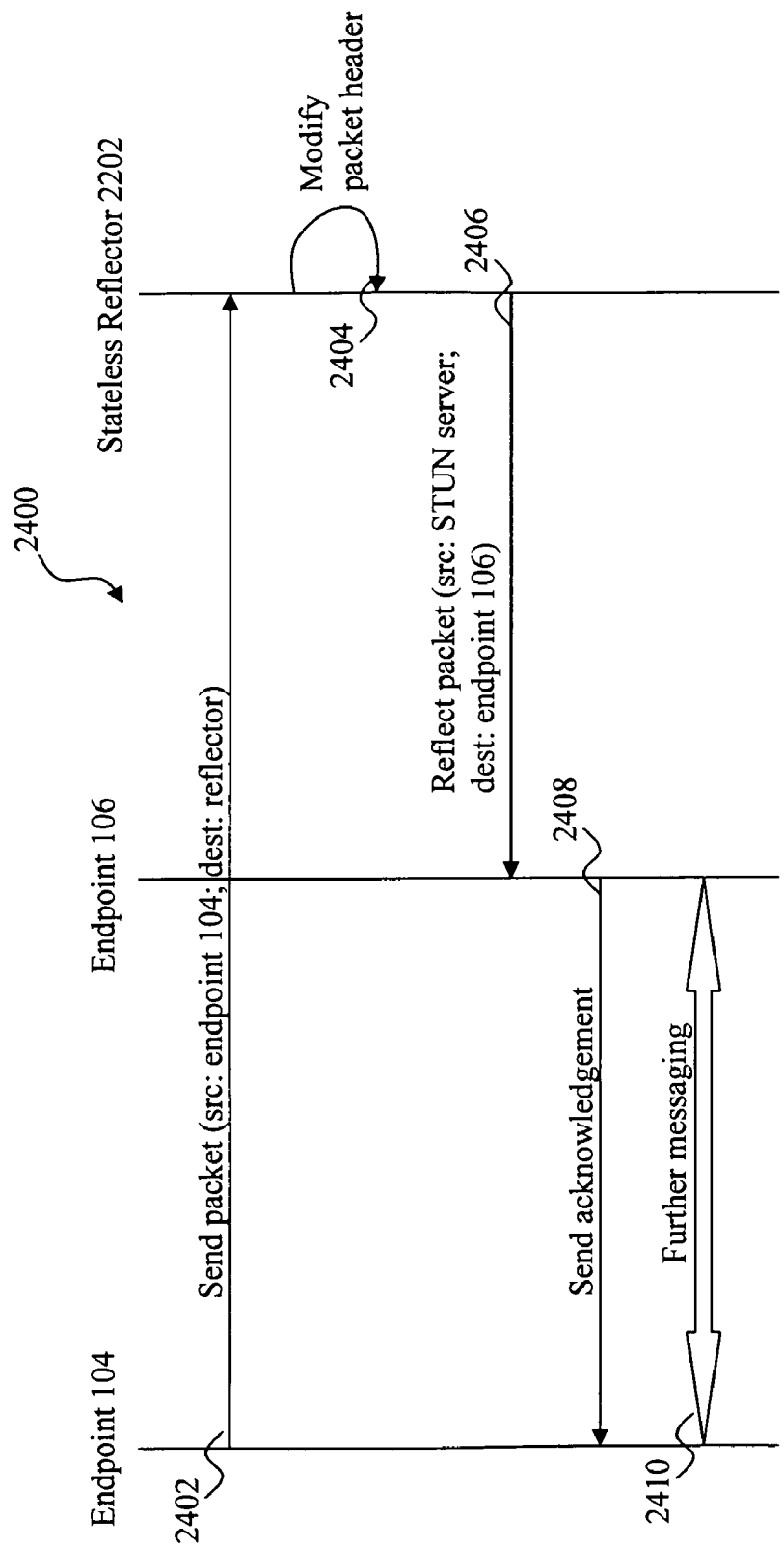
FIG. 24 is a sequence diagram illustrating one embodiment of a process from the table of FIG. 23 in greater detail.

Referring to FIG. 24, the endpoint 104 wants to inform the endpoint 106, which is already logged on, that the endpoint 104 has logged on. The NAT device 2204 is either a no NAT or a full cone type and the NAT device 2206 is either a restricted cone or a port restricted cone type. Accordingly, the endpoint 104 wants to send a message to the endpoint 106, but has not received a message from the endpoint 106 that would allow the endpoint 104 to traverse the NAT device 2206.

Although not shown in FIG. 24, prior to or during authentication, the endpoints 104 and 106 both sent a request to a STUN server (e.g., the STUN server 214 of FIG. 2) (not shown in FIG. 22). The STUN server determined an outbound IP address, an external port, and a type of NAT for the endpoints 104 and 106 (in this example, for the NAT devices 2204 and 2206). The STUN server 214 then sent a STUN response back to the endpoints 104 and 106 with the collected information. The endpoints 104 and 106 then sent an authentication request to an access server (e.g., the access server 102 of FIG. 1) (not shown in FIG. 22). The request contains the information about endpoints 104 and 106 received from the STUN server 214. The access server 102 responds to the requests by sending the relevant profile and routing table to the endpoints 104 and 106. In addition, each NAT device 2204 and 2206 may have a pinhole to the STUN server 214.

In the present example, the NAT device 2204 has an external address/port of 1.1.1.1:1111 and the NAT device 2206 has an external address/port of 2.2.2.2:2222. The STUN server 214 has an address/port of 3.3.3.3:3333 and the stateless reflector has an address/port of 4.4.4.4:4444. It is understood that the STUN server and/or stateless reflector 2202 may have multiple addresses/ports.

Figure 25:
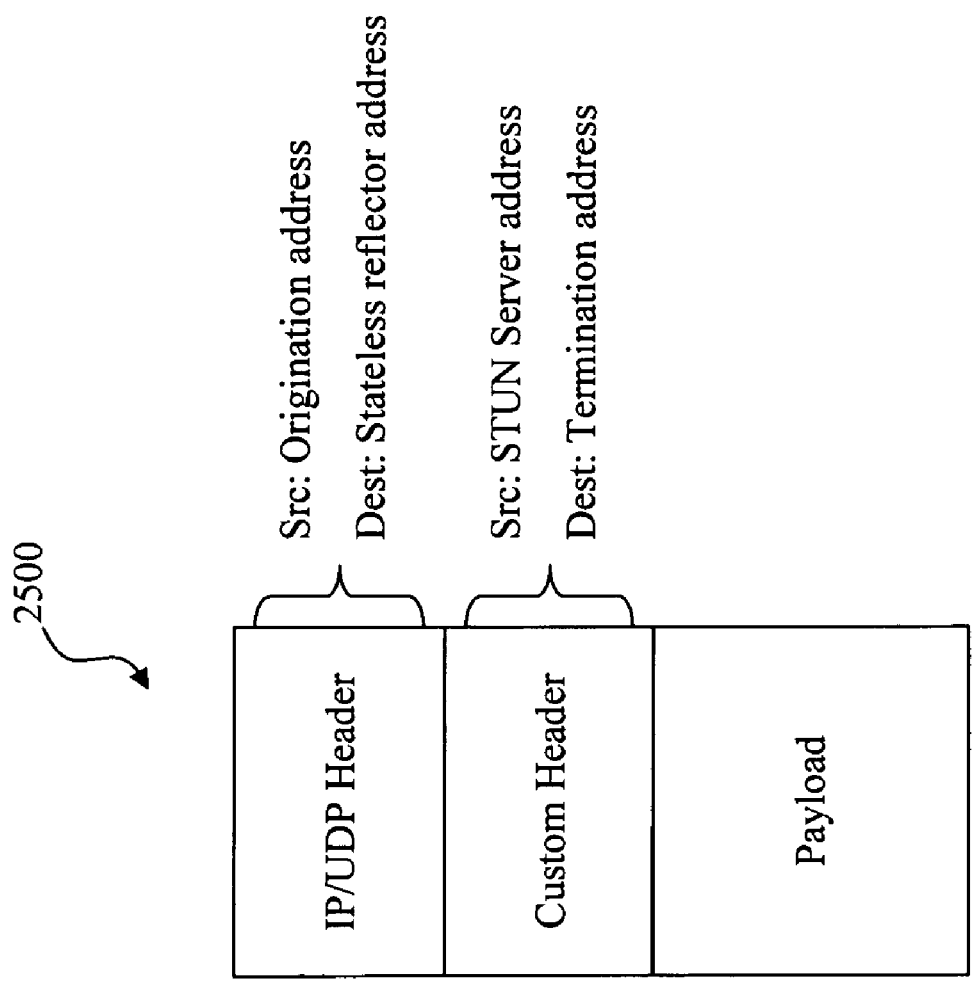
FIG. 25 illustrates one embodiment of a modified packet that may be used within the process of FIG. 24.

Referring to FIG. 24 and with additional reference to FIG. 25, in step 2402, the endpoint 104 sends a packet to the stateless reflector 2202. The packet contains header information identifying the source as the endpoint 104 (or rather, the external IP address of the NAT device 2204) and the destination as the stateless reflector 2202. The packet also contains custom or supplemental header information identifying the source as the STUN server 214 and the destination as the endpoint 106. Accordingly, the IP/UDP header of the packet sent from the endpoint 104 (via the NAT device 2204) identifies its source as 1.1.1.1:1111 and its destination as 4.4.4.4:4444.

In step 2404, the stateless reflector 2202 modifies the packet header by replacing the IP/UDP header with the source and destination from the custom header. In the present example, the stateless reflector 2202 will modify the IP/UDP header to identify the packet's source as 3.3.3.3:3333 and its destination as 2.2.2.2:2222. Identifying the packet's source as the STUN server 214 enables the stateless reflector 2202 to send the packet through the pinhole in the NAT device 2206 that was created when the endpoint 106 logged on. After modifying the header, the stateless reflector 2202 sends the packet to the endpoint 106 via the NAT device 2206 in step 2406.

In step 2408, the endpoint 106 sends an acknowledgement (e.g., a 200 OK) directly to the endpoint 104. The address of the endpoint 104 is contained within the payload of the packet. The endpoint 106 is able to send the acknowledgement directly because the NAT device 2204 is either a no NAT or a full cone type. Because the endpoint 106 has opened a pinhole through the restricted or port restricted NAT device 2206 to the endpoint 104 by sending a message to the endpoint 104, the endpoint 104 is now able to communicate directly with the endpoint 106, as indicated by step 2410.

Referring again to table 2300 of FIG. 23, if the originating NAT type is either a no NAT type or a full cone type, then the originating NAT can establish communications with a terminating NAT type that is symmetric only after using the stateless reflector 2202 to reflect a packet and then performing a port capture. This process is described below with respect to FIG. 26.

Figure 26:
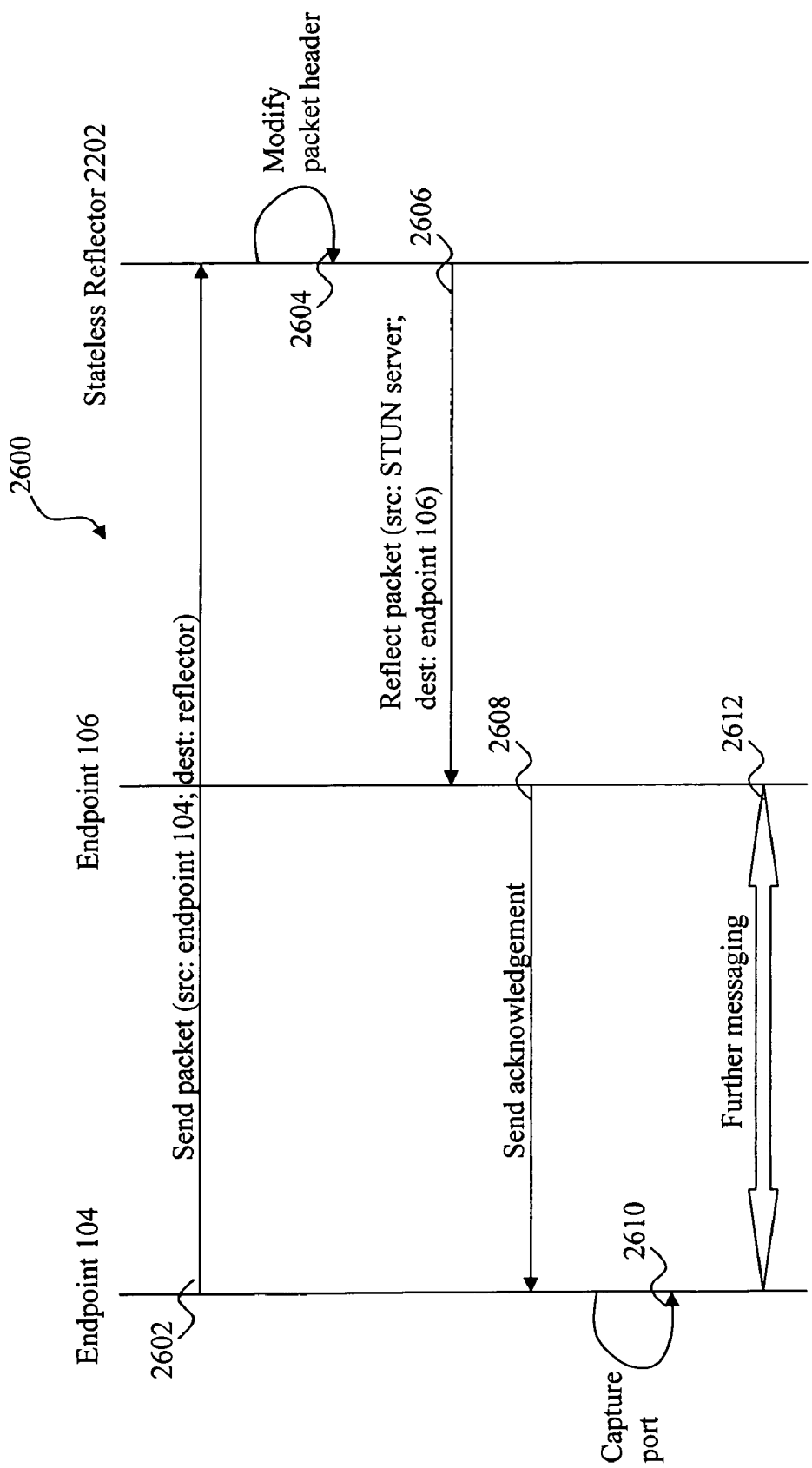
FIGS. 26-30 are sequence diagrams that each illustrate an embodiment of a process from the table of FIG. 23 in greater detail.

Referring to FIG. 26, steps 2602, 2604, 2606, and 2608 are similar to the reflection process described with respect to FIG. 24, and will not be described in detail in the present example.

Because the terminating NAT type is symmetric, the originating NAT needs the port of the terminating NAT in order to send packets through the NAT device 2206. Accordingly, in step 2610, the endpoint 104 will capture the external port used by the NAT device 2206 to send the acknowledgement in step 2608. This port, along with the address of the NAT device 2206, may then be used when communicating with the endpoint 106, as indicated by step 2612.

Referring again to table 2300 of FIG. 23, if the originating NAT type is either a restricted cone type or a port restricted cone type, then the originating NAT can establish communications with a terminating NAT type that is either restricted or port restricted by using a fake packet and then using the stateless reflector 2202 to reflect a packet. This process is described below with respect to FIG. 27.

Figure 27:
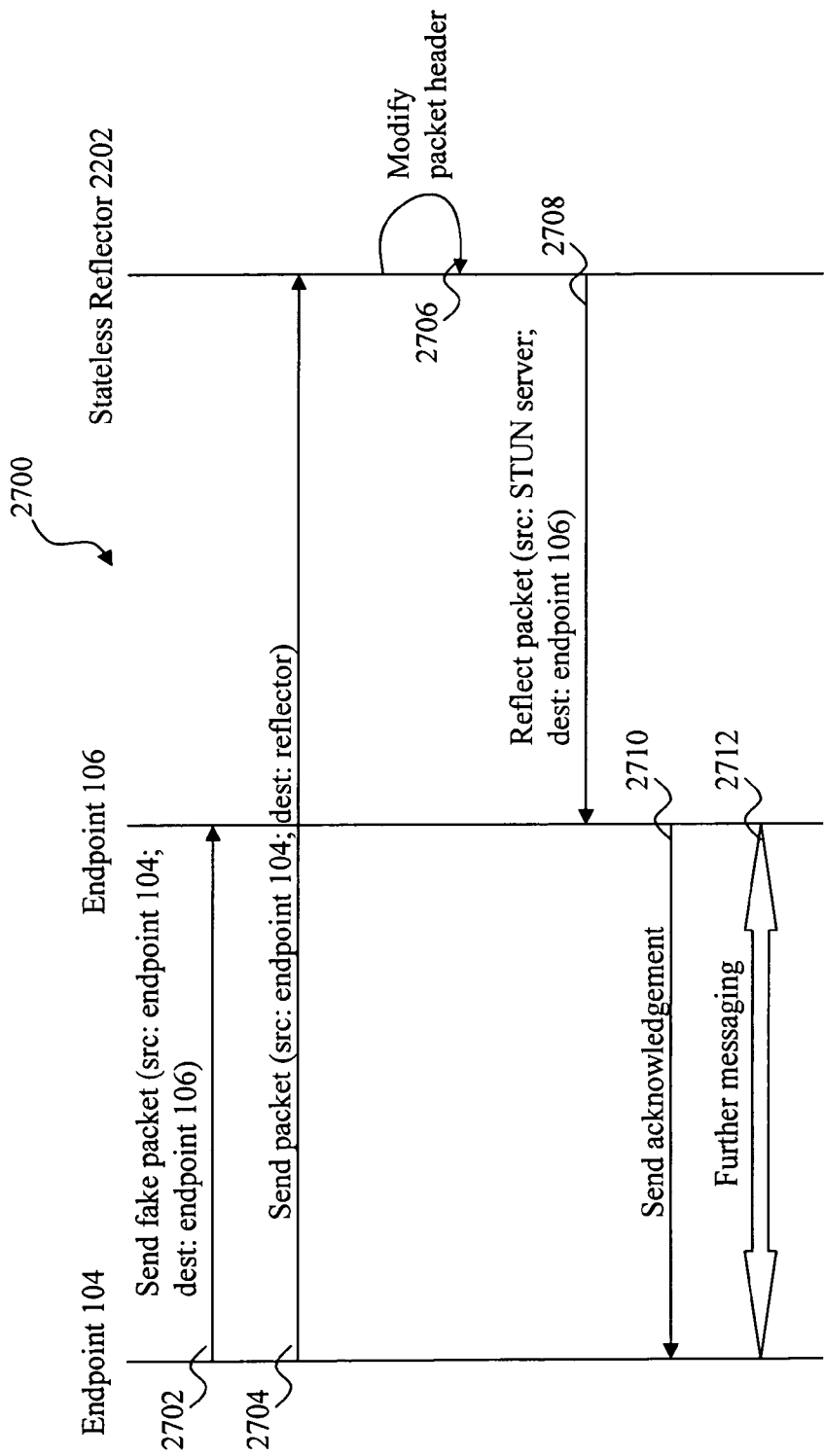

Referring to FIG. 27, in step 2702, the endpoint 104 sends a fake packet to the endpoint 106. Because the originating NAT type is a restricted cone type or a port restricted cone type, the fake packet opens a pinhole to the terminating NAT that will allow a response from the terminating NAT to penetrate the originating NAT. After sending the fake packet, the sequence 2700 proceeds with steps 2704, 2706, 2708, and 2710, which are similar to the reflection process described with respect to FIG. 24, and will not be described in detail in the present example. The endpoints 104 and 106 may then communicate directly, as indicated by step 2712.

Referring again to table 2300 of FIG. 23, if the originating NAT type is a symmetric type, then the originating NAT can establish communications with a terminating NAT type that is either no NAT or full cone after a port capture occurs. This process is described below with respect to FIG. 28.

Figure 28:
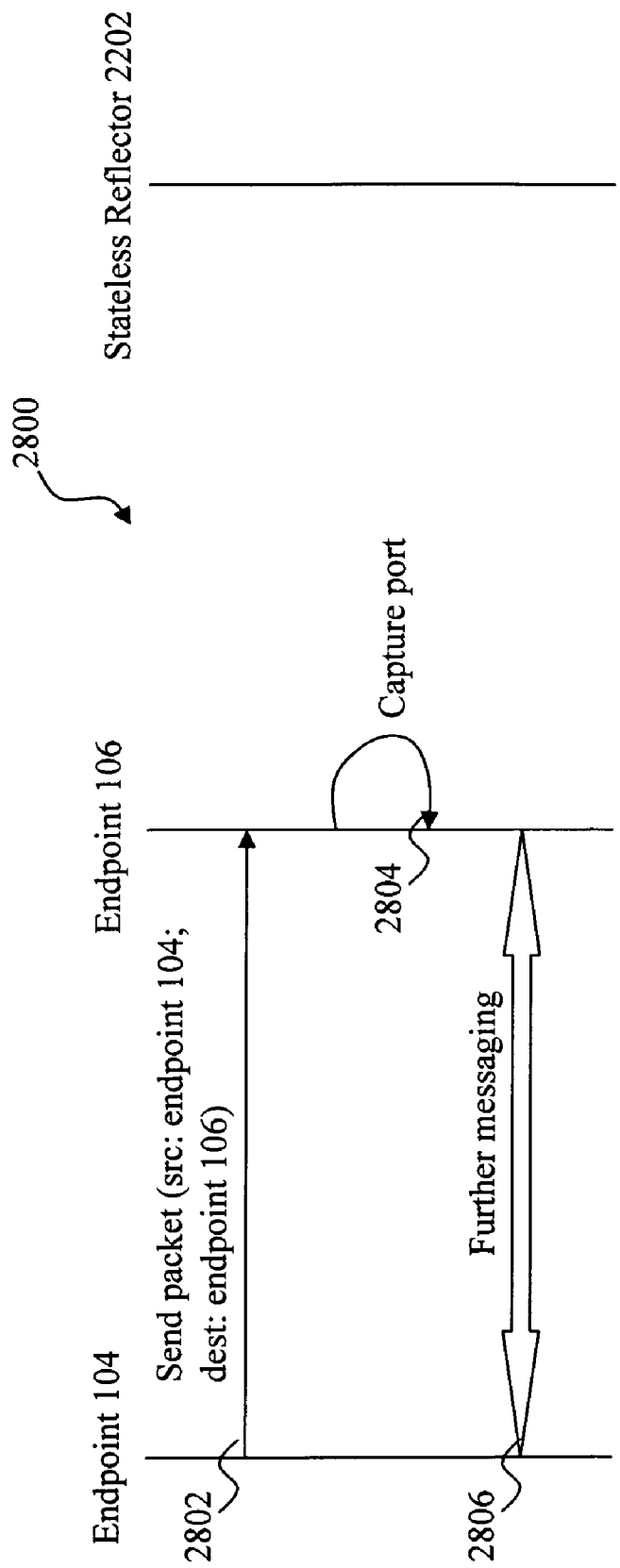

Referring to FIG. 28, in step 2802, the endpoint 104 (symmetric NAT type) sends a message to the endpoint 106. In step 2804, the endpoint 106 captures the external port used by the NAT device 2204 in sending the message. This port, along with the address of the NAT device 2204, may then be used when communicating with the endpoint 104 directly, as indicated by step 2806.

Referring again to table 2300 of FIG. 23, if the originating NAT type is a restricted cone type, then the originating NAT can establish communications with a terminating NAT type that is symmetric by using a fake packet, reflecting a packet using the stateless reflector 2202, and then performing a port capture. This process is described below with respect to FIG. 29.

Figure 29:
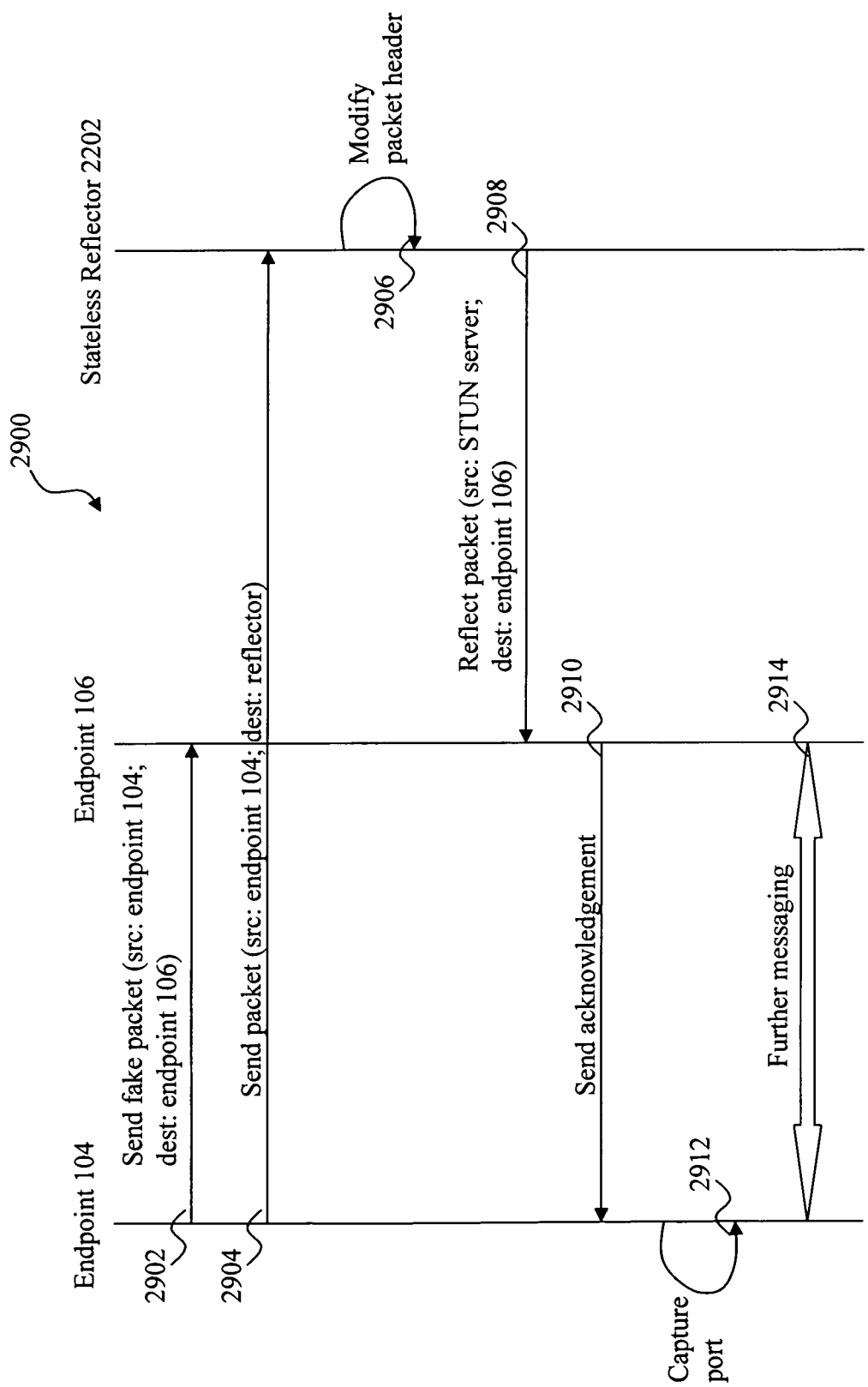

Referring to FIG. 29, in step 2902, the endpoint 104 sends a fake packet to the endpoint 106. Because the originating NAT type is a restricted cone type, the fake packet opens a pinhole to the terminating NAT that will allow a response from the terminating NAT to penetrate the originating NAT. After sending the fake packet, the sequence 2900 proceeds with steps 2904, 2906, 2908, and 2910, which are similar to the reflection process described with respect to FIG. 24, and will not be described in detail in the present example. In step 2912, the endpoint 104 captures the external port used by the NAT device 2206 in sending the acknowledgement in step 2910. This port, along with the address of the NAT device 2206, may then be used when communicating with the endpoint 106 directly, as indicated by step 2914.

Referring again to table 2300 of FIG. 23, if the originating NAT type is a symmetric type, then the originating NAT can establish communications with a terminating NAT type that is a restricted cone type by using a reflect, a fake packet, and a port capture. This process is described below with respect to FIG. 30.

Figure 30:
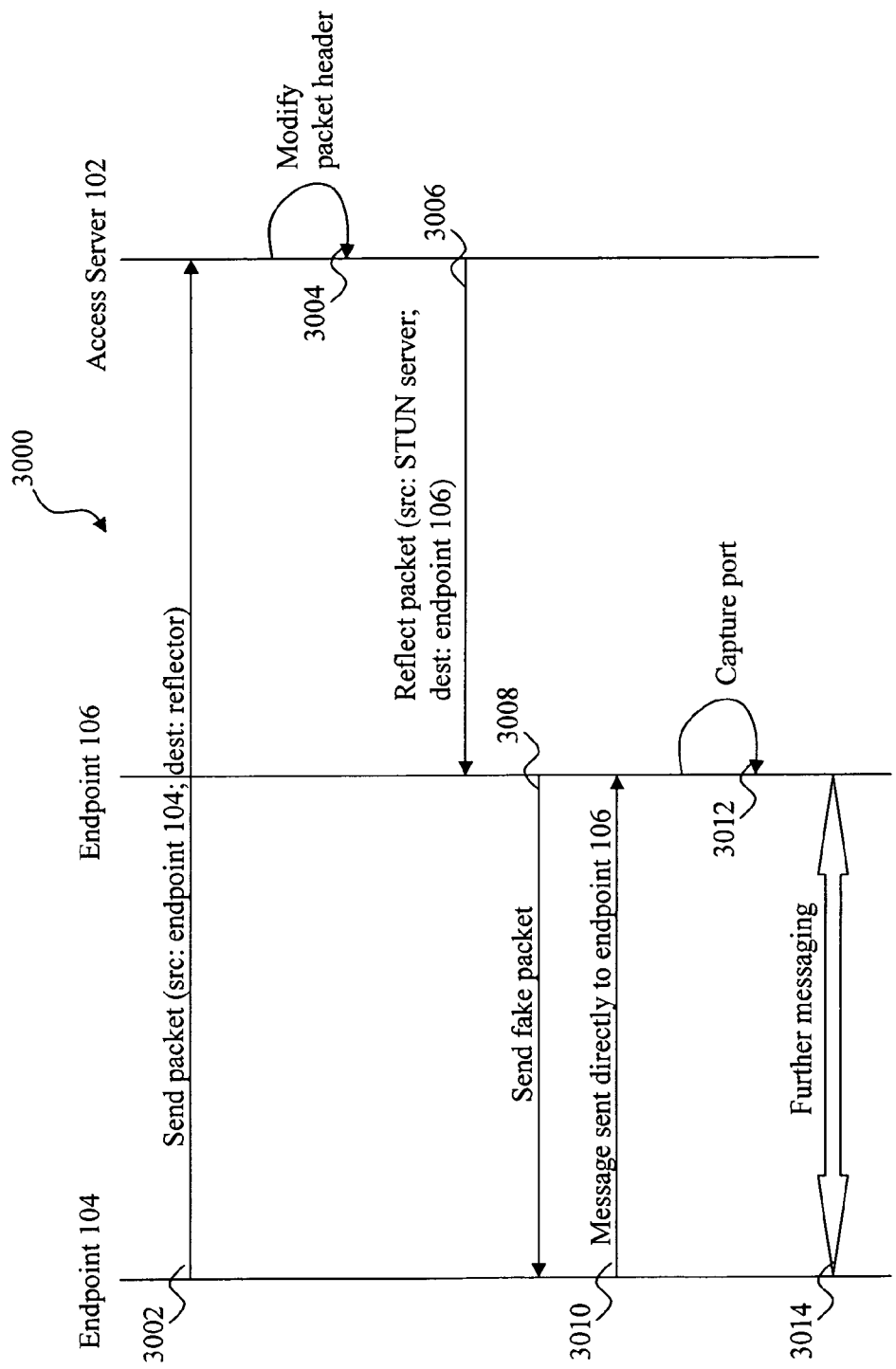

Referring to FIG. 30, steps 3002, 3004, and 3006 are similar to the reflection process described with respect to FIG. 24, and will not be described in detail in the present example. In step 3008, in response to the reflected message from the endpoint 104, the endpoint 106 sends a fake packet to the endpoint 104. Because the terminating NAT type is a restricted cone type, the fake packet opens a pinhole to the endpoint 104 to allow messages from the endpoint 104 to traverse the NAT device 2206. Accordingly, in step 3010, the endpoint 104 can send the next message directly to the endpoint 106 through the pinhole. In step 3012, the endpoint 106 captures the external port used by the NAT device 2204 to send the message in step 3010. This port, along with the address of the NAT device 2204, may then be used by the endpoint 106 when communicating directly with the endpoint 104, as indicated by step 3014.

Referring again to table 2300 of FIG. 23, if the originating NAT type is a symmetric type and the terminating NAT type is a port restricted cone, or if the originating NAT type is a port restricted cone and the terminating NAT type is symmetric, then all signaling between the two NAT devices is relayed via the stateless reflector 2202, while media is transferred via peer-to-peer, as described previously. If both the originating and terminating NAT types are symmetric, then all signaling and media are relayed via the stateless reflector 2202.

Accordingly, the peer-to-peer communications described herein may be achieved regardless of the NAT type that may be used by an endpoint. The stateless reflector 2202 need not know the information for each client, but instead reflects various packets based on information contained within the packet that is to be reflected. Both the custom header and payload may be encrypted for security purposes. However, the stateless reflector 2202 may only be able to decrypt the custom header and the payload itself may only be decrypted by the terminating endpoint. This enables the stateless reflector 2202 to perform the reflection functionality while maintaining the security of the payload itself. As described above, not all processes for traversing a NAT device may use the stateless reflector 2202.

Figure 31A:
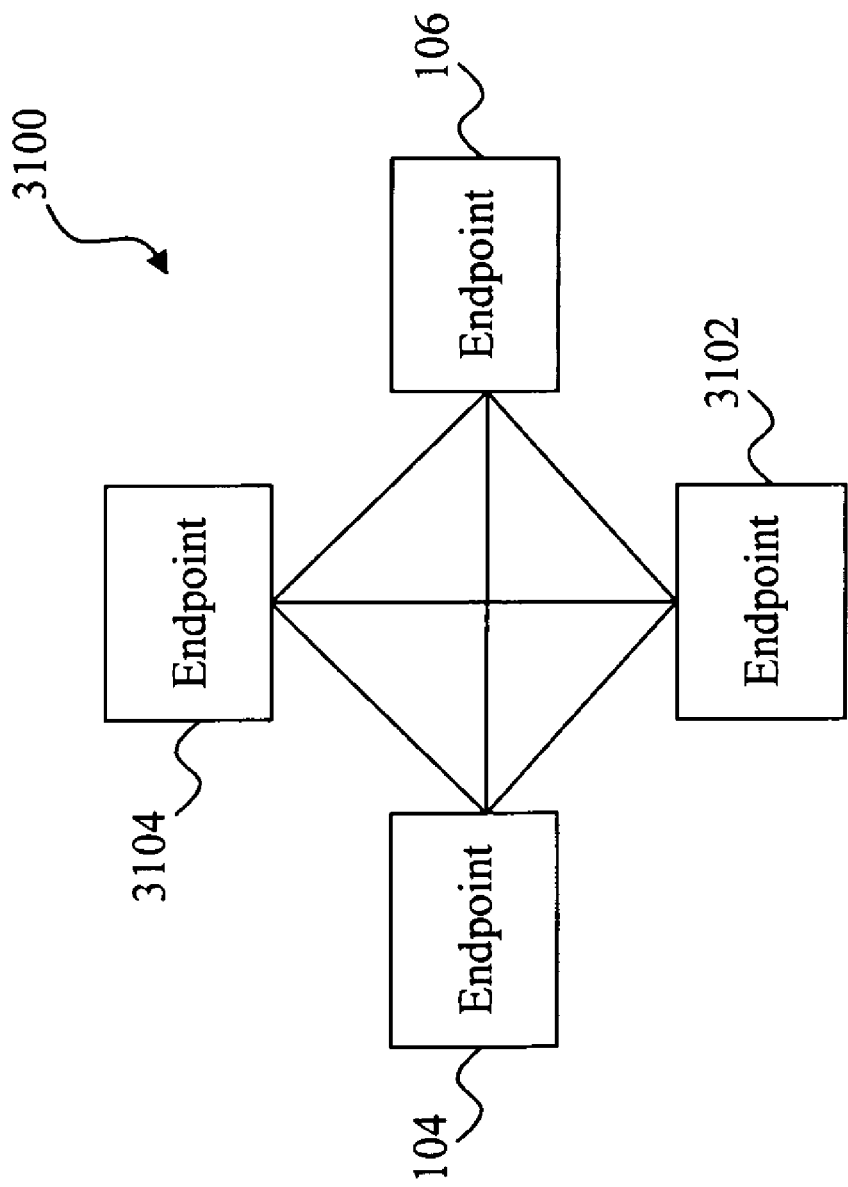
FIG. 31*a* is a simplified diagram of an embodiment of a peer-to-peer system in which endpoints may participate in concurrent sessions.

Referring to FIG. 31*a*, in another embodiment, a system 3100 enables concurrent sessions to be maintained by a single user from multiple endpoints. In the present example, endpoints 104, 106, 3102, and 3104 are coupled to each other and to an access server (not shown) through a network (not shown) as described with respect to FIG. 1. As described previously with respect to FIG. 4, each endpoint 104, 106, 3102, and 3104 may authenticate with a network device such as an access server to log onto the network. Such authentication uses, for example, a user ID and password that uniquely identifies a user in the network.

In the present example, although the endpoints 3102 and 3104 are physically separate from the endpoint 104, they are using the same authentication information as the endpoint 104. More specifically, the endpoints 104, 3102, and 3104 are associated in the system 3100 with a single authentication profile (e.g., a user ID, password, and/or other login information). The endpoint 106 is associated with a separate authentication profile and so is not a part of the concurrent sessions shared by the endpoints 104, 3102, and 3104.

In the present embodiment, the concurrent sessions associated with the endpoints 104, 3102, and 3104 may be either master sessions or slave sessions. For example, the endpoint 104 may be the master and the endpoints 3102 and 3104 may be the slaves. The master endpoint 104 may forward all incoming messages to all slave endpoints or may handle messages as defined in a policy (described later in greater detail). The system 3100 may automatically assign master/slave status to a particular endpoint (e.g., the first or last endpoint to log in with the particular user ID may be the master) or the master/slave sessions may be otherwise defined (e.g., in a policy defined by a user). Each session type may be further divided into status states, as illustrated below in Table 1.

TABLE 1

| Session Type | Status State - Owner | Status State - Other |
| --- | --- | --- |
| Master | Passive/Active | Offline/Online/Away |
| Slave | Passive/Active | Hidden |

As can be seen in Table 1, the information available about a particular endpoint may depend on whether the endpoint receiving the information is part of a concurrent session (owner) or is not part of a concurrent session (other). In some embodiments, each endpoint 104, 3102, and 3104 may be associated with a tag (e.g., home, office, cell, PDA). Such tags may be used to facilitate communication between endpoints sharing an authentication profile by enabling the endpoints to differentiate among themselves. Furthermore, in some implementations, an inactive master may be replaced by a slave or vice versa (i.e., only a slave or inactive master designation may be available).

Figure 31B:
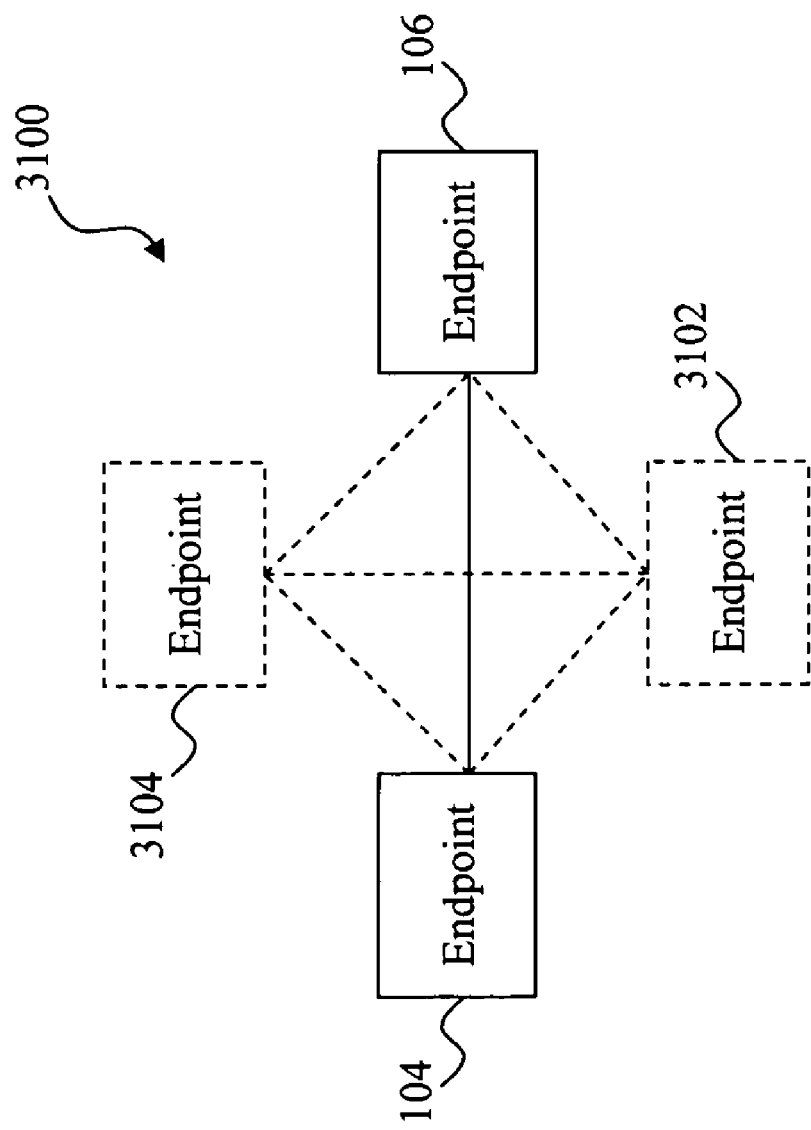
FIG. 31*b* is a simplified diagram of the peer-to-peer system of FIG. 31*a* from the perspective of an endpoint that is not involved in a concurrent session.

With additional reference to FIG. 31*b*, a view of the system 3100 from the perspective of the endpoint 106 is illustrated. Endpoints falling into the "other" category, such as the endpoint 106 (which is associated with a separate login from that used for the concurrent sessions of the endpoints 104, 3102, and 3104), may not be aware of the master/slave status of the endpoints 104, 3102, and 3104. Instead, the endpoints 3102 and 3104 are hidden (as illustrated by the dashed lines in FIG. 31*b*) and the buddy list provided to the endpoint 106 (as described with respect to FIG. 4) may simply show that the user ID associated with the endpoint 104 is online, offline, or away. If one of the endpoints 3102 or 3104 is later switched to the master endpoint and the endpoint 104 is switched to a slave endpoint, the endpoint 106 may see the endpoint 3102 or 3104 instead of the endpoint 104.

The availability of a user ID may be the sum total of the logins (e.g., a Boolean OR) so that the user is listed as online if any endpoint in a concurrent session is in an online status state. For example, the master endpoint 104 may have a status of away, but will appear to be online if at least one of the slave endpoints 3102 and 3104 has a status of online. Therefore, an endpoint may not be aware that another endpoint is associated with concurrent sessions and such awareness is not needed for communications to occur as previously described.

In contrast, an endpoint involved in a concurrent session login, such as one of the endpoints 104, 3102, and 3104, may be aware of all other endpoints logged in concurrently and may see the status of each endpoint as either passive or active (e.g., offline/unavailable or online/available). For example, a user of the endpoint 104 may not only see that the endpoint 3102 is logged in, but may determine whether the status of the endpoint 3102 is passive or active. Similarly, the endpoints 3102 and 3104 may see each other and the endpoint 104.

Figure 32:
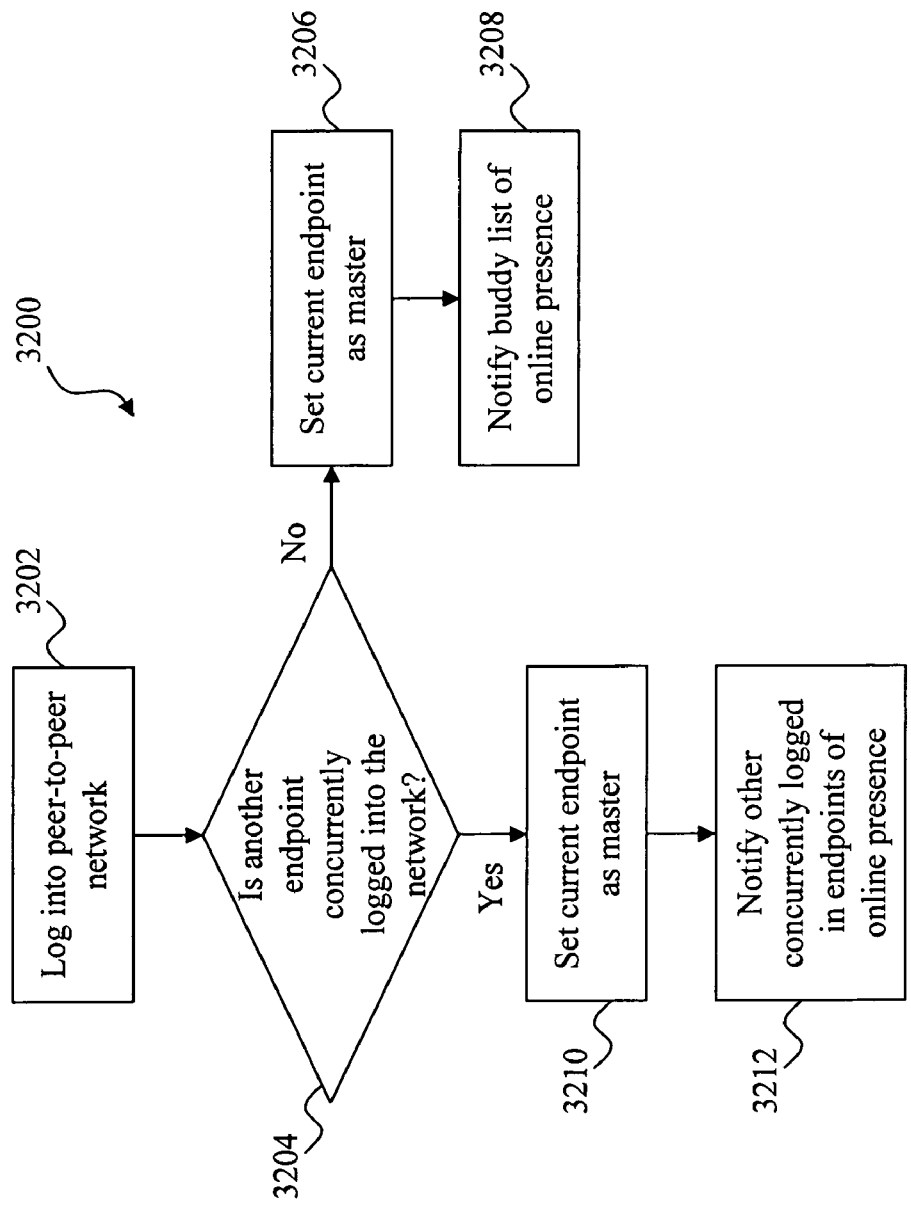
FIG. 32 is a flow chart of one embodiment of a method by which an endpoint may log in to the peer-to-peer system of FIG. 31*a* concurrently with another endpoint.

With additional reference to FIG. 32, a method 3200 illustrates one process by which master/slave status may be assigned and endpoint information may be communicated to other endpoints that are concurrently logged in. In the present example, the most recent endpoint to log on in a concurrent session becomes the master endpoint and the previous master becomes a slave. It is understood that this is for purposes of illustration and that other policies may be defined that, for example, set the previous master to an inactive master status rather than a slave.

In step 3202, an endpoint logs into the network as previously described. In step 3204, the endpoint determines whether any other endpoints are concurrently logged in. This information may be provided during the authentication process to an endpoint that logs in when another endpoint has already logged in using the same user ID. For example, the endpoint that is already logged in may be present in the buddy list and the endpoint logging in may examine the buddy list received during the authentication process to identify concurrently logged in endpoints. If no other endpoints are concurrently logged in, the method 3200 continues to step 3206, where the endpoint logging in is assigned master status. The endpoint may assign the status itself or may be assigned the status by another network entity, such as the access server 102 of FIG. 1. In step 3208, the endpoint then notifies the endpoints on its buddy list that are logged in of its online status.

If another endpoint is concurrently logged in (as determined in step 3204), the method 3200 proceeds to step 3210, where the endpoint is assigned master status. In step 3212, the endpoint notifies other concurrently logged in endpoints of its online status. Upon receiving the notification, the other concurrently logged in endpoints may be assigned slave status. In other embodiments, the new master endpoint may assign slave status to the other concurrently logged in endpoints.

It is understood that certain steps may be performed in an order different from that shown. For example, steps 3206 and 3210 may be combined into a single step that occurs before step 3204.

Figure 33:
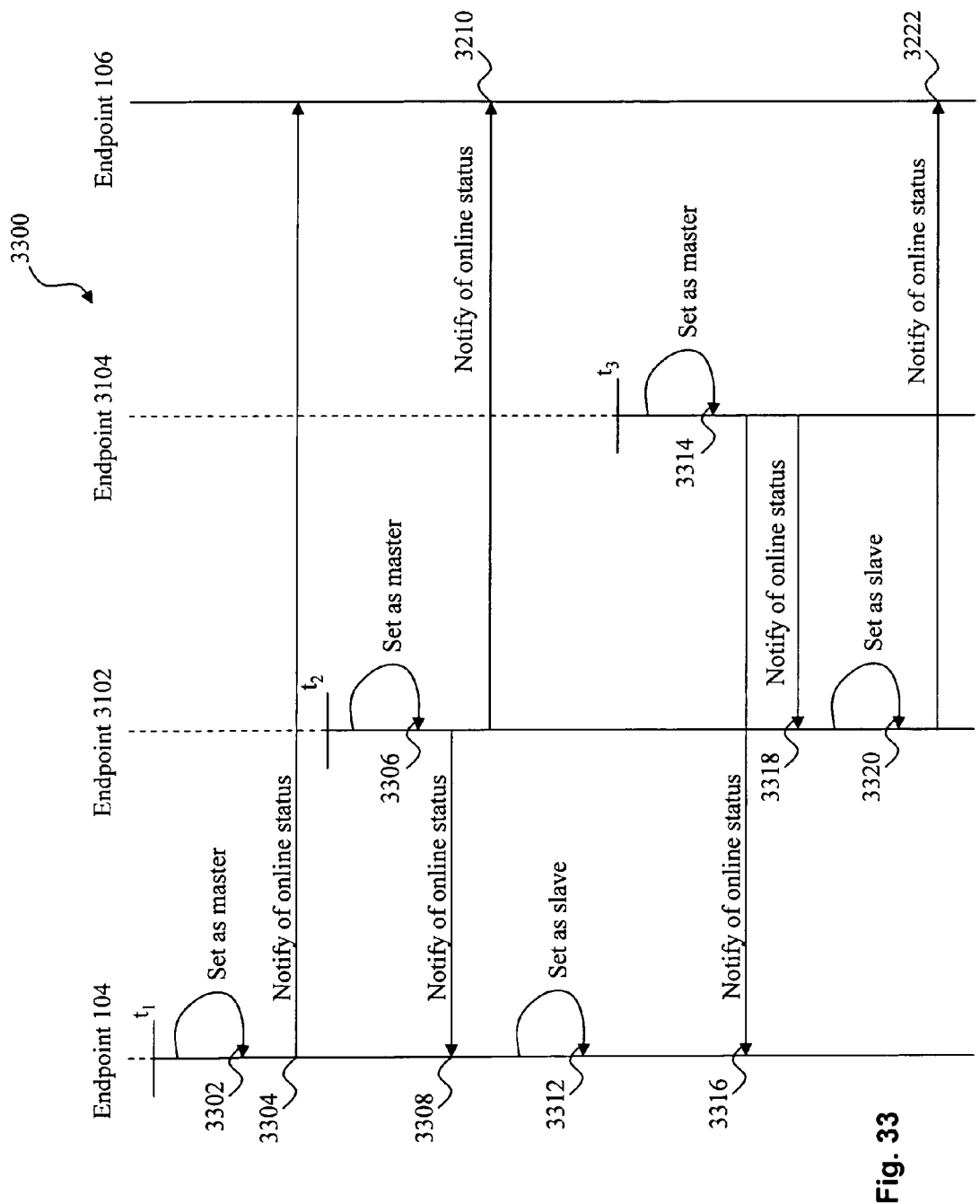
FIG. 33 is a sequence diagram illustrating endpoints notifying other endpoints of their online status within the system of FIG. 31*a*.

With additional reference to FIG. 33, in one embodiment, a sequence diagram 3300 illustrates a more detailed example of the communication of an endpoint with other endpoints, such as occurs in steps 3208 and 3212 of FIG. 32. In the present embodiment, the endpoint 106 has logged in prior to the beginning of the sequence, and none of the endpoints 104, 3102, and 3104 are logged in when the illustrated sequence begins.

The endpoint 104 logs into the network at time $t_1$. In the present example, the most recent endpoint to log on in a concurrent session becomes the master endpoint. It is understood that this is for purposes of illustration and that other policies may be defined that, for example, set the previous master to an inactive master status rather than a slave. No other endpoints are concurrently logged in, and the endpoint 104 is assigned master endpoint status in step 3302. In step 3304, the endpoint 104 notifies the endpoint 106 (which is on endpoint 104's buddy list) that the endpoint 104 is online.

At time $t_2$, the endpoint 3102 logs onto the network using the same login information as the endpoint 104. Although the endpoint 104 is already online, the endpoint 3102 is assigned master status in step 3306 as the most recent endpoint to log on in a concurrent session becomes the master endpoint. An endpoint that has logged in may be notified when another endpoint logs in concurrently in a manner similar to the notification that occurs when a buddy logs into the system. Accordingly, in steps 3308 and 3310, the endpoint 3102 notifies the endpoints 104 and 106, respectively, that the endpoint 3102 is online. In step 3312, the endpoint 104 is assigned slave status after receiving the notification in step 3308.

In the present example, the notification sent to endpoint 106 in step 3210 instructs the endpoint 106 to switch the address for the owner of the concurrent login session from the endpoint 104 to the endpoint 3102. The user of the endpoint 106 may be unaware of this switch, as the technical information needed for contacting the user ID associated with the endpoints 104 and 3102 may be handled by the underlying software of the endpoint 106. Accordingly, the introduction of the endpoint 3102 as the new master and the switch of the endpoint 104 from master to slave does not impact the user of the endpoint 106 and may occur without the user's knowledge. From a technical perspective, communications sent from the endpoint 106 to the user ID associated with the endpoints 104 and 3102 (which is viewed as a single login by the endpoint 106) may be sent directly to the endpoint 104 prior to the login of the endpoint 3102, and directly to the endpoint 3102 (and not to the endpoint 104) after the endpoint 3102 logs in.

At time $t_3$, the endpoint 3104 logs onto the network using the same login information as the endpoints 104 and 3102. Although the endpoints 104 and 3102 are already online, the endpoint 3104 is assigned master status in step 3314 as the most recent endpoint to log on in a concurrent session becomes the master endpoint. In steps 3316 and 3318, the endpoint 3104 notifies the endpoints 104 and 3102, respectively, that the endpoint 3104 is online. In step 3320, the endpoint 3102 is assigned slave status after receiving the notification in step 3318. The endpoint 104 is already a slave and so does not need to change its status. In step 3222, the endpoint 3104 notifies the endpoint 106 that it is online. As described above, the notification in step 3222 instructs the endpoint 106 to switch to the address of the endpoint 3104 when communicating with the user ID associated with the endpoints 104, 3102, and 3104.

As is shown, the order of the notifications may differ. For example, all endpoints may be notified when a new master logs on, as occurs with the endpoint 3102 in steps 3308 and 3310. The previous master may then be assigned slave status, as occurs in step 3312. Alternatively, endpoints in the same concurrent session may be notified first, as occurs in steps 3316 and 3318, and the previous master may be assigned slave status (step 3320) prior to notifying endpoints outside of the concurrent session of the new master (step 3222).

In other embodiments, the notification system may be different. For example, if the newest endpoint to log into a concurrent session is set as a slave, then the endpoint 3104 may not notify the endpoint 106 that it is online. In still other embodiments, the endpoint 3104 may only notify the endpoint 104 (which is still the master endpoint) that it is online. The endpoint 104 may then notify the slave endpoints of the endpoint 3104's online presence or may provide no such notification.

Figure 34:
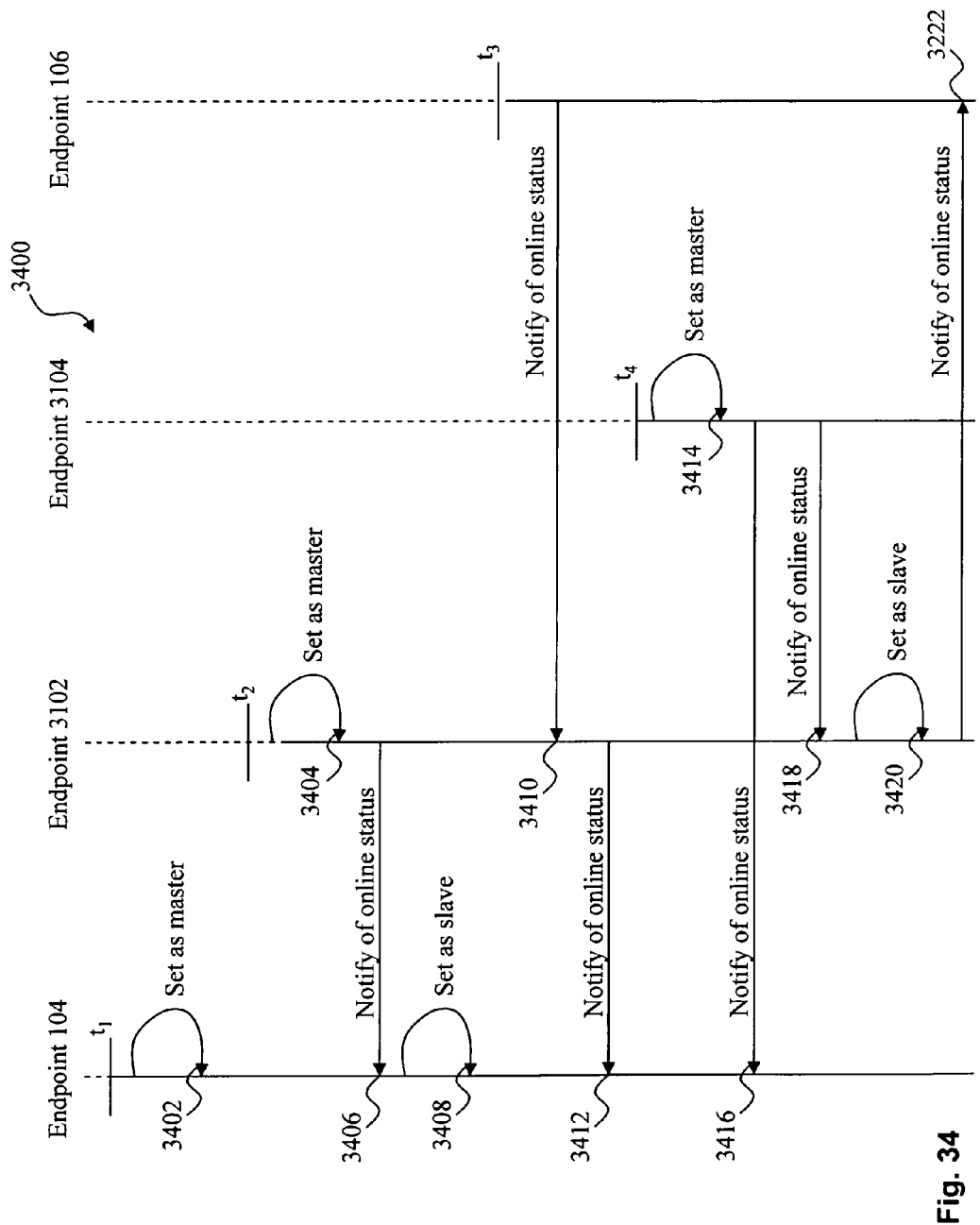
FIG. 34 is a sequence diagram illustrating endpoints notifying other endpoints of their online status within the system of FIG. 31*a*.

Referring to FIG. 34, in another embodiment, a sequence diagram 3400 illustrates a more detailed example of the communication of an endpoint with other endpoints, such as occurs in steps 3208 and 3212 of FIG. 32. In the present embodiment, none of the endpoints 104, 106, 3102, and 3104 are logged in prior to the beginning of the sequence.

The endpoint 104 logs onto the network at time $t_1$. In the present example, the most recent endpoint to log on in a concurrent session becomes the master endpoint. It is understood that this is for purposes of illustration and that other policies may be defined that, for example, set the previous master to an inactive master status rather than a slave. No other endpoints are concurrently logged in and the endpoint 104 is assigned master endpoint status in step 3402.

At time $t_2$, the endpoint 3102 logs onto the network using the same login information as the endpoint 104. Although the endpoint 104 is already online, the endpoint 3102 is assigned master status in step 3404 as the most recent endpoint to log on in a concurrent session becomes the master endpoint. In step 3406, the endpoint 3102 notifies the endpoint 104 that the endpoint 3102 is online and the endpoint 104 is assigned slave status in step 3408

At time $t_3$, the endpoint 106 logs onto the network using login information different from that used by the endpoints

104 and 3102. In step 3410, the endpoint 106 notifies the endpoint 3102 that the endpoint 106 is online. As the endpoint 106 is a slave and hidden from the endpoint 106, the endpoint 106 does not send a notification to the endpoint 104. However, in step 3412, the endpoint 3102 may notify the endpoint 104 that the endpoint 106 is online.

At time $t_4$, the endpoint 3104 logs onto the network using the same login information as the endpoints 104 and 3102. The endpoint 3104 is assigned master status in step 3414 as the most recent endpoint to log on in the concurrent session with the endpoints 104 and 3102. In steps 3416 and 3418, the endpoint 3104 notifies the endpoints 104 and 3102, respectively, that the endpoint 3104 is online. In step 3420, the endpoint 3102 is assigned slave status. The endpoint 104 is already a slave and so does not need to change its status. In step 3222, the endpoint 3104 notifies the endpoint 106 that it is online. As described above, the notification in step 3222 instructs the endpoint 106 to switch to the address of the endpoint 3104 when communicating with the user ID associated with the endpoints 104, 3102, and 3104.

It is understood that the order of the notifications may differ from that shown. For example, all endpoints (i.e., endpoints both within a concurrent session and outside of the session) may be notified when a new master logs on before the previous master is assigned slave status.

In other embodiments, the notification system may be different. For example, if the newest endpoint to log into a concurrent session is set as a slave, then the endpoint 3104 may not notify the endpoint 106 that it is online. In still other embodiments, the endpoint 3104 may only notify the endpoint 104 (which is still the master endpoint) that it is online. The endpoint 104 may then notify the slave endpoints of the endpoint 3104's online presence or may provide no such notification.

In some embodiments, only a master endpoint may be able to see other endpoints that are concurrently logged and/or determine their status. In still other embodiments, a slave and/or master endpoint may be enabled to define its current state as online, offline, or away. Additionally or alternatively, the status state of passive/active for an endpoint may be user defined or defined automatically, such as by a predefined period of inactivity that moves an endpoint from an active state to a passive state.

Figure 35:
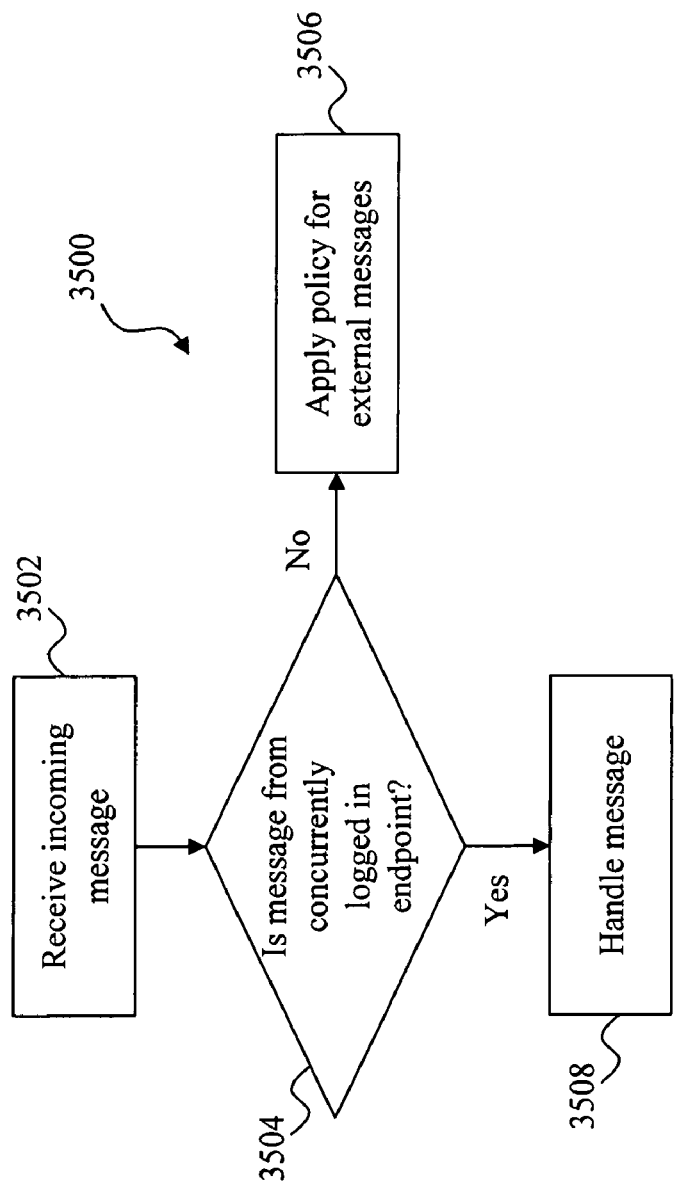
FIG. 35 is a flowchart of one embodiment of a method for message handling that may occur within the system of FIG. 31*a*.

Referring to FIG. 35, in another embodiment, a method 3500 illustrates how a message received by a master endpoint, such as the endpoint 104 of FIG. 31*a*, may be handled. In the present example, endpoints that are concurrently logged in (e.g., the endpoints 104, 3102, and 3104) can communicate directly, but endpoints not part of the concurrent login (e.g., the endpoint 106) need to send messages to the master endpoint 104.

In step 3502, a message is received by the master endpoint 104 and, in step 3504, a determination is made as to whether the message is from an endpoint that is concurrently logged in with the master endpoint or is from another endpoint. For example, the master endpoint 104 may compare a user ID associated with the endpoint that sent the message with the master endpoint's own user ID. If the message is from an endpoint that is not concurrently logged in with the master endpoint 104, the master endpoint may apply a policy that has been defined for such messages in step 3506. The policy may be used to configure the endpoint to allow and/or prohibit activities to provide functionality such as call forwarding, message forwarding, and file transfer, and such activities may be specific to a particular user of one of the concurrent sessions and/or to a user/endpoint attempting to communicate with the master endpoint. A more detailed example of step 3506 will be described below with respect to FIG. 36. If the message is from an endpoint that is concurrently logged in with the master endpoint 104, the method 3500 continues to step 3508, where it handles the message appropriately. Such handling may include message forwarding, file retrieval and transfer, and any other functionality enabled by the configuration of the endpoint 104.

Figure 36:
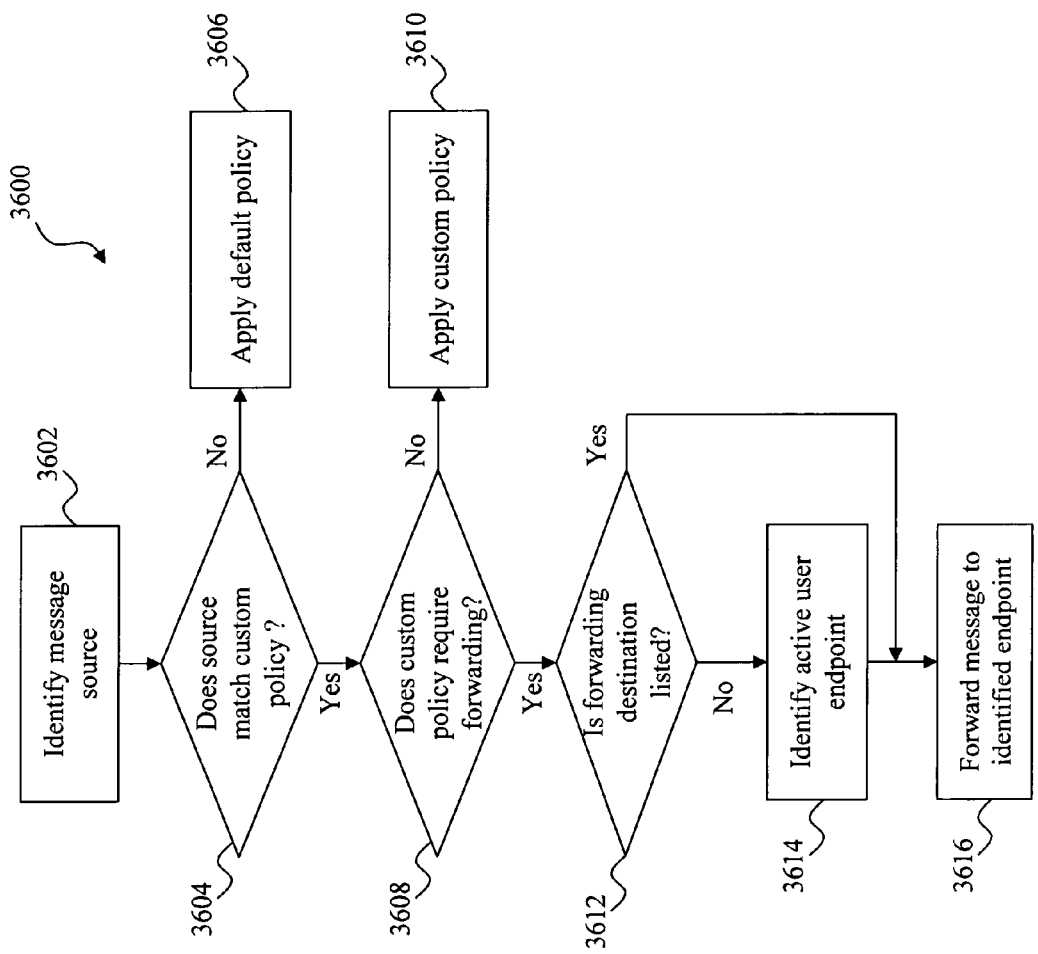
FIG. 36 is a flowchart of one embodiment of a method for applying a policy that may be used with the method of FIG. 35.

Referring to FIG. 36, in one embodiment, a method 3600 illustrates a more detailed example of step 3506 of FIG. 35. In step 3602, source information associated with the message is identified. Examples of such source information include a user ID associated with an endpoint, an IP address, and/or a phone number. In step 3604, a determination is made as to whether the source matches a custom policy. If the source information does not match a custom policy, the method 3600 continues to step 3606, where a default policy may be applied. For example, the default policy may provide instructions on how to handle all messages not covered by a custom policy.

If the source information does match a custom policy, the method 3600 continues to step 3608, where a determination may be made as to whether the custom policy requires forwarding. For example, the user of the endpoint 104 may instruct the endpoint to forward voice calls to his cellular phone if the call comes from a particular number or endpoint. If the source information matches the cell phone number (as determined in step 3604), the endpoint 104 may then identify the particular policy and forwarding information that is to be applied for messages originating from that source. If the custom policy does not require forwarding, the method continues to step 3610 and applies the custom policy.

If the custom policy does require forwarding, a determination may be made in step 3612 as to whether a forwarding destination is listed. For example, the cell phone number provided by the user of the endpoint 104 as described with respect to step 3608 may be listed in the custom policy. If so, the endpoint 104 would connect the incoming call with the cell phone using the listed number in step 3616.

In the present example, when the endpoint 104 receives a call, it may operate as a virtual PBX and forward the message to the user's cell phone (e.g., the endpoint 104). Rather than co-locating the call as would be done by a conventional PBX, the endpoint 104 may serve as a bridge during the conversation. Other calls or messages received may be responded to in a predefined manner using custom policies, such as being routed to voicemail (if a phone call) or answered with an away message (if a text message). Accordingly, by using a policy, the user may define the behavior of the concurrent sessions.

If the custom policy does not list a forwarding destination, the method continues to step 3614, where it attempts to identify an active user endpoint. Locating an active endpoint may be accomplished in different ways and the policy may specify how it should be done and/or may prioritize a variety of methods that should be used. Accordingly, a user may log into multiple endpoints and establish a private network with roaming capabilities. For example, the master endpoint may be instructed to forward messages to the endpoint associated with the most recent user activity, may execute a search routine for a user using a process such as round robin by trying each endpoint in turn, or may try all endpoints simultaneously. If all endpoints are tried simultaneously, the endpoint that answers may instruct the other endpoints to disconnect (e.g., in a voice call). As will be described later in greater detail, additional parameters may be introduced into such a search, such as searching for an active endpoint that is associated with a user who meets specific criteria (e.g., a language or a specific skill).

In one example of an environment in which the concurrent sessions described herein may be used, assume that the user of the endpoint 104 of FIG. 31a logs in at home and defines the endpoint 104 as the master endpoint. The user then goes to the office, logs in using the endpoint 3102 (while the endpoint 104 is still logged in), defines the endpoint 3102 as the active master, and sets the endpoint 104 as an inactive master. In this scenario, when the user leaves the office (and logs the endpoint 3102 off the network), the endpoint 104 may resume its previous status as active master and forward calls, etc., to the user as the user is traveling home.

In another example of an environment in which the concurrent sessions described herein may be used, assume that the user of the endpoint 104 of FIG. 31a logs in at home and defines the endpoint 104 as the master endpoint. The user then goes to the office, logs in using the endpoint 3102 (while the endpoint 104 is still logged in), defines the endpoint 3102 as the active master, and sets the endpoint 104 as either a slave or an inactive master. In this scenario, if the user receives a request for a communication session (e.g., a call or instant message) for someone at home, the user may forward the call to the endpoint 104 (routing it via the endpoint 3102). Alternatively, the user may respond by forwarding the address information of the endpoint 104 to the calling endpoint and letting the calling endpoint contact the endpoint 104 directly (even though the endpoint 104 is a slave or inactive master). If the endpoint 104 is protected by a NAT device, the endpoint 3102 may aid the endpoint 106 in making contact (e.g., by instructing the endpoint 104 to open a pinhole). Accordingly, although a slave or inactive master endpoint may not be readily visible to endpoints that are not part of a concurrent session, they may still communicate directly with endpoints not part of the concurrent session in some embodiments.

In another example of an environment in which the concurrent sessions described herein may be used, assume that the user of the endpoint 104 of FIG. 31a logs in at home and defines the endpoint 104 as the master endpoint. The user then goes to the office, logs in to the endpoint 3102 (while the endpoint 104 is still logged in), and defines the endpoint 3102 as the slave. Generally, the master endpoint 104 will forward all messages to the slave endpoint 3102. However, to avoid being disturbed except in certain circumstances, the user of the endpoint 3102 may define certain settings in the policy for his user ID. The settings may include whether to forward messages from the endpoint 104 or may define certain messages that are to be forwarded (e.g., from a particular person). Accordingly, while a user of the endpoint 106 may see the endpoint 104 as online and may send messages to the endpoint 104, the messages may be forwarded to the endpoint 3102 only if they satisfy the criteria defined in the policy associated with the endpoints 104 and 3102. At this point, the endpoint 104 may serve as a bridge and forwards messages from the endpoint 106 to the endpoint 3102 and vice versa. In other embodiments, the endpoint 104 or 3102 may notify the endpoint 106 that it should communicate directly with the endpoint 3102.

In yet another example, the user may instruct the endpoint 104 of FIG. 31a to forward voice calls to his cellular phone if the call comes from a particular number or endpoint. In this case, when the endpoint 104 receives a call, it may operate as a virtual PBX and forward the message to the user's cell phone (e.g., the endpoint 3102). Rather than co-locating the call as would be done by a conventional PBX, the endpoint 104 may serve as a bridge during the conversation. Other calls or messages received may be responded to in a predefined manner, such as being routed to voicemail (if a phone call) or answered with an away message (if a text message). Accordingly, by using a policy, the user may define the behavior of the concurrent sessions.

In still another example, the endpoints 104, 3102, and 3104 of FIG. 31a may be placed on the buddy list of the endpoint 106 prior to use of the endpoint 106. For example, the endpoints 104, 3102, and 3104 may be contact endpoints for a customer support system and the endpoint 106 may be a device (e.g., a personal computer) sold to a customer. Generally, as described previously, in order to communicate with the endpoints 104, 3102, and 3104, the endpoint 106 must first contact the endpoints 104, 3102, and 3104 and request permission (assuming that permission has not previously been granted).

In the present example, the endpoint 106 is given permission to contact the endpoints 104, 3102, and 3104 (which are "virtual buddies" of the endpoint 106) prior to the need for such communication. For example, permission may be given to the endpoint 106 when the computer is loaded with software. Accordingly, the user of endpoint 106 may contact the endpoints 104, 3102, and 3104 any time support is needed, although the user of endpoint 106 may not be aware of the actual contact information. In some embodiments, the user may simply select a support icon, which may then pull up a list of options such as call, send email, and send instant message. The user selects the desired option and the endpoint 106 contacts the virtual buddy (endpoint 104), which takes the appropriate action based on the user preferences. In some embodiments, the endpoint 106 may contact a different virtual buddy based on the user's selection. For example, the endpoint 106 may send an instant message to the endpoint 104, but may route a voice call to the endpoint 3102.

In such a customer support system, each of the endpoints 104, 3102, and 3104 may be a master. When each of the endpoints 104, 3102, and 3104 logs on, it sends a notification to the endpoint 106 that it is available (or the endpoint 106 is informed that the endpoints 104, 3102, and 3104 are online when it logs on). Accordingly, the endpoint 106 may contact any of the endpoints 104, 3102, and 3104 or may be directed to a particular endpoint or set of endpoints, as described below.

As discussed previously, a policy may be used to define the endpoints that a particular endpoint has permission to contact. Accordingly, each master endpoint in a customer support system (e.g., the endpoints 104, 3102, and 3104) may be segmented and the particular segmentation may be used to customize the profile downloaded by the endpoint 106. For example, the endpoints 104, 3102, and 3104 may be segmented to provide technical support capabilities that take into account language preferences, time zones, available support staff, and similar concerns. In the present disclosure, such segmentation may result in the endpoint 106 contacting a particular subset of the endpoints 104, 3102, and 3104, depending on the particular policies that have been implemented.

For example, assume that a support center has customers that speak different languages, live in different time zones, and have support needs for different products. Using one or more policies, the support center may define certain endpoints or groups of endpoints to handle certain languages, time zones, and products. Accordingly, when a customer's endpoint is instructed to contact the support center, the customer's endpoint may contact a given subset of endpoints that exists in its profile. Alternatively, the customer's profile may contain a large number of available contact endpoints, and the customer's endpoint may perform searching within the set of available endpoints based on the time zone of the customer's endpoint (e.g., to locate customer support personnel during working hours), language, technical expertise, and/or by any other desired characteristics. Such searching allows the customer's endpoint to search with varying levels of granularity and enables the support center to provide highly customized support skills by segmenting and identifying contact endpoints in the profile. Furthermore, as the contact endpoint may be located in the customer support personnel's home, the support center may be able to utilize individuals with hard to find skills and/or those who are unwilling or unable to work elsewhere.

In addition, each endpoint used by the customer support center may provide additional parameters. For example, an endpoint may be configured with a policy to show as unavailable after working hours even if the endpoint is online. When the customer's endpoint is searching for an endpoint within a group, it may then take into account the fact that the endpoint is unavailable and select an endpoint meeting the desired criteria that is listed with a status of available. For example, the customer's endpoint may attempt to place a voice call based on a list of available contact endpoints, and may continue down the list until it finds a contact endpoint that is not busy. As this process is handled by the customer's endpoint, rather than the customer actively waiting in a queue or calling multiple numbers, the customer's level of frustration may be lessened and the likelihood of properly matching the customer with the appropriate support personnel based on the customer's preference settings is increased.

In yet another example, concurrent sessions may provide file transfer or remote access capability between endpoints concurrently logged in. In this embodiment, the endpoints 104 and 3102 may be viewed as forming a virtual private network (VPN) that facilitates secure access to the other endpoint. Accordingly, continuing the example of a user logging in to the endpoint 104 at home and the endpoint 3102 at the office, the user may transfer files between the two endpoints using the VPN functionality provided by the concurrent sessions. For example, the user of the endpoint 3102 may use the VPN to access and retrieve files from the endpoint 104. Such access and retrieval may be achieved in different ways, such as using a command line interface or using a GUI that enables the user to browse the file system of the endpoint 104 from the endpoint 3102. It is understood that security features, such as the existence of a security layer to prevent file access or file transfer without an additional password, may be provided for enhanced security. The file transfer may occur as disclosed in U.S. patent application Ser. No. 11/341, 028, filed on Jan. 27, 2006, and entitled "SYSTEM AND METHOD FOR DATA TRANSFER IN A PEER-TO-PEER HYBRID COMMUNICATION NETWORK", which is hereby incorporated by reference in its entirety.

It is understood that various methods may be used to provide additional functionality and/or to ensure that the concurrent sessions may operate on the network. For example, if a NAT device is present, one or more of the NAT traversal methods described herein may be used to traverse the device.

While the preceding description shows and describes one or more embodiments, it will be understood by those skilled in the art that various changes in form and detail may be made therein without departing from the spirit and scope of the present disclosure. For example, various steps illustrated within a particular sequence diagram may be combined or further divided, and some steps may be performed in a different order than that shown. In addition, steps described in one diagram may be incorporated into another diagram. For example, the STUN request/response steps of FIG. 5 may be incorporated into diagrams that do not show this process. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

What is claimed is:

1. A method for execution in a peer-to-peer hybrid network comprising:

logging a first endpoint into the network by presenting unique user authentication information by the first endpoint to the network, wherein the login associates the first endpoint with the unique user authentication information required for authentication with the network;

determining, by the first endpoint, that the unique user authentication information is concurrently associated with a second endpoint currently logged into the network, whereby the second endpoint previously presented the unique user authentication information to the network in order to log in to the network and wherein the first and second endpoints represent a single user in the network;

identifying, by the first endpoint, the first endpoint as a master endpoint corresponding to the unique user authentication information and the second endpoint as a slave endpoint corresponding to the unique user authentication information;

sending a first message directly from the first endpoint to the second endpoint to notify the second endpoint that the first endpoint is logged into the network using the unique user authentication information and that the first endpoint is the master endpoint and the second endpoint is the slave endpoint;

sending, by the first endpoint, a second message directly from the first endpoint to a third endpoint to notify the third endpoint that the first endpoint is logged into the network and that communications sent from the third endpoint to the user of the first and second endpoints should be sent to the first endpoint only;

identifying, by the first endpoint, a status of the first endpoint as away, wherein the status of the first endpoint is available to both the second and third endpoints;

identifying, by the first endpoint, a status of the second endpoint as active, wherein the status of the second endpoint is available only to the first endpoint and not the third endpoint because the first endpoint shares the unique user authentication information of the second endpoint and the third endpoint does not;

sending, by the first endpoint, a third message directly to the third endpoint, wherein the third message identifies a status of the first endpoint as online to the third endpoint based on the active status of the second endpoint even though the first endpoint has a status of away;

receiving, by the first endpoint, a fourth message from the third endpoint via the network;

identifying, by the first endpoint, source information from the fourth message, wherein the source information identifies the third endpoint as the source of the fourth message;

determining, by the first endpoint, whether to apply a first policy or a second policy to the fourth message based on the source information, wherein the first policy is a custom policy to be applied to messages received from the third endpoint and the second policy is a default policy to be applied to messages received from an endpoint not having a corresponding custom policy;

determining, by the first endpoint, that the first policy requires that the fourth message be forwarded to the second endpoint; and forwarding, by the first endpoint, the fourth message to the second endpoint based on the first policy.

2. The method of claim 1 further comprising sending a login notification from a fourth endpoint directly to the first endpoint when the fourth endpoint logs into the network after the first and second endpoints, wherein the fourth endpoint is not associated with the unique authentication information of the first and second endpoints, and wherein the login notification is not sent to the second endpoint designated as the slave endpoint.

3. The method of claim 2 further comprising sending a login notification from the fourth endpoint directly to the third endpoint.

4. The method of claim 2 further comprising sending a login notification from a fifth endpoint directly to the first and second endpoints when the fifth endpoint logs into the network using the unique authentication information of the first and second endpoints, wherein the login notification is not sent to the third endpoint.

5. The method of claim 1 wherein the fourth message is associated with a telephone call and wherein the first endpoint bridges the call between the third endpoint and the second endpoint.

6. The method of claim 1 further sending, by the first endpoint, a fifth message to the second endpoint, wherein the fifth message instructs the second endpoint to open a pinhole for the third endpoint in a network address translation (NAT) device protecting the second endpoint.

7. The method of claim 6 further comprising forwarding, by the first endpoint, address information of the second endpoint directly to the third endpoint in response to the fifth message.

8. The method of claim 1 further comprising:

receiving, by the first endpoint, a fifth message from the second endpoint, wherein the fifth message includes destination information identifying the third endpoint as the destination of the fifth message; and forwarding the fifth message to the third endpoint.

9. The method of claim 1 further comprising:

receiving, by the first endpoint, a fifth message from a fourth endpoint that the fourth endpoint has logged into the network using the same unique user authentication information as the first endpoint, wherein the first and fourth endpoints represent the single user in the network; and setting, by the first endpoint, a status of the first endpoint as a slave endpoint in response to the fifth message, wherein the fifth endpoint is a master endpoint.

10. The method of claim 9 further comprising sending, by the first endpoint, a sixth message to the second endpoint indicating that the first endpoint is no longer the master endpoint.

11. The method of claim 1 further comprising:

receiving, by the first endpoint, a fifth message from a fourth endpoint that the fourth endpoint has logged into the network using the same unique user authentication information as the first endpoint, wherein the first and fourth endpoints represent the single user in the network; and setting, by the first endpoint, a status of the first endpoint as an inactive master endpoint in response to the fifth message, wherein the fourth endpoint is an active master endpoint.

12. A method for applying a policy to a message in a hybrid peer-to-peer network comprising:

logging, by a first endpoint, into the network by presenting unique user authentication information by the first endpoint to the network, wherein the login associates the first endpoint with the unique user authentication information required for authentication with the network;

receiving, by the first endpoint, a profile in response to the logging into the network, wherein the profile identifies whether a second endpoint and a third endpoint are currently logged into the network;

determining, by the first endpoint, that the second endpoint is not currently logged into the network and the third endpoint is logged into the network using unique user authentication information different from the unique user authentication information of the first endpoint;

sending, by the first endpoint, a first message directly from the first endpoint to the third endpoint to notify the third endpoint that the first endpoint is logged into the network;

receiving, by the first endpoint, a second message from the second endpoint that the second endpoint has logged into the network using the same unique user authentication information as the first endpoint, wherein the first and second endpoints represent a single user in the network;

sending, by the first endpoint, a third message directly from the first endpoint to the third endpoint to notify the third endpoint that the second endpoint is logged into the network and that communications from the third endpoint to the user of the first and second endpoints should be sent directly to the second endpoint;

receiving, by the first endpoint, a fourth message directly from one of the second and third endpoints;

determining, by the first endpoint, whether the fourth message is received from the second endpoint that has been authenticated with the network by presenting the unique user authentication information of the first endpoint to the network or from the third endpoint that is authenticated with the network using unique user authentication information different from the unique user authentication information of the first endpoint; and applying a policy based on whether the fourth message is from the second endpoint or the third endpoint.

13. The method of claim 12 wherein applying the policy includes forwarding the fourth message to all endpoints that are authenticated with the network using the unique user authentication information of the first endpoint.

14. The method of claim 12 further comprising:

determining, by the first endpoint, whether the policy requires forwarding of the fourth message;

forwarding, by the first endpoint, the fourth message to the second endpoint if the second endpoint is identified as a forwarding destination in the policy and forwarding is required; and forwarding, by the first endpoint, the fourth message to the second endpoint as an active endpoint using the same unique user authentication as the first endpoint if a forwarding destination is not identified in the policy and forwarding is required.

15. The method of claim 14 wherein identifying an active endpoint includes sending the fourth message to the second endpoint, wherein the second endpoint displays the most recent activity of all endpoints that are authenticated with the network using the unique user authentication information of the first endpoint.

16. The method of claim 12 wherein the fourth message is from the second endpoint and includes a request for file access to an endpoint that is authenticated with the network using the unique user authentication information of the first endpoint.

17. The method of claim 16 further comprising providing the second endpoint with the file access.

18. The method of claim 14 further comprising identifying, by the first endpoint, an active endpoint using the same unique user authentication as the first endpoint, wherein the identifying determines that the second endpoint was the most recently active endpoint associated with the same unique user authentication as the first endpoint.

19. The method of claim 14 further comprising:
identifying, by the first endpoint, an active endpoint using the same unique user authentication as the first endpoint, wherein the identifying includes simultaneously requesting a call session with all endpoints associated with the same unique user authentication as the first endpoint; and
instructing all simultaneously contacted endpoints except the second endpoint to disconnect once the second endpoint responds to the call session request.

\* \* \* \* \*